(12) United States Patent
Kamiya

(10) Patent No.: US 11,701,767 B2
(45) Date of Patent: Jul. 18, 2023

(54) ELECTRIC DRIVER DRILL

(71) Applicant: MAKITA CORPORATION, Anjo (JP)

(72) Inventor: Takeshi Kamiya, Anjo (JP)

(73) Assignee: MAKITA CORPORATION, Anjo (JP)

( * ) Notice: Subject to any disclaimer, the term of this patent is extended or adjusted under 35 U.S.C. 154(b) by 274 days.

(21) Appl. No.: 17/065,081

(22) Filed: Oct. 7, 2020

(65) Prior Publication Data
US 2021/0138624 A1 May 13, 2021

(30) Foreign Application Priority Data
Nov. 8, 2019 (JP) .................. 2019-203220

(51) Int. Cl.
*B25F 5/00* (2006.01)
*B25B 21/02* (2006.01)
*B23B 45/02* (2006.01)

(52) U.S. Cl.
CPC .............. *B25F 5/001* (2013.01); *B23B 45/02* (2013.01); *B25B 21/026* (2013.01); *B25B 21/023* (2013.01)

(58) Field of Classification Search
CPC ..... B23B 21/023; B23B 45/02; B23B 45/026; B25B 21/00; B25B 21/023; B25B 23/14; B25B 23/141; B25D 16/003; B25D 16/006; B25D 2216/0023; B25D 2216/0038; B25F 5/001
USPC ........................................................ 173/178
See application file for complete search history.

(56) References Cited

U.S. PATENT DOCUMENTS

| | | | | |
|---|---|---|---|---|
| 5,449,043 A | * | 9/1995 | Bourner | B25D 11/102 173/48 |
| 5,704,433 A | * | 1/1998 | Bourner | B25B 23/141 173/48 |
| 6,431,289 B1 | * | 8/2002 | Potter | F16H 3/66 475/299 |
| 6,502,648 B2 | * | 1/2003 | Milbourne | F16H 35/10 173/149 |
| 6,984,188 B2 | * | 1/2006 | Potter | B25F 5/001 475/263 |
| 7,101,300 B2 | * | 9/2006 | Milbourne | B25B 23/14 475/263 |

(Continued)

FOREIGN PATENT DOCUMENTS

JP 2017-100259 A 6/2017

*Primary Examiner* — Thomas M Wittenschlaeger
*Assistant Examiner* — David G Shutty
(74) *Attorney, Agent, or Firm* — Oliff PLC

(57) ABSTRACT

The drill includes a motor, a spindle rotatable with a rotational force transmitted from the motor, a clutch assembly that disables transmission of the rotational force to the spindle in response to a rotational load on the spindle reaching a release value and including an elastic member that adjusts the release value, and a change ring switchable from a clutch mode in which the clutch assembly is operable to a nonclutch mode in which the clutch assembly is inoperable in response to the change ring operated in a forward rotation direction. In the clutch mode, the elastic member elastically deforms to reduce the release value in response to the change ring operated in the forward rotation direction, and to increase the release value in response to the change ring operated in a backward rotation direction.

20 Claims, 38 Drawing Sheets

(56) References Cited

U.S. PATENT DOCUMENTS

| | | | | |
|---|---|---|---|---|
| 7,314,097 | B2* | 1/2008 | Jenner | B25D 16/006 |
| | | | | 475/265 |
| 8,109,343 | B2* | 2/2012 | Schroeder | B25D 16/006 |
| | | | | 173/217 |
| 8,235,137 | B2* | 8/2012 | Walker | B25F 5/001 |
| | | | | 173/217 |
| 8,434,564 | B2* | 5/2013 | Tomayko | B25F 5/001 |
| | | | | 173/217 |
| 2006/0086514 | A1* | 4/2006 | Aeberhard | B25B 21/023 |
| | | | | 173/48 |
| 2012/0255754 | A1* | 10/2012 | Kondo | B25D 11/102 |
| | | | | 173/178 |
| 2017/0157753 | A1* | 6/2017 | Nagasaka | B23B 45/00 |
| 2018/0071905 | A1* | 3/2018 | Wang | B25B 21/023 |

* cited by examiner

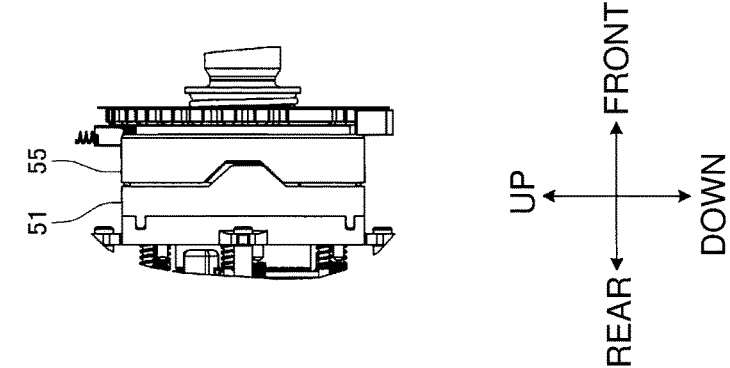
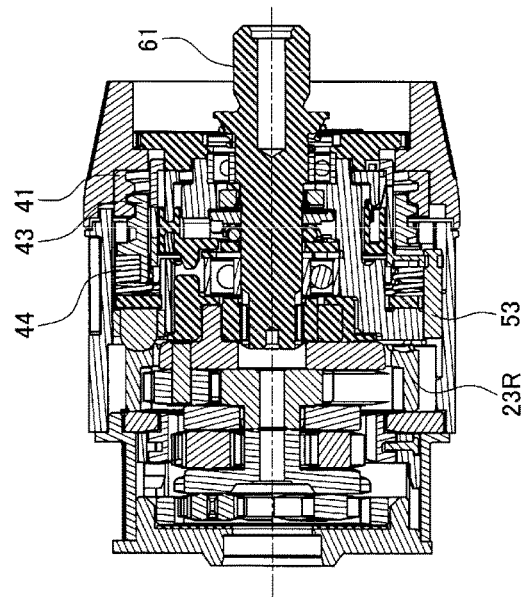
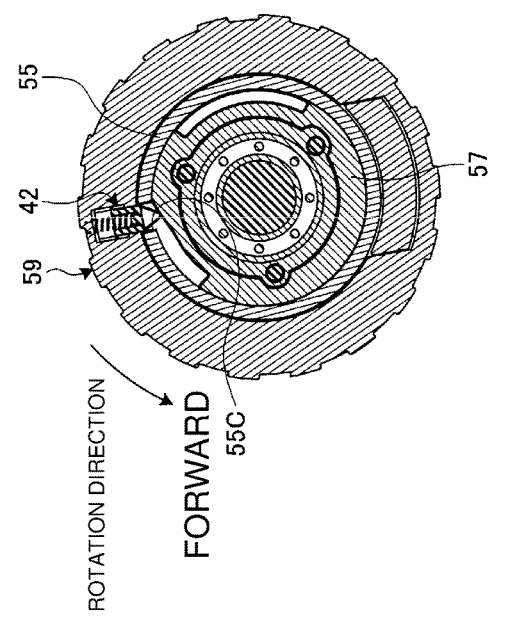

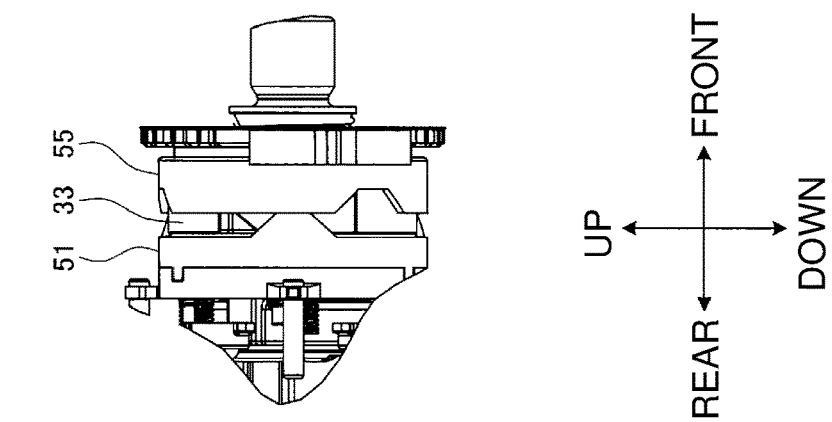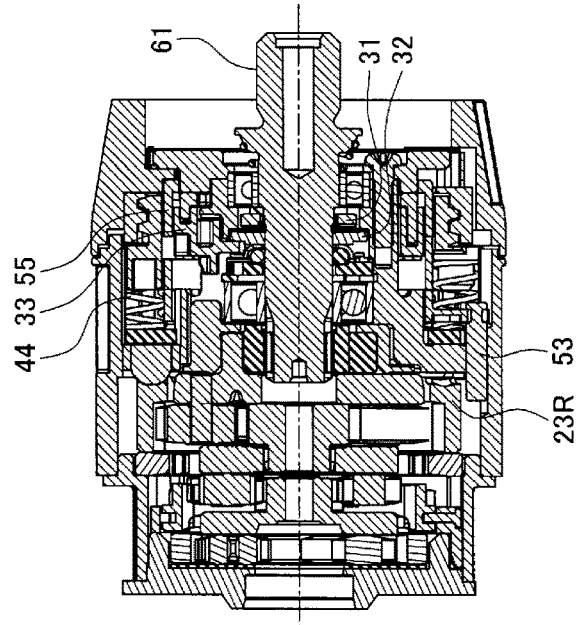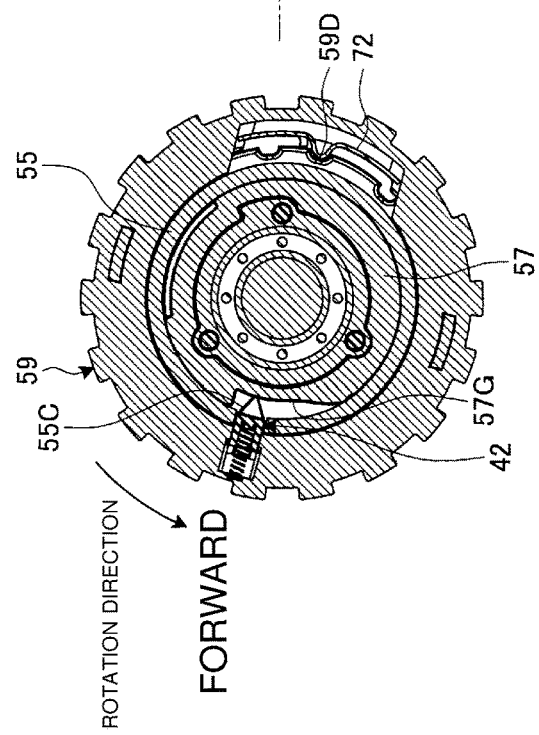

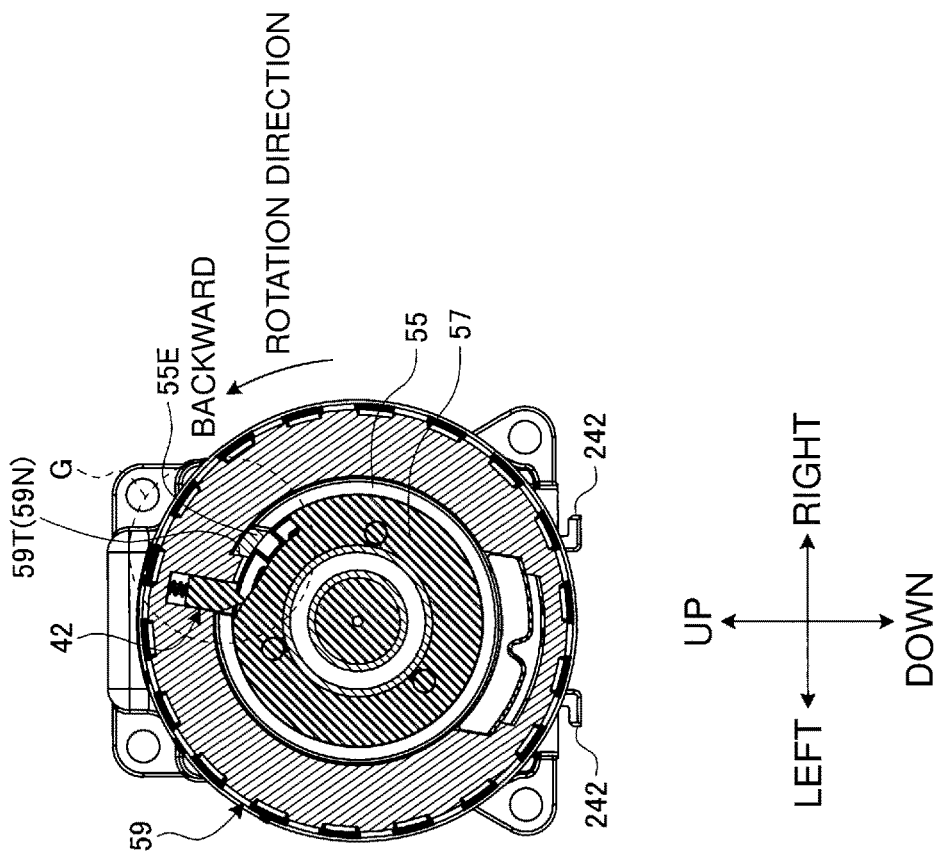
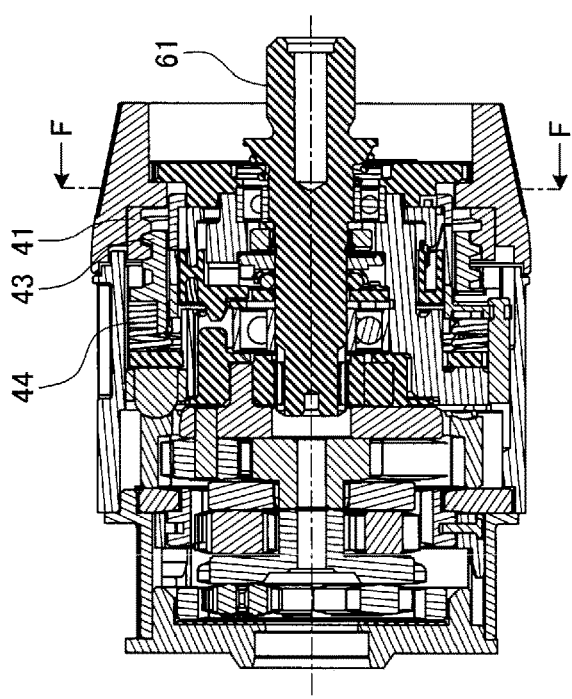

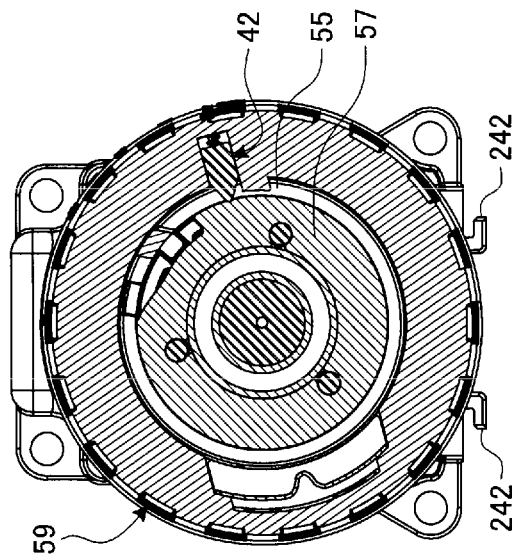 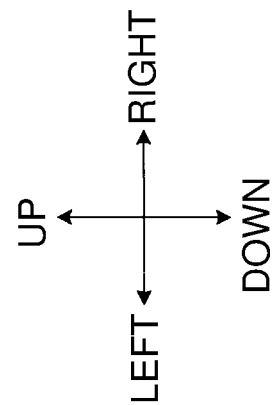
FIG. 38A
FIG. 38B

ELECTRIC DRIVER DRILL

CROSS-REFERENCE TO RELATED APPLICATIONS

This application claims the benefit of priority to Japanese Patent Application No. 2019-203220, filed on Nov. 8, 2019, the entire contents of which are hereby incorporated by reference.

BACKGROUND

1. Technical Field

The present disclosure relates to an electric driver drill.

2. Description of the Background

A vibration driver drill described in Japanese Unexamined Patent Application Publication No. 2017-100259 is known in the technical field of power tools. The vibration driver drill includes a mode change ring and a change ring. The mode change ring is operated to change the operation mode of the vibration driver drill. The operation modes of the vibration driver drill include a clutch mode in which a clutch assembly is operable and a nonclutch mode in which the clutch assembly is inoperable. The nonclutch mode includes a drill mode in which a vibration assembly is inoperable and a vibration drill mode in which the vibration assembly is operable. The change ring in the clutch mode is operated to adjust the release value for the clutch assembly.

BRIEF SUMMARY

A technique is awaited for changing the operation mode and the release value for a clutch assembly with high operability.

One or more aspects of the present disclosure are directed to an electric driver drill that changes the operation mode and the release value for a clutch assembly with high operability.

A first aspect of the present disclosure provides an electric driver drill, including:

a motor;

a spindle configured to rotate with a rotational force transmitted from the motor;

a clutch assembly configured to disable transmission of the rotational force to the spindle in response to a rotational load on the spindle reaching a release value, the clutch assembly including an elastic member configured to adjust the release value; and a change ring configured to switch from a clutch mode in which the clutch assembly is operable to a nonclutch mode in which the clutch assembly is inoperable in response to being operated in a forward rotation direction, wherein in the clutch mode, the elastic member elastically deforms to reduce the release value in response to the change ring being operated in the forward rotation direction, and elastically deforms to increase the release value in response to the change ring being operated in a backward rotation direction.

A second aspect of the present disclosure provides an electric driver drill, including:

a motor;

a spindle configured to rotate with a rotational force transmitted from the motor;

a clutch assembly configured to disable transmission of the rotational force to the spindle in response to a rotational load on the spindle reaching a release value, the clutch assembly including an elastic member configured to adjust the release value;

a clutching-off member movable to switch between a clutch mode in which the clutch assembly is operable and a nonclutch mode in which the clutch assembly is inoperable; and a change ring operable in a rotation direction to adjust at least one of the clutch assembly or the clutching-off member, the change ring being configured to adjust the clutch assembly in response to being operated in a first range in the rotation direction and to adjust the clutching-off member in response to being operated in a second range more forward in the rotation direction than in the first range, wherein the elastic member elastically deforms, in the first range, to reduce the release value in response to the change ring being operated in a forward rotation direction, and elastically deforms, in the first range, to increase the release value in response to the change ring being operated in a backward rotation direction.

A third aspect of the present disclosure provides an electric driver drill, including:

a motor;

a spindle configured to rotate with a rotational force transmitted from the motor;

a clutch assembly configured to disable transmission of the rotational force to the spindle in response to a rotational load on the spindle reaching a release value, the clutch assembly including an elastic member configured to adjust the release value;

a vibration assembly configured to vibrate the spindle, the vibration assembly including a first cam surrounding the spindle, and a second cam located rearward from the first cam to come in contact with the first cam; and a change ring operable in a rotation direction to adjust at least one of the clutch assembly or the vibration assembly, the change ring being configured to adjust the clutch assembly in response to being operated in a first range in the rotation direction and to adjust the vibration assembly in response to being operated in a third range more forward than in the first range in the rotation direction, wherein the elastic member elastically deforms, in the first range, to reduce the release value in response to the change ring being operated in a forward rotation direction, and elastically deforms, in the first range, to increase the release value in response to the change ring being operated in a backward rotation direction.

The electric driver drill according to the above aspects of the present disclosure changes the operation mode and the release value for a clutch assembly with high operability.

BRIEF DESCRIPTION OF DRAWINGS

FIGS. 33A to 33C are views of the electric driver drill shifting from the clutch mode to a drill mode according to the embodiment.

FIGS. 35A to 35C are views of the electric driver drill in a vibration drill mode according to the embodiment.

FIGS. 36A and 36B are views of the electric driver drill in the clutch mode according to the embodiment.

FIGS. 38A and 38B are views of the electric driver drill in the clutch mode according to the embodiment.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In the embodiments, the positional relationships between the components will be described using the directional terms such as right and left (or lateral), front and rear (or forward and backward), and up and down (or vertical). The terms indicate relative positions or directions with respect to the center of an electric driver drill 1. The electric driver drill 1 according to the embodiments is a vibration driver drill.

In the embodiments, a direction parallel to a rotation axis AX of a spindle 61 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience. A position nearer the rotation axis AX in the radial direction, or a radial direction toward the rotation axis AX, is referred to as radially inside or radially inward for convenience. A position farther from the rotation axis AX in the radial direction, or a radial direction away from the rotation axis AX, is referred to as radially outside or radially outward for convenience. The rotation direction is referred to as a forward rotation direction and a backward rotation direction opposite to the forward rotation direction for convenience.

The rotation axis AX extends in a front-rear direction in the embodiments. The axial direction corresponds to the front-rear direction.

Overview of Electric Driver Drill

Figure 1:
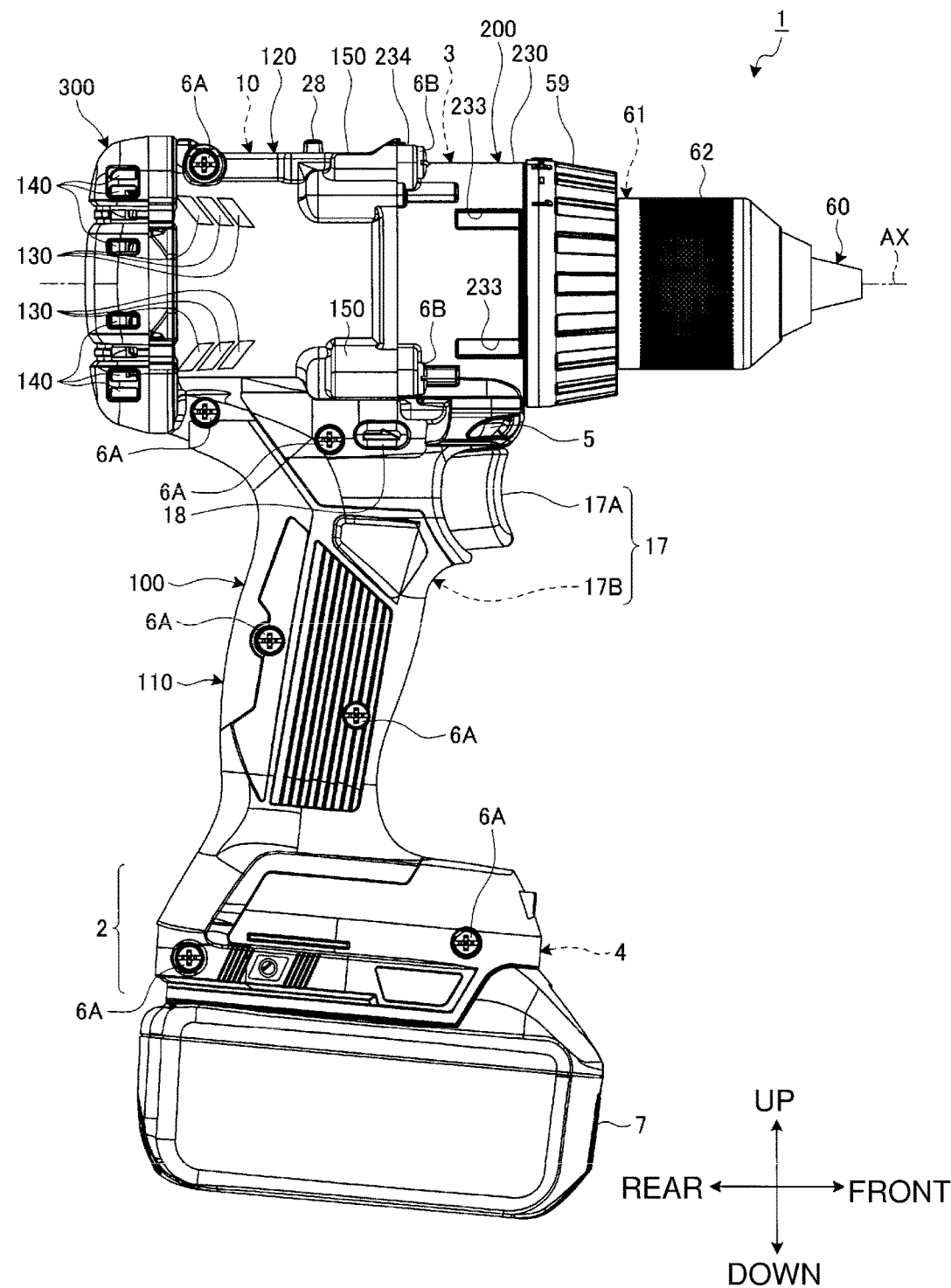
FIG. 1 is a right side view of an electric driver drill according to an embodiment.
Figure 2:
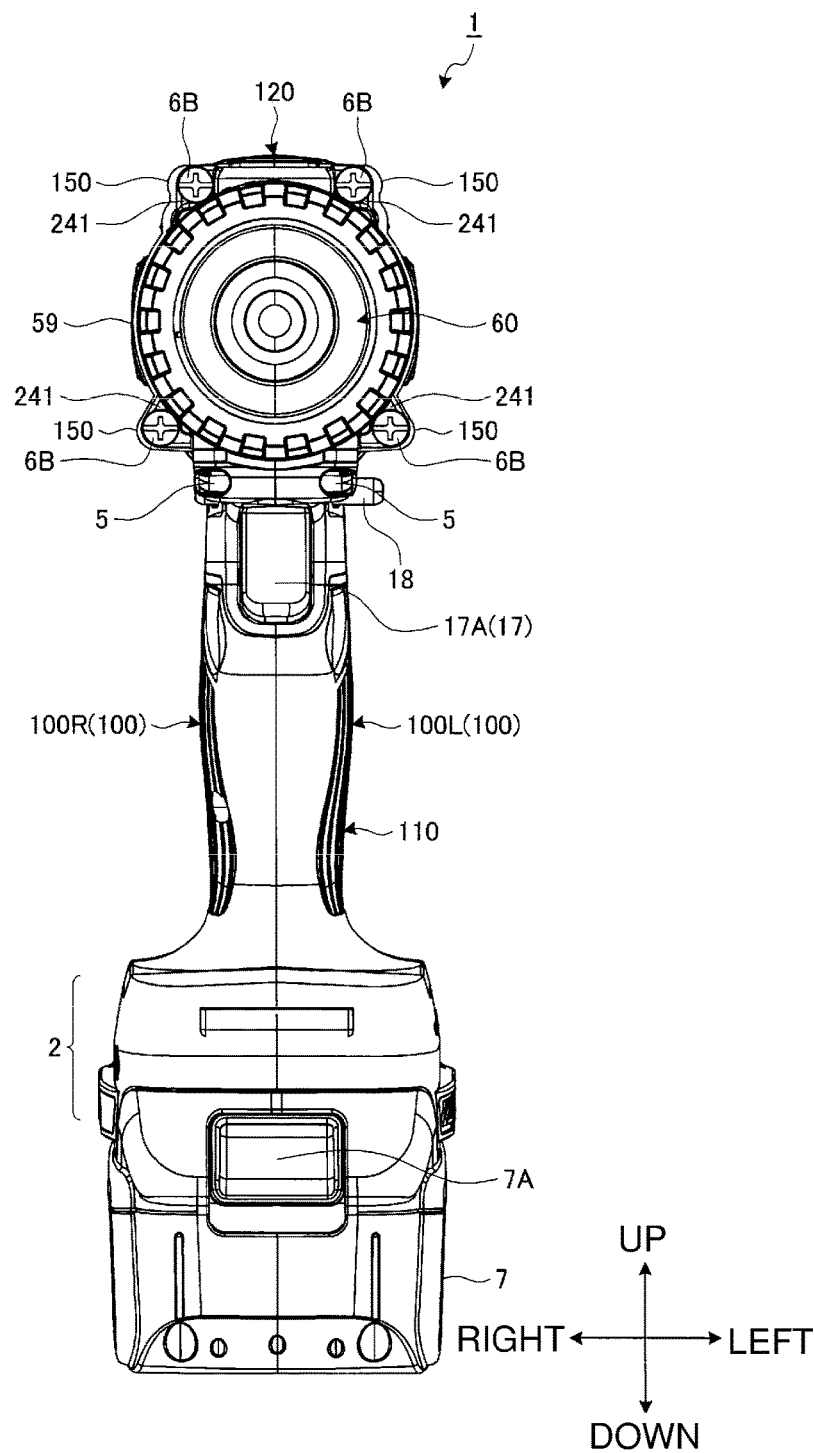
FIG. 2 is a front view of the electric driver drill according to the embodiment.
Figure 3:
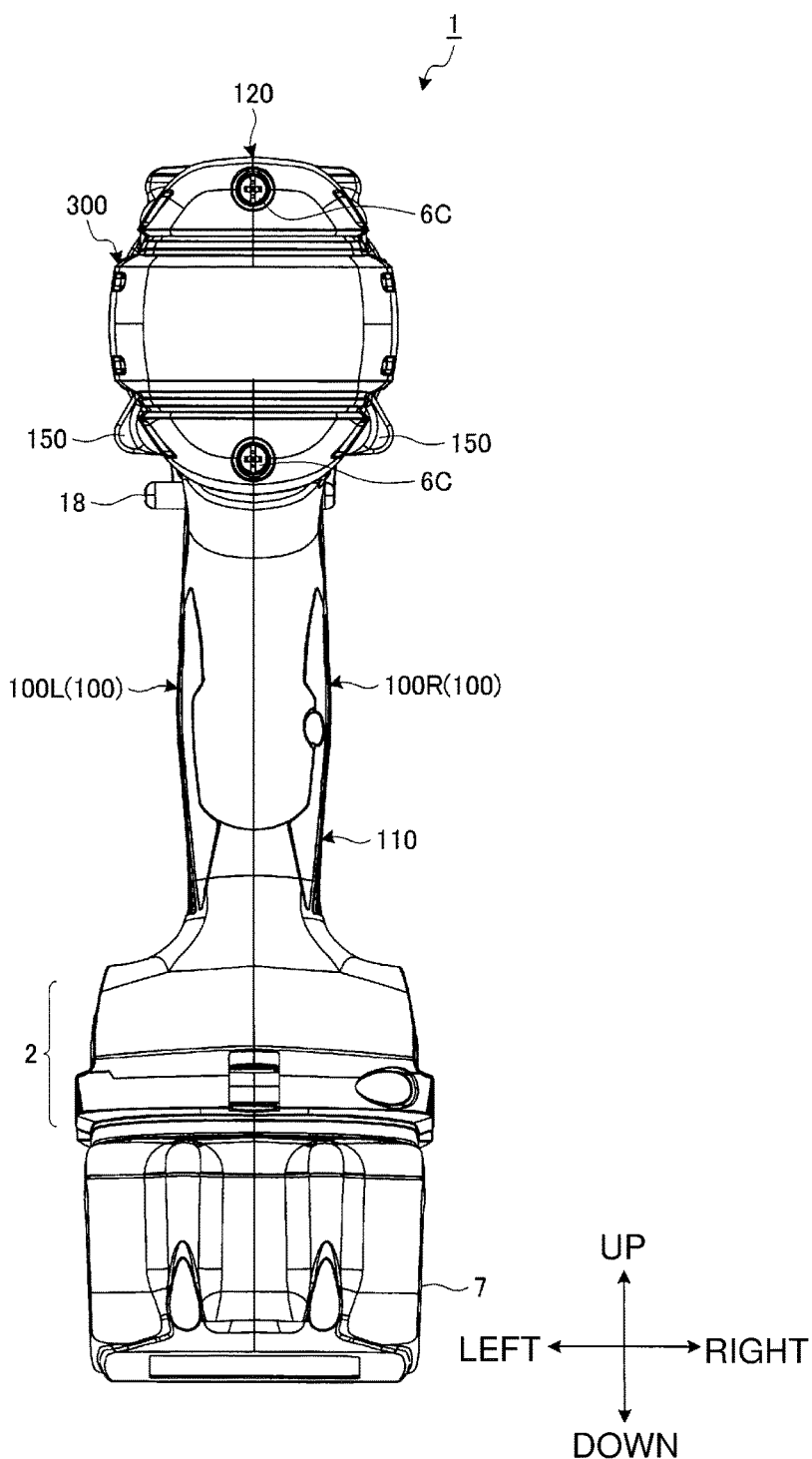
FIG. 3 is a rear view of the electric driver drill according to the embodiment.
Figure 4:
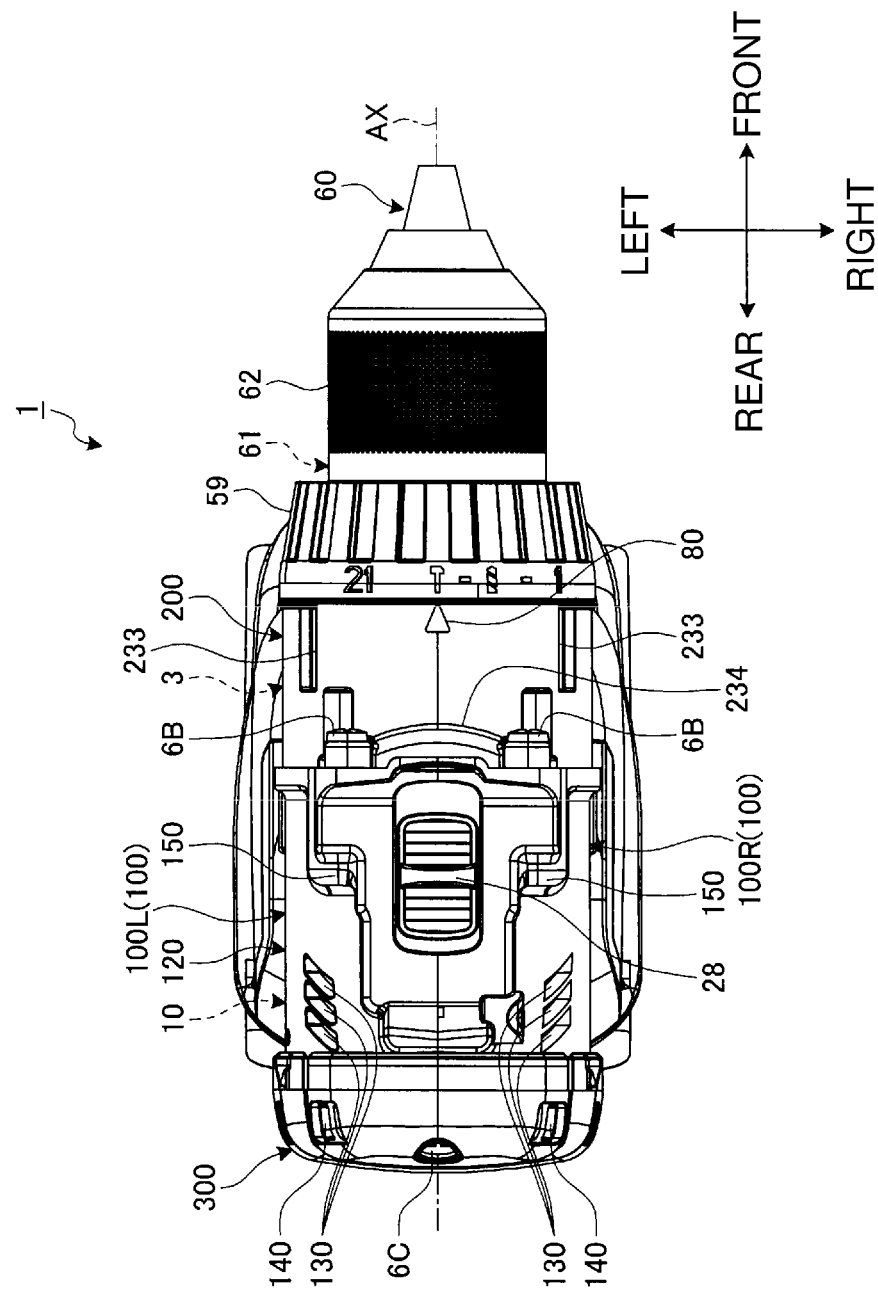
FIG. 4 is a top view of the electric driver drill according to the embodiment.
Figure 5:
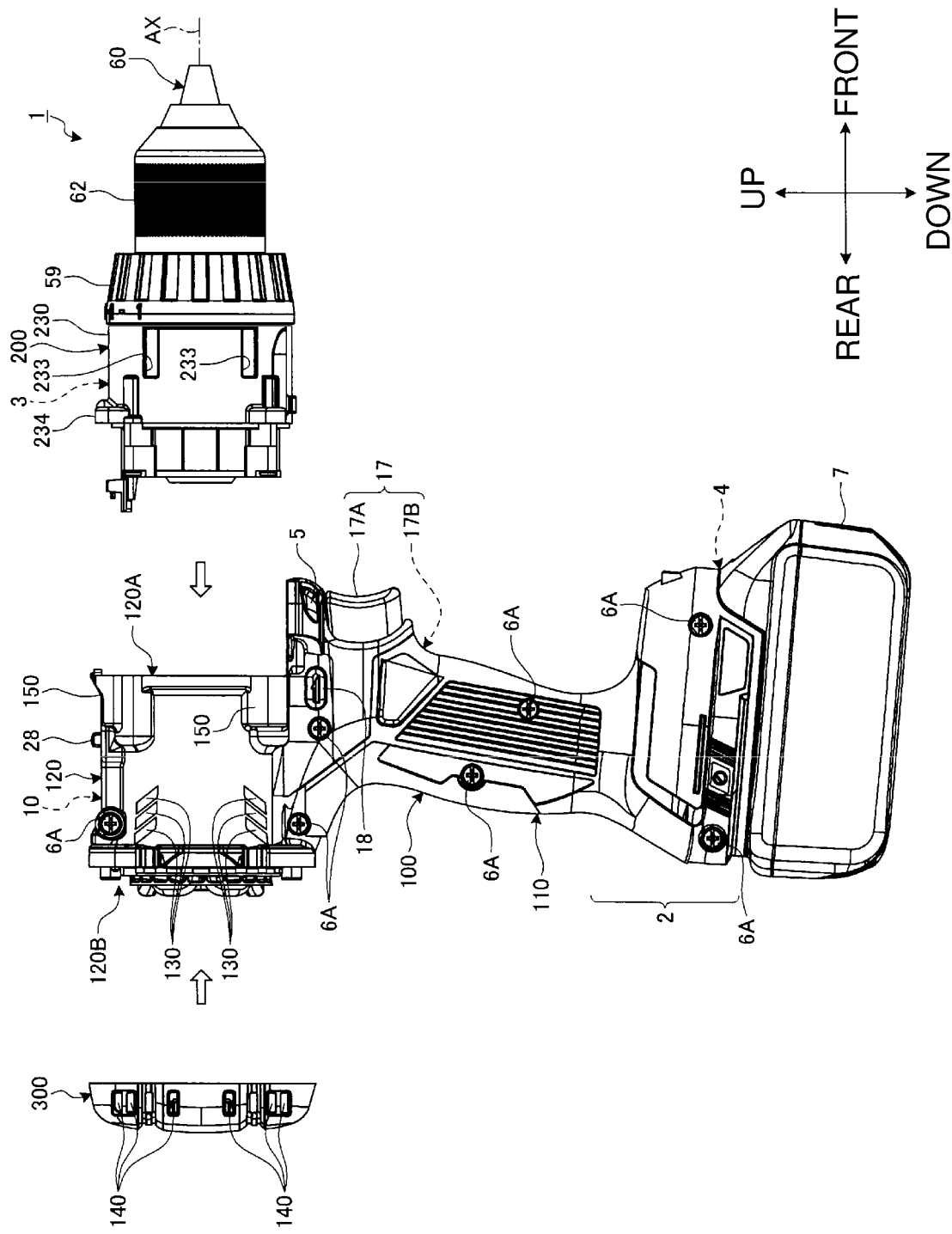
FIG. 5 is an exploded side view of the electric driver drill according to the embodiment.

FIG. 1 is a right side view of the electric driver drill 1 according to an embodiment. FIG. 2 is a front view of the electric driver drill 1 according to the embodiment. FIG. 3 is a rear view of the electric driver drill 1 according to the embodiment. FIG. 4 is a top view of the electric driver drill 1 according to the embodiment. FIG. 5 is an exploded side view of the electric driver drill 1 according to the embodiment.

As shown in FIGS. 1 to 5, the electric driver drill 1 includes a housing 100, a casing 200, a rear cover 300, a motor 10, a power transmission assembly 3, an output assembly 60, a battery mount 2, a controller 4, and lamps 5.

The electric driver drill 1 also includes a trigger switch 17, a forward-reverse switch lever 18, a speed switch lever 28, and a change ring 59.

The housing 100 includes a grip housing 110 and a body housing 120. The body housing 120 is located above the grip housing 110. The body housing 120 is integral with the grip housing 110.

The housing 100 is formed from a synthetic resin. The housing 100 according to the present embodiment includes a left housing 100L and a right housing 100R. The left housing 100L and the right housing 100R are fastened together with screws 6A, forming the housing 100.

The grip housing 110 is grippable by an operator. The grip housing 110 protrudes downward from a lower portion of the body housing 120. The battery mount 2 is located below the grip housing 110.

The body housing 120 is cylindrical. As shown in FIG. 5, the body housing 120 has a front opening 120A partially receiving the casing 200. The body housing 120 has a rear opening 120B covered by the rear cover 300. As shown in FIGS. 1, 2, and 4, the casing 200 is fastened to the body housing 120 with screws 6B. As shown in FIGS. 1, 3, and 4, the rear cover 300 is fastened to the body housing 120 with screws 6C. As shown in FIG. 5, the rear cover 300 is located to cover the rear opening 120B in the body housing 120.

The body housing 120 has inlets 130. The rear cover 300 has outlets 140. The outlets 140 are located behind the inlets 130. The inlets 130 connect the inside and the outside of the body housing 120. The outlets 140 connect the inside and the outside of the body housing 120. The inlets 130 are located in the right and left portions of the body housing 120. The outlets 140 are located in the right and left portions of the rear cover 300. Air outside the body housing 120 flows into the body housing 120 through the inlets 130. Air inside the body housing 120 flows out of the body housing 120 through the outlets 140.

The motor 10 generates a rotational force for rotating the output assembly 60. The motor 10 is accommodated in the body housing 120.

The power transmission assembly 3 transmits a rotational force generated by the motor 10 to the output assembly 60. The power transmission assembly 3 includes multiple gears. The power transmission assembly 3 is accommodated in the casing 200.

The output assembly 60 is rotated with the rotational force transmitted from the motor 10 through the power transmission assembly 3. The output assembly 60 includes the spindle 61 and a chuck 62. The spindle 61 rotates about the rotation axis AX with the rotational force transmitted from the motor 10 through the power transmission assembly 3.

The battery mount 2 is connected to a battery pack 7. The battery mount 2 is located below the grip housing 110. The battery pack 7 is attached to the battery mount 2 in a detachable manner. The battery pack 7 is attached to the battery mount 2 to power the electric driver drill 1. The motor 10 is driven by power supplied from the battery pack 7.

The battery pack 7 may be a secondary battery. The battery pack 7 according to the embodiment may be a rechargeable lithium-ion battery. The battery pack 7 includes a release button 7A. The release button 7A is operable to release the battery pack 7 fixed on the battery mount 2. The release button 7A is located on the front surface of the battery pack 7.

The controller 4 outputs control signals for controlling the motor 10. The controller 4 is accommodated in the battery mount 2.

The lamps 5 are located at the upper front of the grip housing 110. The lamps 5 emit illumination light to illuminate ahead of the electric driver drill 1. The lamps 5 include, for example, light-emitting diodes (LEDs). The two lamps 5 are located in the lateral direction.

The trigger switch 17 is located on the grip housing 110. The trigger switch 17 includes a trigger 17A and a switch body 17B. The switch body 17B is accommodated in the grip housing 110. The trigger 17A protrudes frontward from the upper front of the grip housing 110. The operator can switch the motor 10 between the rotating state and the stopped state using the trigger 17A with the finger gripping the grip housing 110.

The forward-reverse switch lever 18 is located in an upper portion of the grip housing 110. The forward-reverse switch lever 18 is operable by the operator to move rightward or leftward. The forward-reverse switch lever 18 is operated rightward or leftward to switch the rotation direction of the motor 10 between forward and reverse. This operation switches the rotation direction of the spindle 61.

The speed switch lever 28 is located in an upper portion of the body housing 120. The speed switch lever 28 is operable by the operator to move forward or rearward, causing the spindle 61 to be switched between a first speed and a second speed. The second speed is higher than the first speed.

The change ring 59 is located in front of the casing 200. The change ring 59 is operable by the operator to change the operation mode of the electric driver drill 1.

The operation modes of the electric driver drill 1 include a clutch mode and a nonclutch mode. In the clutch mode, transmission of a rotational force to the spindle 61 is disabled depending on a rotational load on the spindle 61. In the nonclutch mode, transmission of a rotational force to the spindle 61 is enabled independently of a rotational load on the spindle 61. The nonclutch mode includes a vibration drill mode and a drill mode. In the vibration drill mode, the spindle 61 vibrates in the axial direction. In the drill mode, the spindle 61 does not vibrate in the axial direction.

The change ring 59 in the clutch mode is operated to set the release value for disabling transmission of a rotational force to the spindle 61. The release value indicates a rotational load on the spindle 61. The transmission of a rotational force to the spindle 61 is disabled in response to the rotational load on the spindle 61 reaching the release value.

Casing

Figure 6:
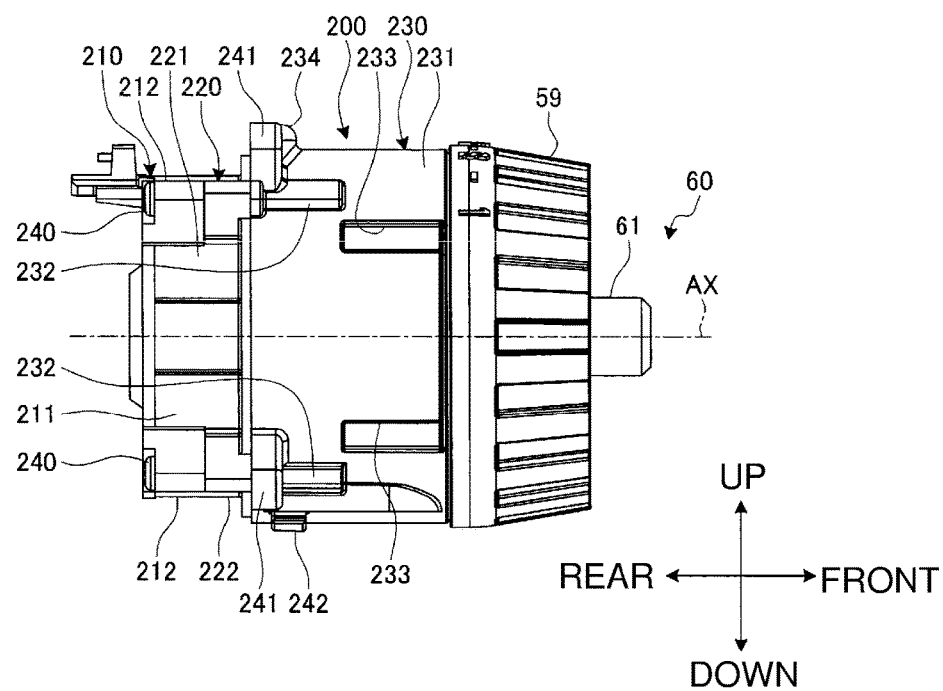
FIG. 6 is a right side view of a casing according to the embodiment.
Figure 7:
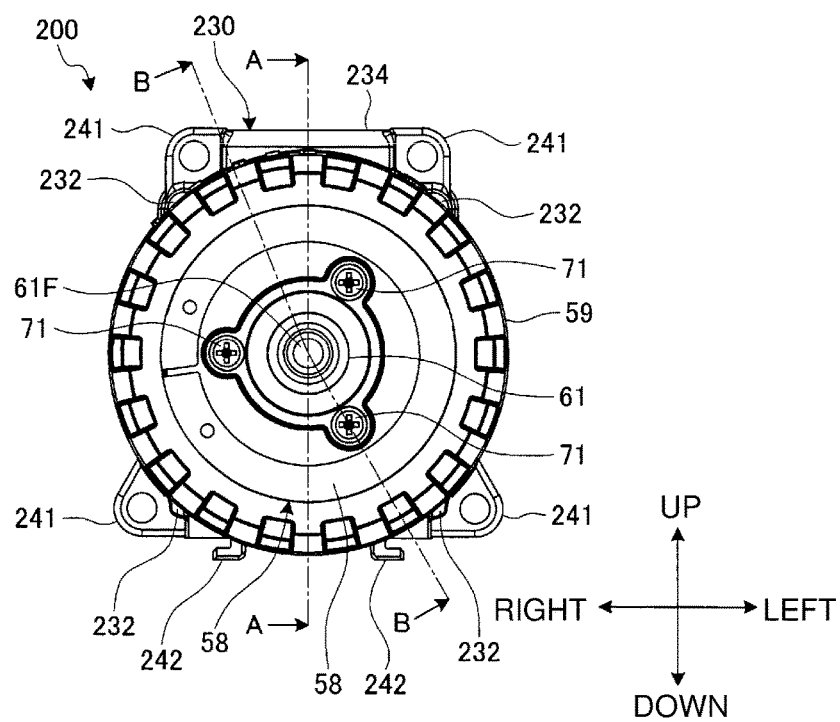
FIG. 7 is a front view of the casing according to the embodiment.
Figure 8:
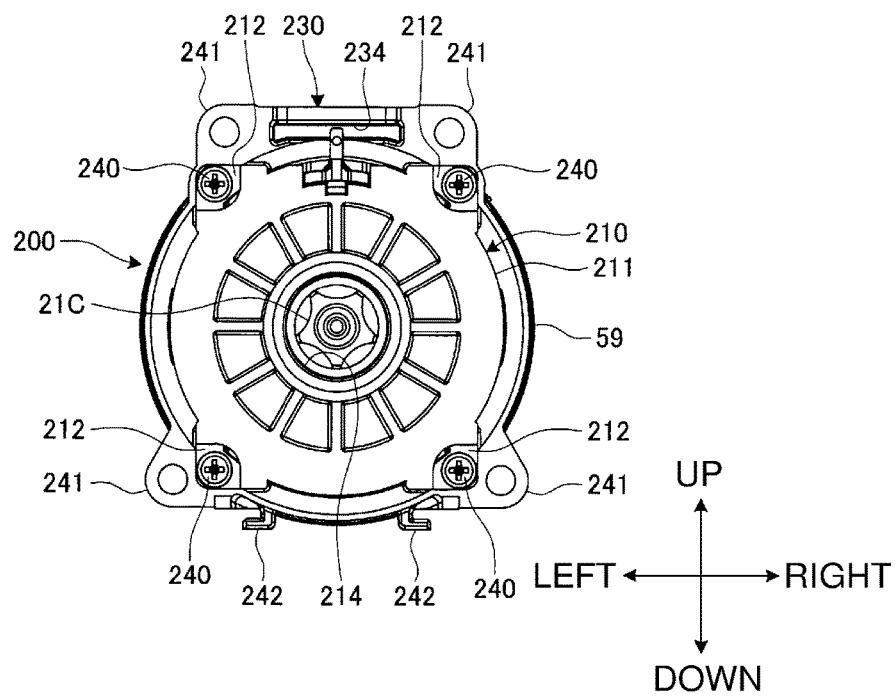
FIG. 8 is a rear view of the casing according to the embodiment.
Figure 9:
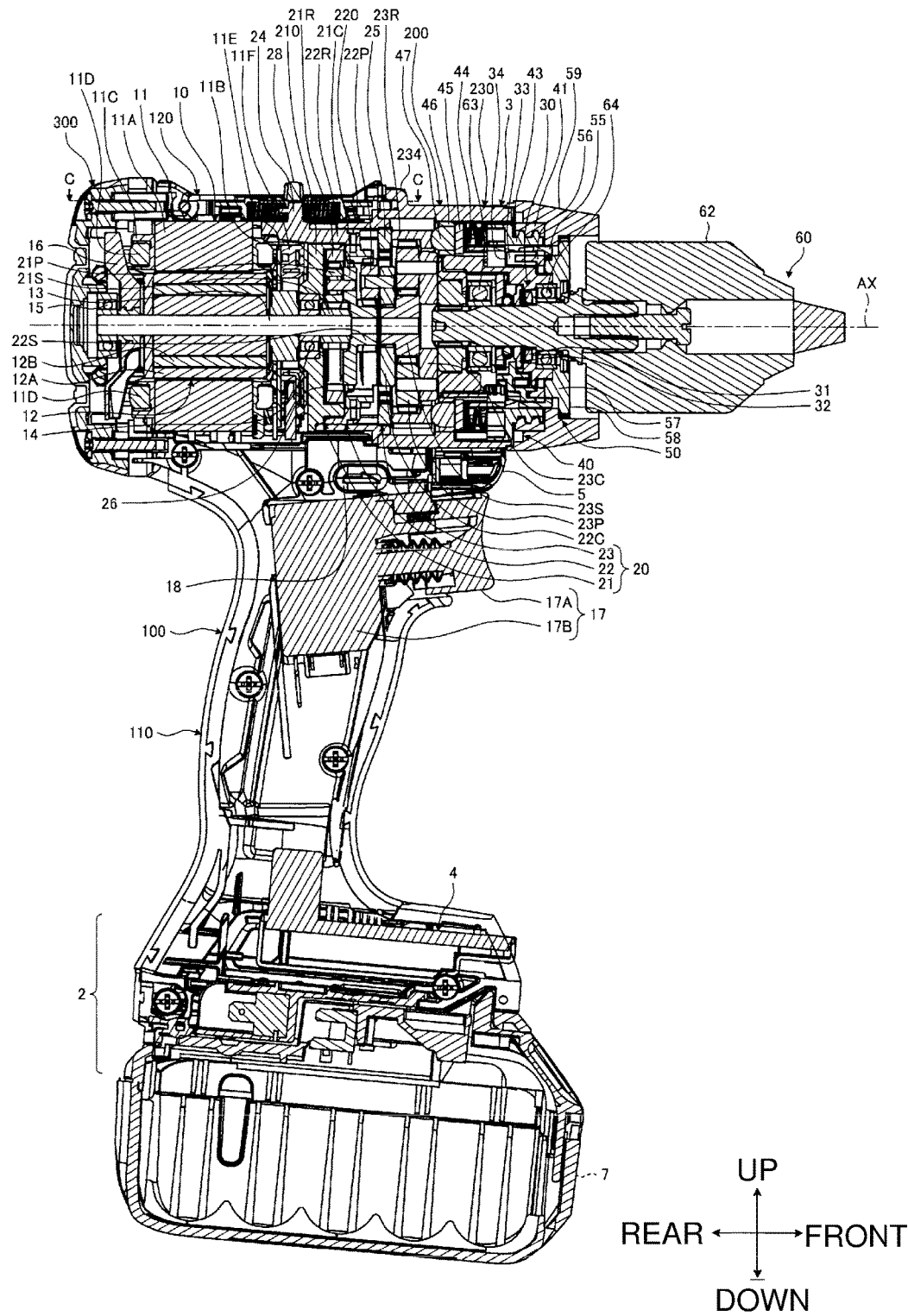
FIG. 9 is a side cross-sectional view of the electric driver drill according to the embodiment.
Figure 10:
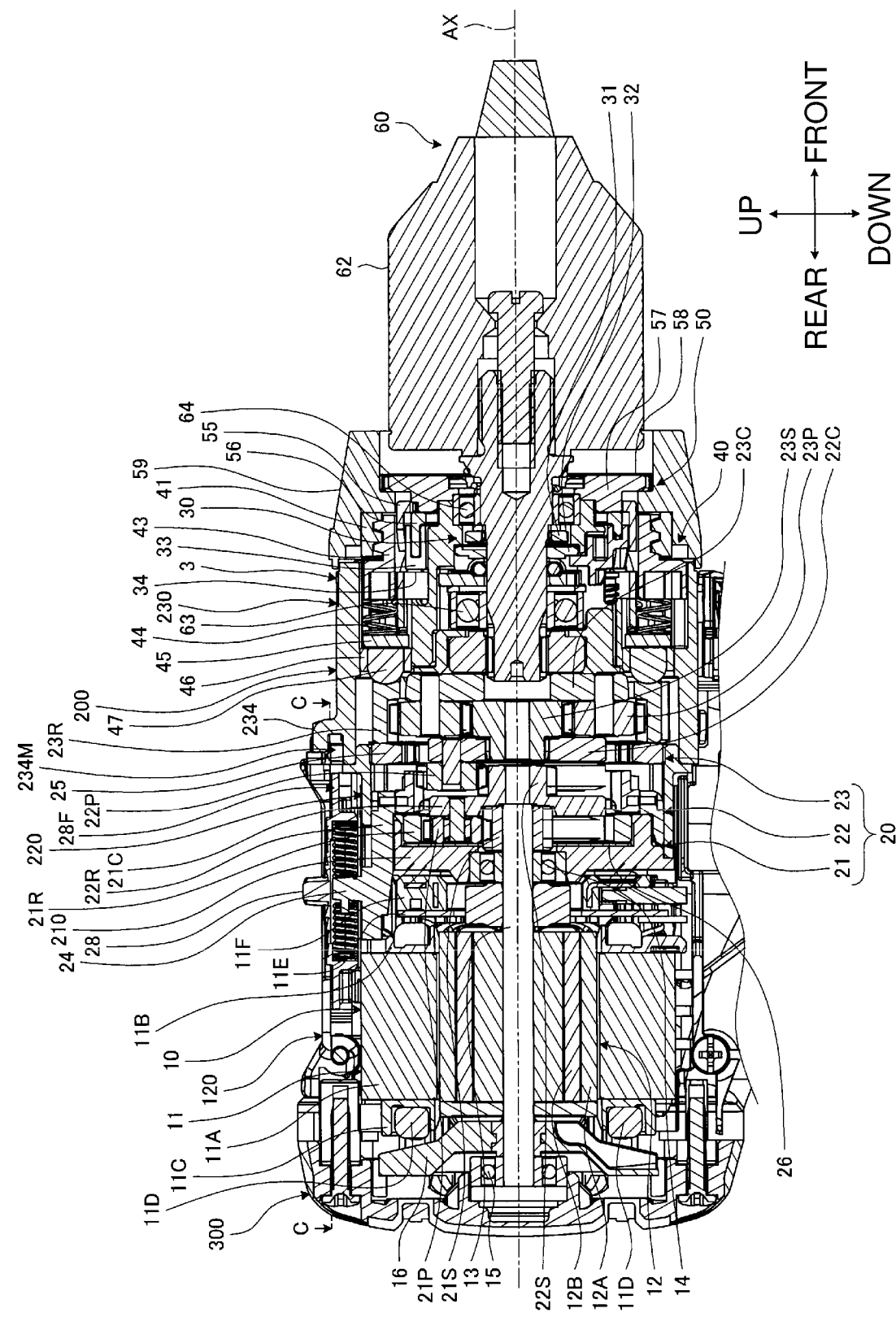
FIG. 10 is a partial side cross-sectional view of the electric driver drill according to the embodiment.
Figure 11:
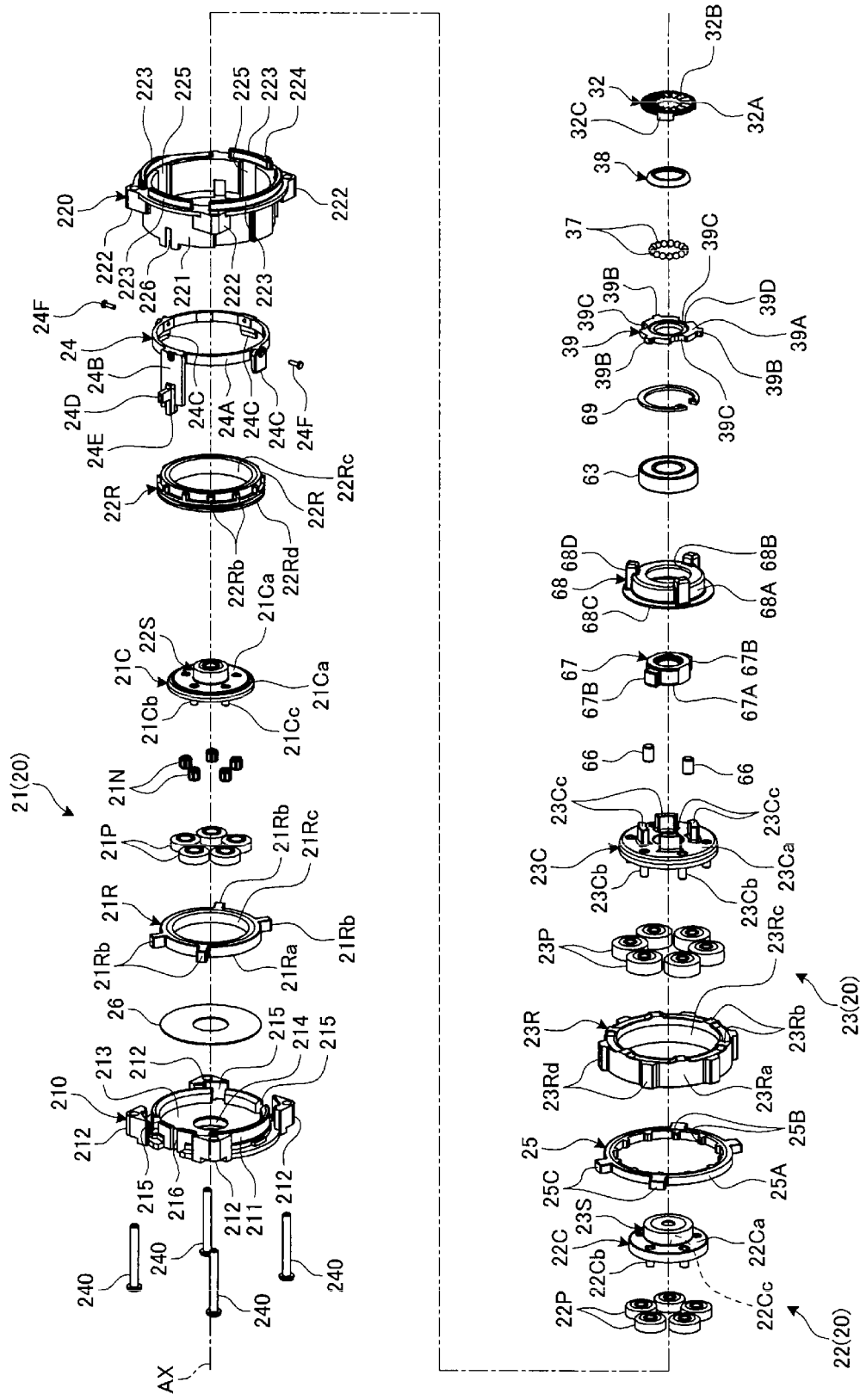
FIG. 11 is an exploded perspective view of a rear portion of a power transmission assembly according to the embodiment.
Figure 12:
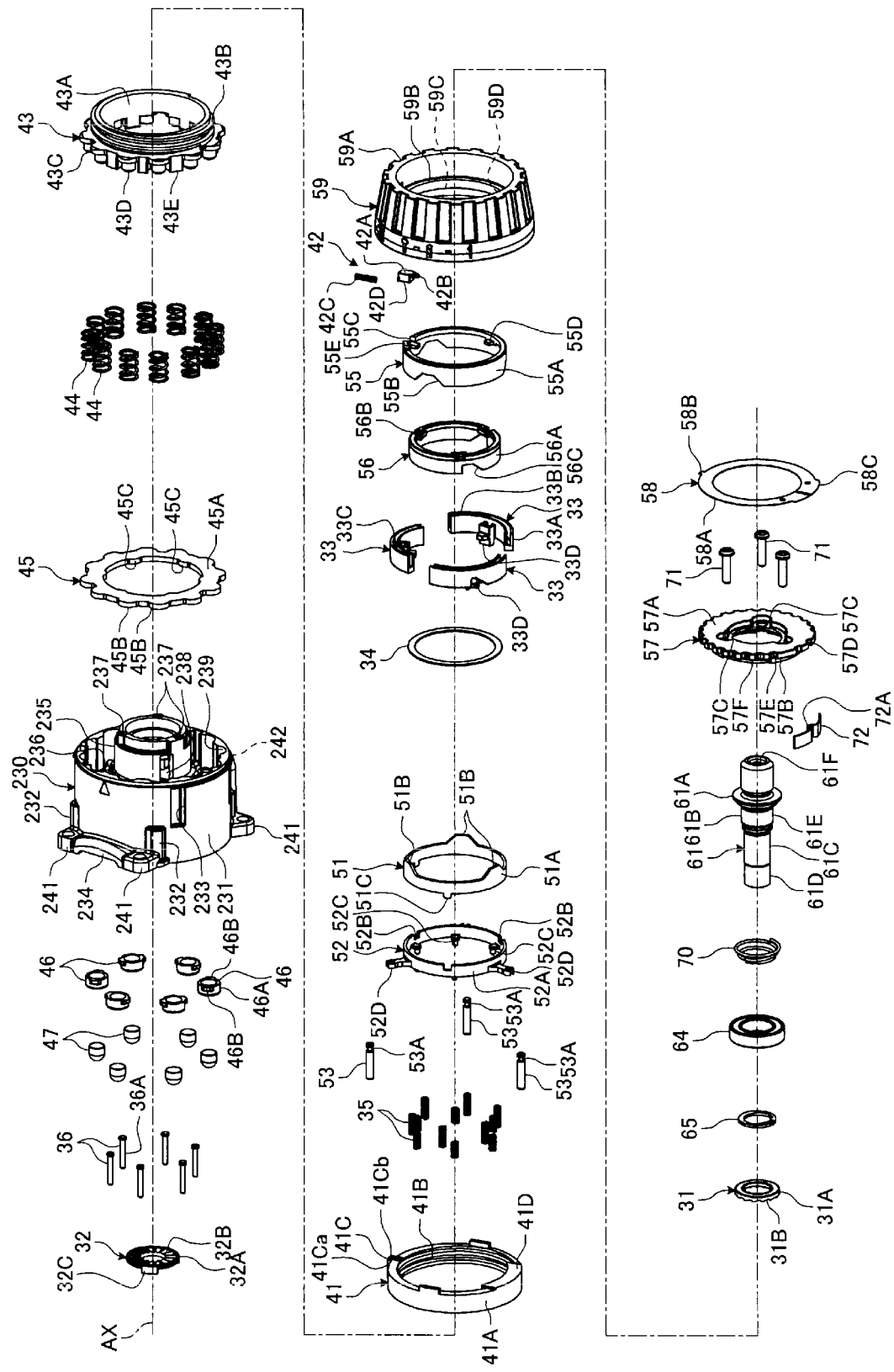
FIG. 12 is an exploded perspective view of a front portion of the power transmission assembly and an output assembly according to the embodiment.

FIG. 6 is a right side view of the casing 200 according to the present embodiment. FIG. 7 is a front view of the casing 200 according to the present embodiment. FIG. 8 is a rear view of the casing 200 according to the present embodiment. FIG. 9 is a side cross-sectional view of the electric driver drill 1 according to the embodiment. FIG. 10 is a partial side cross-sectional view of the electric driver drill 1 according to the embodiment. FIG. 11 is an exploded perspective view of a rear portion of the power transmission assembly 3 according to the present embodiment. FIG. 12 is an exploded perspective view of a front portion of the power transmission assembly 3 and the output assembly 60 according to the present embodiment.

As shown in FIGS. 6 to 8, for example, the casing 200 includes a bracket 210, a gear case 220, and a gear housing 230. The gear case 220 is located in front of the bracket 210. The gear housing 230 is located in front of the gear case 220. The change ring 59 is located in front of the gear housing 230.

As shown in FIG. 11, for example, the bracket 210 includes an annular portion 211 and protrusions 212. The protrusions 212 protrude radially outward from the outer surface of the annular portion 211. The multiple protrusions 212 are located circumferentially at intervals. Each protrusion 212 has a screw hole.

The gear case 220 includes an annular portion 221 and protrusions 222. The protrusions 222 protrude radially outward from the outer surface of the annular portion 221. The multiple protrusions 222 are located circumferentially at intervals. Each protrusion 222 has a screw hole.

As shown in FIG. 12, for example, the gear housing 230 includes an outer cylinder 231 and protrusions 232. The protrusions 232 protrude radially outward from the outer surface of the outer cylinder 231. The multiple protrusions 232 are located circumferentially at intervals. Each protrusion 232 has a screw hole.

The bracket 210, the gear case 220, and the gear housing 230 are fastened with screws 240 placed through the screw holes in the protrusions 222, 212, and 232.

The gear housing 230 includes recesses 233, a protruding portion 234, protrusions 241, and protrusions 242. The recesses 233 are located on the outer surface of the outer cylinder 231. The protruding portion 234 is located in an upper portion of the outer cylinder 231. The protrusions 241 protrude radially outward from the outer surface of the outer cylinder 231. The protrusions 242 are located in a lower portion of the outer cylinder 231.

The recesses 233 at least partially receive a side handle (not shown). The protrusions 241 protrude radially outward from the protrusions 232. Each protrusion 241 has a screw hole. The two protrusions 242 are located in the lateral direction in the lower portion of the outer cylinder 231. The left protrusion 242 has a lower part bent leftward. The right protrusion 242 has a lower part bent rightward.

As shown in FIGS. 1 to 5, the casing 200 is at least partially placed in the body housing 120 through the front opening in the body housing 120. The casing 200 is at least partially located in front of the body housing 120. In this embodiment, the bracket 210, the gear case 220, and the rear of the gear housing 230 are accommodated in the body housing 120. The protrusions 242 are in contact with the inner surface of the body housing 120. The body housing 120 and the casing 200 are thus less likely to separate from each other.

The body housing 120 has protrusions 150 protruding radially outward from the outer surface of the body housing 120. The multiple (four) protrusions 150 are located circumferentially at intervals. Each protrusion 150 has a screw hole. The body housing 120 and the casing 200 are fastened with the screws 6B placed through the screw holes in the protrusions 150 and 241.

The gear housing 230 has the protruding portion 234 in front of the speed switch lever 28. The speed switch lever 28 has a front portion 28F facing the protruding portion 234. The protruding portion 234 has a hole 234M in its rear surface. The front portion 28F of the speed switch lever 28 can be received in the hole 234M in the rear surface of the protruding portion 234.

The spindle 61 has its front end located in front of the change ring 59.

Overview of Internal Structure of Electric Driver Drill

As shown in FIG. 9, for example, the switch body 17B is located in the upper portion of the grip housing 110. The switch body 17B is connected to the trigger 17A. In response to the trigger 17A being pulled rearward, the switch body 17B outputs an operation signal for rotating the motor 10 to the controller 4. In response to the trigger 17A being operated, the battery pack 7 powers the motor 10 to rotate the motor 10. The motor 10 is rotated in response to the operation signal output from the switch body 17B.

The controller 4 is located in a lower portion of the battery mount 2. The controller 4 includes a control circuit board for rotating the motor 10. The controller 4 outputs a control signal for rotating the motor 10 in response to the operation signal output from the switch body 17B.

The motor 10 is accommodated in the body housing 120. The motor 10 has a rotation axis extending in the front-rear direction. The rotation axis of the motor 10 corresponds to the rotation axis AX of the spindle 61. The operator operates the trigger switch 17 to activate the motor 10. The operator operates the forward-reverse switch lever 18 to switch the rotation direction of the motor 10.

The motor 10 is an inner-rotor brushless motor. The motor 10 includes a cylindrical stator 11, a rotor 12, and a rotor shaft 13. The rotor 12 is located inside the stator 11. The rotor shaft 13 is located inside the rotor 12 and fixed to the rotor 12.

The stator 11 includes a stator core 11A, a front insulator 11B, a rear insulator 11C, multiple coils 11D, a sensor circuit board 11E, and a connector 11F. The stator core 11A includes multiple steel plates stacked on one another. The front insulator 11B is located in front of the stator core 11A. The rear insulator 11C is located behind the stator core 11A. The coils 11D are wound around the stator core 11A with the front insulator 11B and the rear insulator 11C in between. The sensor circuit board 11E is attached to the front insulator 11B. The connector 11F is supported by the front insulator 11B. The sensor circuit board 11E includes multiple rotation detecting elements to detect rotation of the rotor 12. The connector 11F connects the coils 11D with one another. The connector 11F is connected to the controller 4 with lead wires.

The rotor 12 includes a cylindrical rotor core 12A and multiple permanent magnets 12B. The rotor core 12A surrounds the rotor shaft 13. The permanent magnets 12B are held by the rotor core 12A.

The rotor shaft 13 rotates as the rotor 12 rotates. The rotation axis of the rotor shaft 13 corresponds to the rotation axis AX of the spindle 61. The rotor shaft 13 has a front portion rotatably supported by a bearing 14. The rotor shaft 13 has a rear portion rotatably supported by a bearing 15.

A centrifugal fan 16 is mounted on the rotor shaft 13. The centrifugal fan 16 is mounted on a part of the rotor shaft 13 between the bearing 15 and the stator 11. The outlets 140 are located in parts around the periphery of the centrifugal fan 16. As the rotor shaft 13 rotates and the centrifugal fan 16 rotates, air outside the body housing 120 flows into the internal space of the body housing 120 through the inlets 130. Air in the internal space of the body housing 120 flows out of the body housing 120 through the outlets 140.

A pinion gear 21S is located at the front end of the rotor shaft 13. The rotor shaft 13 is connected to the power transmission assembly 3 via the pinion gear 21S.

The power transmission assembly 3 includes a reduction assembly 20, a vibration assembly 30, a clutch assembly 40, and a mode switch assembly 50.

The reduction assembly 20 reduces the rotation of the rotor shaft 13 and rotates the spindle 61 at a lower rotational speed than the rotor shaft 13. The operator operates the reduction assembly 20 by operating the speed switch lever 28.

The vibration assembly 30 vibrates the spindle 61 in the axial direction.

The clutch assembly 40 disables transmission of a rotational force from the motor 10 to the spindle 61 in response to the rotational load on the spindle 61 reaching the release value.

The mode switch assembly 50 changes the operation mode of the electric driver drill 1. The operator operates the mode switch assembly 50 by operating the change ring 59 to adjust at least either the clutch assembly 40 or the vibration assembly 30.

The change ring 59 is rotatable about the rotation axis AX. The change ring 59 is operated in the rotation direction to switch the operation mode between the clutch mode and the nonclutch mode. In the clutch mode, the clutch assembly 40 operates. In the nonclutch mode, the clutch assembly 40 does not operate. The change ring 59 is operated in the rotation direction to adjust at least either the clutch assembly 40 or the vibration assembly 30.

In the clutch mode, the change ring 59 is operated in the rotation direction to adjust the clutch assembly 40. The adjustment of the clutch assembly 40 includes adjustment of the release value for the clutch assembly 40.

In the nonclutch mode, the change ring 59 is operated in the rotation direction to adjust the vibration assembly 30. The adjustment of the vibration assembly 30 includes adjustment performed by either vibrating or not vibrating the spindle 61. In the nonclutch mode, the change ring 59 is operated in the rotation direction to switch the operation mode between the vibration drill mode and the drill mode. In the vibration drill mode, the vibration assembly 30 operates. In the drill mode, the vibration assembly 30 does not operate.

The output assembly 60 holding a tip tool is rotated with a rotational force output from the motor 10 and transmitted through the power transmission assembly 3.

Components of Power Transmission Assembly and Output Assembly

As shown in FIGS. 9 to 12, for example, the casing 200 includes the bracket 210, the gear case 220, and the gear housing 230.

The bracket 210 includes the annular portion 211, the protrusions 212, a disk 213, a hole 214, slits 215, and a groove 216.

The annular portion 211 surrounds the rotation axis AX. The protrusions 212 protrude radially outward from the outer surface of the annular portion 211. The disk 213 is connected to the annular portion 211 to cover a rear opening in the annular portion 211. The hole 214 is located in the center of the disk 213. The slits 215 are located in the annular portion 211. The slits 215 extend in the axial direction. The multiple slits 215 are located circumferentially at intervals. The groove 216 is located in an upper portion of the annular portion 211. The groove 216 extends in the front-rear direction.

The gear case 220 includes the annular portion 221, the protrusions 222, ribs 223, a protruding portion 224, guide grooves 225, and a slit 226.

The annular portion 211 surrounds the rotation axis AX. The protrusions 222 protrude radially outward from the outer surface of the annular portion 221. The ribs 223 are located on the front surface of the annular portion 221. The ribs 223 are arc-shaped in a plane orthogonal to the rotation axis AX. The multiple ribs 223 are located circumferentially at intervals. The protruding portion 224 protrudes radially outward from the outer surface of one of the ribs 223. The guide grooves 225 are located on the inner surface of the annular portion 221. The guide grooves 225 extend in the axial direction. The multiple guide grooves 225 are located circumferentially at intervals. The slit 226 extends frontward from the rear surface of the annular portion 221.

The gear housing 230 includes the outer cylinder 231, the protrusions 232, the recesses 233, the protruding portion 234, an inner cylinder 235, a ring 236, screw holes 237, through-holes 238, recesses 239, the protrusions 241, and the protrusions 242.

The outer cylinder 231 surrounds the rotation axis AX. The protrusions 232 protrude radially outward from the outer surface of the outer cylinder 231. The recesses 233 are located on the outer surface of the outer cylinder 231. The multiple recesses 233 are located circumferentially at intervals. The protruding portion 234 is located in an upper portion of the outer cylinder 231.

The inner cylinder 235 is located inside the outer cylinder 231. The inner cylinder 235 surrounds the rotation axis AX. The ring 236 connects the outer cylinder 231 and the inner cylinder 235. The screw holes 237 are located in the front surface of the inner cylinder 235. The through-holes 238 extend through the inner cylinder 235 from the inner to outer surfaces. The multiple through-holes 238 are located circumferentially. The recesses 239 are located on the inner surface of the outer cylinder 231. The recesses 239 extend in the front-rear direction. The multiple recesses 239 are located circumferentially. The protrusions 241 protrude radially outward from the outer surface of the outer cylinder 231. The multiple protrusions 241 are located circumferentially at intervals.

The bracket 210, the gear case 220, and the gear housing 230 are fastened with the screws 240.

As shown in FIGS. 9 to 12, for example, the reduction assembly 20 includes a first planetary gear assembly 21, a second planetary gear assembly 22, a third planetary gear assembly 23, a speed switch ring 24, a connection ring 25, and a washer 26.

The first planetary gear assembly 21 includes an internal gear 21R, a first carrier 21C, planetary gears 21P, and needle bearings 21N.

The internal gear 21R includes a ring 21Ra, protrusions 21Rb, and internal teeth 21Rc. The internal teeth 21Rc are located on the inner surface of the ring 21Ra. The ring 21Ra surrounds the rotation axis AX. The protrusions 21Rb protrude radially outward from the outer surface of the ring 21Ra. The multiple protrusions 21Rb are located circumferentially at intervals.

The first carrier 21C includes a disk 21Ca, pins 21Cb, and external teeth 21Cc. The pins 21Cb protrude rearward from the rear surface of the disk 21Ca. The multiple pins 21Cb are located circumferentially. The first planetary gear assembly 21 includes the multiple planetary gears 21P. The pins 21Cb rotatably support the planetary gears 21P with the needle bearings 21N in between. The external teeth 21Cc are located on the outer edge of the front surface of the disk 21Ca.

The second planetary gear assembly 22 includes an internal gear 22R, a second carrier 22C, planetary gears 22P, and a sun gear 22S.

The internal gear 22R includes a ring 22Ra, external teeth 22Rb, internal teeth 22Rc, and a groove 22Rd. The ring 22Ra surrounds the rotation axis AX. The external teeth 22Rb protrude radially outward from the outer surface of the ring 22Ra. The multiple external teeth 22Rb are located circumferentially at intervals. The internal teeth 22Rc are located on the inner surface of the ring 22Ra. The groove 22Rd is located on the outer rear surface of the ring 22Ra. The groove 22Rd extends circumferentially.

The second carrier 22C includes a disk 22Ca and pins 22Cb. The pins 22Cb protrude rearward from the rear surface of the disk 22Ca. The multiple pins 22Cb are located circumferentially. The second planetary gear assembly 22 includes the multiple planetary gears 22P. The pins 22Cb rotatably support the planetary gears 22P. The sun gear 22S is located in front of the first carrier 21C. The sun gear 22S has a smaller diameter than the first carrier 21C. The sun gear 22S is integral with the first carrier 21C. The sun gear 22S and the first carrier 21C rotate together.

The third planetary gear assembly 23 includes an internal gear 23R, a third carrier 23C, planetary gears 23P, and a sun gear 23S.

The internal gear 23R includes a ring 23Ra, clutch cams 23Rb, internal teeth 23Rc, and protrusions 23Rd. The ring 23Ra surrounds the rotation axis AX. The clutch cams 23Rb protrude frontward from the front surface of the ring 23Ra. The multiple clutch cams 23Rb are located circumferentially at intervals. The internal teeth 23Rc are located on the inner surface of the ring 23Ra. The protrusions 23Rd protrude radially outward from the outer surface of the ring 23Ra. The multiple protrusions 23Rd are located circumferentially at intervals. The clutch cams 23Rb and the protrusions 23Rd are located at circumferentially different positions.

The third carrier 23C includes a disk 23Ca, pins 23Cb, and protrusions 23Cc. The pins 23Cb protrude rearward from the rear surface of the disk 23Ca. The multiple pins 23Cb are located circumferentially. The third planetary gear assembly 23 includes the multiple planetary gears 23P. The pins 23Cb rotatably support the planetary gears 23P. The protrusions 23Cc protrude frontward from the front surface of the disk 23Ca. The multiple protrusions 23Cc are located circumferentially at intervals. The protrusions 23Cc are arc-shaped in a plane orthogonal to the rotation axis AX. The sun gear 23S is located at least partially in front of the second carrier 22C. The sun gear 23S has a smaller diameter than the second carrier 22C. The sun gear 23S is integral with the second carrier 22C. The sun gear 23S and the second carrier 22C rotate together.

The speed switch ring 24 includes a ring 24A, a joint 24B, protrusions 24C, a projection 24D, a projection 24E, and two pins, or right and left pins 24F.

The ring 24A surrounds the rotation axis AX. The joint 24B extends rearward from the ring 24A. The protrusions 24C at least partially protrude radially outward from the outer surface of the ring 24A. The protrusions 24C at least partially protrude rearward from the rear surface of the ring 24A. The projection 24D protrudes radially outward from the rear of the joint 24B. The projection 24E protrudes rearward from the rear of the joint 24B. The pins 24F are received in holes in the right and left parts of the ring 24A.

The connection ring 25 includes a ring 25A, internal teeth 25B, and protrusions 25C.

The ring 25A surrounds the rotation axis AX. The internal teeth 25B are located on the inner surface of the ring 25A. The multiple internal teeth 25B are located circumferentially at intervals. The protrusions 25C protrude radially outward from the outer surface of the ring 25A. The multiple protrusions 25C are located circumferentially at intervals.

The washer 26 surrounds the rotation axis AX. The washer 26 is located between the disk 213 in the bracket 210 and the planetary gears 21P in the axial direction.

As shown in FIGS. 9 to 12, for example, the vibration assembly 30 includes a first cam 31, a second cam 32, a vibration switch lever 33, a washer 34, coil springs 35, and pins 36.

The first cam 31 includes a ring 31A and cam teeth 31B. The ring 31A surrounds the rotation axis AX. The cam teeth 31B are located on the rear surface of the ring 31A.

The second cam 32 includes a ring 32A, cam teeth 32B, and tabs 32C. The ring 32A surrounds the rotation axis AX. The cam teeth 32B are located on the front surface of the ring 32A. The tabs 32C are located on the rear surface of the ring 32A. The tabs 32C protrude rearward from the rear surface of the second cam 32. The multiple tabs 32C are located circumferentially.

The vibration switch lever 33 includes bodies 33A, grooves 33B, protruding portions 33C, and tabs 33D. The three bodies 33A surround the rotation axis AX. The bodies 33A are arc-shaped in a plane orthogonal to the rotation axis AX. Each groove 33B extends rearward from the front surface of the corresponding body 33A. The openings in the grooves 33B are arc-shaped in a plane orthogonal to the rotation axis AX. The protruding portions 33C are located inside the grooves 33B. The protruding portions 33C protrude frontward. Each tab 33D protrudes radially inward from the inner surface of the corresponding body 33A.

The washer 34 surrounds the rotation axis AX.

The coil springs 35 are located behind the vibration switch lever 33 and the washer 34. The coil springs 35 generate an elastic force for moving the vibration switch lever 33 forward.

The pins 36 support the coil springs 35. The pins 36 are stepped pins each having a step 36A. Each pin 36 includes a larger-diameter portion and a smaller-diameter portion. The larger-diameter portion is located frontward from the step 36A. The smaller-diameter portion is located rearward from the step 36A.

The vibration assembly 30 includes balls 37, a first holder 38, and a second holder 39.

The multiple balls 37 surround the rotation axis AX.

The first holder 38 surrounds the rotation axis AX. The first holder 38 has a curved rear surface. The first holder 38 holds the balls 37 on its curved rear surface.

The second holder 39 includes a ring 39A, protrusions 39B, and recesses 39C. The ring 39A surrounds the rotation axis AX. The protrusions 39B protrude radially outward from the outer surface of the ring 39A. The multiple protrusions 39B are located circumferentially at intervals. Each recess 39C is located between the circumferentially adjacent protrusions 39B. The second holder 39 has a curved front surface 39D. The second holder 39 holds the balls 37 on its curved front surface 39D.

As shown in FIGS. 9 to 12, for example, the clutch assembly 40 includes a clutch switch ring 41, a spring holder 43, coil springs 44, a washer 45, clutch pin sleeves 46, and clutch pins 47.

The clutch switch ring 41 includes a ring 41A, an internal threaded groove 41B, a lock lever holder 41C, and an arc plate 41D. The ring 41A surrounds the rotation axis AX. The internal threaded groove 41B is located on the inner surface of the ring 41A. The lock lever holder 41C is located in an upper portion of the ring 41A. The lock lever holder 41C includes a first projection 41Ca and a second projection 41Cb. The arc plate 41D is located on the lower front surface of the ring 41A. The arc plate 41D is arc-shaped in a plane orthogonal to the rotation axis AX.

The spring holder 43 includes an annular portion 43A, an external threaded groove 43B, a support plate 43C, spring holding members 43D, and ribs 43E. The annular portion 43A surrounds the rotation axis AX. The external threaded groove 43B is located on the outer surface of the annular portion 43A. The support plate 43C is located at the rear of the annular portion 43A. The support plate 43C has an outer edge located radially outward from the outer surface of the annular portion 43A. The spring holding members 43D are located on the rear surface of the support plate 43C. The spring holding members 43D are cylinders. The spring holding members 43D protrude rearward from the rear surface of the support plate 43C. The multiple spring holding members 43D are located circumferentially at intervals. The ribs 43E protrude rearward from the rear surface of the annular portion 43A.

The spring holding members 43D hold the coil springs 44.

The washer 45 includes a ring 45A, protruding portions 45B, and protruding portions 45C. The ring 45A surrounds the rotation axis AX. The protruding portions 45B protrude radially outward from the outer surface of the ring 45A. The multiple protruding portions 45B are located circumferentially at intervals. The protruding portions 45C protrude radially inward from the inner surface of the ring 45A. The multiple protruding portions 45C are located circumferentially at intervals.

The clutch pin sleeves 46 each include an annular portion 46A and protruding portions 46B. Multiple annular portions 46A surround the rotation axis AX. Each annular portion 46A includes the protruding portions 46B. Each annular portion 46A includes the protruding portions 46B on its front end. The protruding portions 46B protrude radially outward from the front end of each annular portion 46A.

The clutch pins 47 are supported by the clutch pin sleeves 46. Each clutch pin 47 has a front portion received in the annular portion 46A of the corresponding clutch pin sleeve 46. Each clutch pin 47 has a rear portion protruding rearward from the corresponding annular portion 46A with its front portion received in the corresponding annular portion 46A. The rear portion of each clutch pin 47 is spherical.

The washer 45 is located behind the coil springs 44. The clutch pins 47 are located behind the washer 45. The coil springs 44 generate an elastic force for moving the washer 45 and the clutch pins 47 rearward.

As shown in FIGS. 9 to 12, for example, the mode switch assembly 50 includes a support ring 51, a pin holder 52, lock pins 53, a drill switch ring 55, a vibration switch ring 56, a cam plate 57, a cover ring 58, and a lock lever 42.

The support ring 51 includes a ring 51A, cam projections 51B, and protrusions 51C. The ring 51A surrounds the rotation axis AX. The cam projections 51B protrude frontward from the front end of the ring 51A. The multiple cam projections 51B are located circumferentially at intervals. The protrusions 51C protrude rearward from the rear end of the ring 51A. The multiple protrusions 51C are located circumferentially at intervals.

The pin holder 52 includes a ring 52A, recesses 52B, spring holding members 52C, and pin holding members 52D. The ring 52A surrounds the rotation axis AX. The recesses 52B are located on the front end of the ring 52A. The multiple recesses 52B are located circumferentially at intervals. The spring holding members 52C partially protrude radially inward from the inner surface of the ring 52A. The spring holding members 52C partially protrude rearward. The multiple spring holding members 52C are located circumferentially at intervals. The pin holding members 52D hold the lock pins 53. The pin holding members 52D protrude radially outward from the outer surface of the ring 52A. The multiple pin holding members 52D are located circumferentially at intervals.

The lock pins 53 are cylinders extending in the front-rear direction. Each lock pin 53 has a ring groove 53A on its front end. The lock pins 53 are held by the pin holding members 52D. The pin holding members 52D engage with the grooves 53A to hold the lock pins 53.

The drill switch ring 55 includes a ring 55A, cam recesses 55B, a recess 55C, a protrusion 55D, and a protrusion 55E. The ring 55A surrounds the rotation axis AX. The cam recesses 55B are located on the rear of the ring 55A. The multiple cam recesses 55B are located circumferentially at intervals. The recess 55C is located on the front of the ring 55A. The protrusion 55D protrudes radially inward from the inner surface of the ring 55A. The protrusion 55E protrudes frontward from the front surface of the ring 55A.

The vibration switch ring 56 includes a ring 56A, recesses 56B, and recesses 56C. The ring 56A surrounds the rotation axis AX. The recesses 56B are located on the front of the ring 56A. The multiple recesses 56B are located circumferentially at intervals. The recesses 56C are located on the rear surface of the ring 56A. The multiple recesses 56C are located circumferentially at intervals.

The cam plate 57 includes a front cam plate 57A, a rear cam plate 57B, and internal threaded holes 57C. The rear cam plate 57B is located behind the front cam plate 57A. The rear cam plate 57B is integral with the front cam plate 57A. The rear cam plate 57B has a smaller outer shape than the front cam plate 57A. The internal threaded holes 57C receive screws 71.

The front cam plate 57A has a notch 57D, a notch 57E, and notches 57F. The notches 57D, 57E, and 57F are located in the rim of the front cam plate 57A. The front cam plate 57A has the single notch 57D, the single notch 57E, and the multiple notches 57F. In the embodiment, the front cam plate 57A has 21 notches 57F. A leaf spring 72 is received in a part of the circumference of the front cam plate 57A. The leaf spring 72 has a middle portion 72A bent radially inward. The middle portion 72A of the leaf spring 72 is received in one of the notches 57D, 57E, and 57F.

The cover ring 58 includes a ring 58A, a protruding portion 58B, and hooks 58C. The ring 58A surrounds the rotation axis AX. The protruding portion 58B protrudes radially outward from the outer edge of the ring 58A. The hooks 58C protrude radially outward from the outer edge of the ring 58A. The cover ring 58 includes two hooks 58C.

Figure 13:
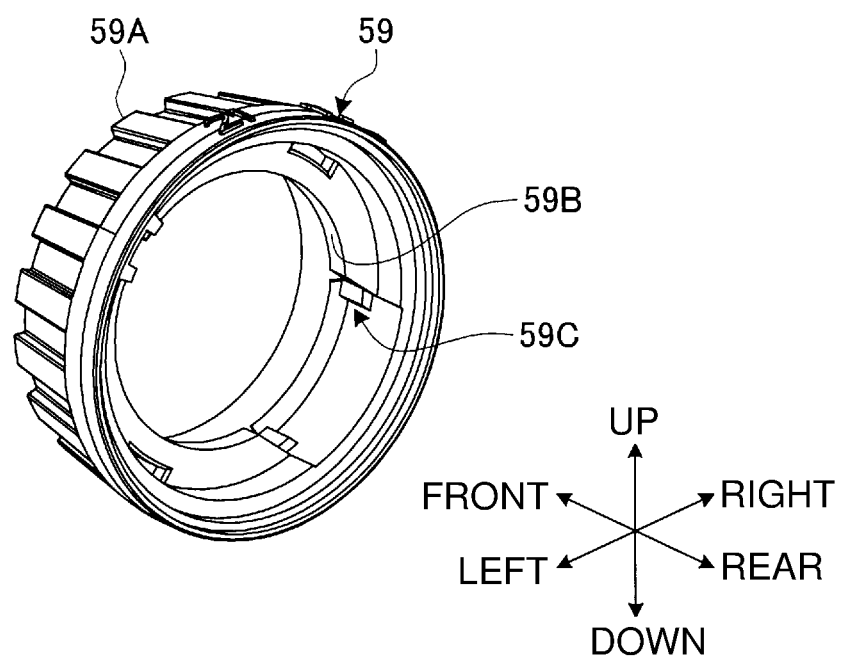
FIG. 13 is a perspective view of a change ring according to the embodiment viewed from the left rear.
Figure 14:
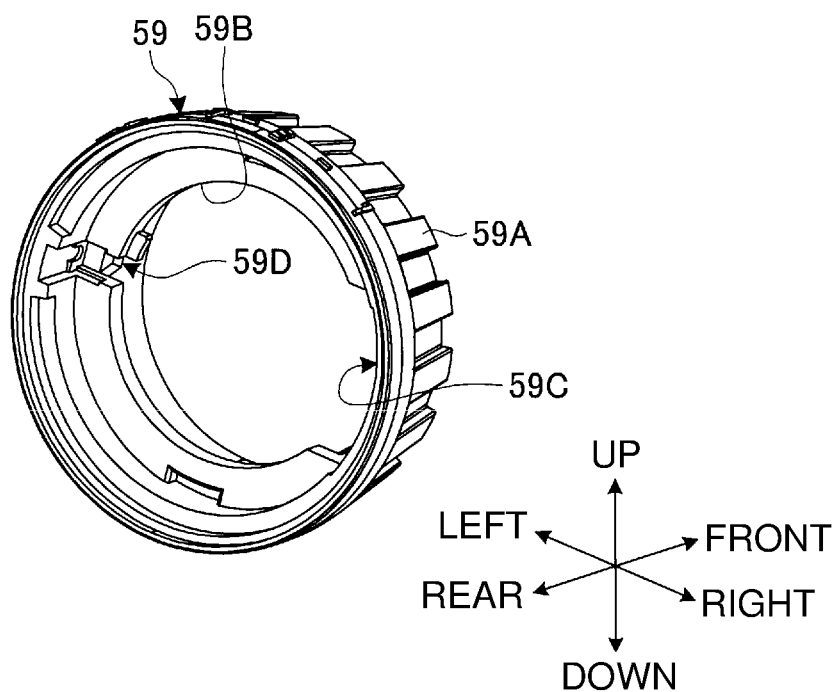
FIG. 14 is a perspective view of the change ring according to the embodiment viewed from the right rear.

FIG. 13 is a perspective view of the change ring 59 according to the embodiment viewed from the left rear. FIG. 14 is a perspective view of the change ring 59 according to the embodiment viewed from the right rear. The change ring 59 includes an operation ring 59A, a rib 59B, a first recess 59C, and a second recess 59D. The operation ring 59A surrounds the rotation axis AX. The rib 59B is located on the inner surface of the operation ring 59A. The rib 59B protrudes radially inward from the inner surface of the operation ring 59A. The first recess 59C and the second recess 59D are located on the inner surface of the operation ring 59A.

Figure 15:
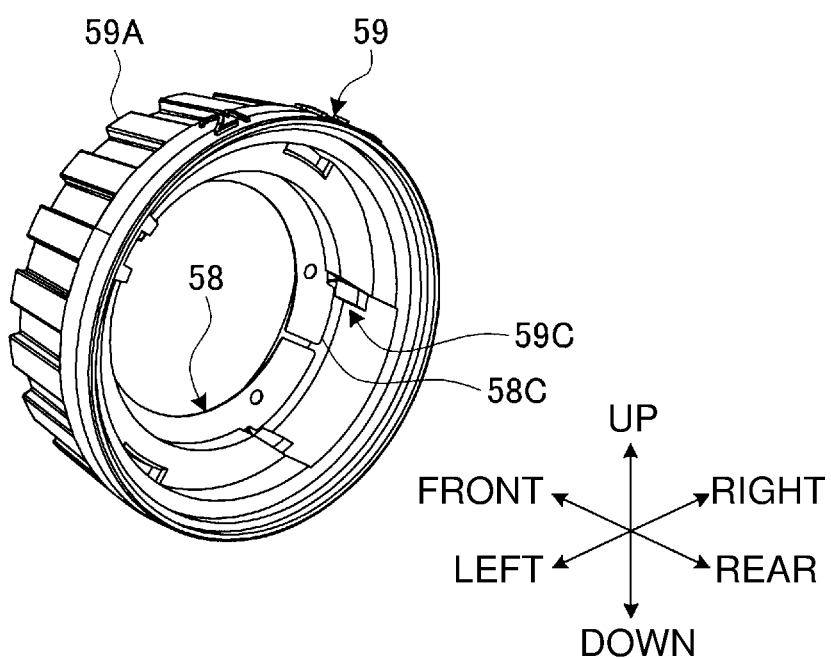
FIG. 15 is a perspective view of the change ring and a cover ring according to the embodiment viewed from the left rear.
Figure 16:
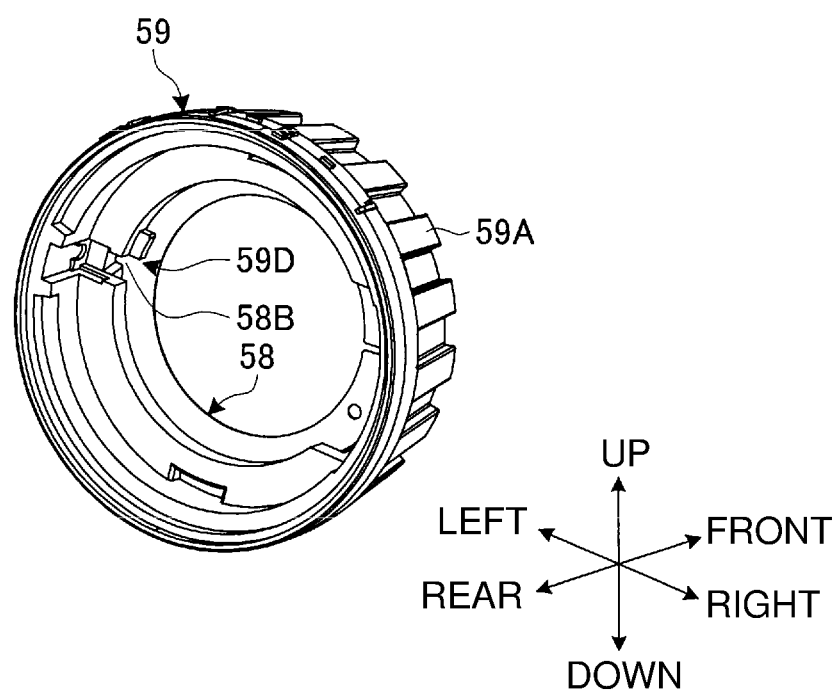
FIG. 16 is a perspective view of the change ring and the cover ring according to the embodiment viewed from the right rear.

FIG. 15 is a perspective view of the change ring 59 and the cover ring 58 according to the embodiment viewed from the left rear. FIG. 16 is a perspective view of the change ring 59 and the cover ring 58 according to the embodiment viewed from the right rear. The hooks 58C on the cover ring 58 are received in the first recess 59C on the change ring 59. The protruding portion 58B on the cover ring 58 is received in the second recess 59D on the change ring 59. This restricts the cover ring 58 from rotating relative to the change ring 59. The cover ring 58 rotates together with the change ring 59. The cover ring 58 reduces foreign matter entering the change ring 59.

The lock lever 42 includes a lever 42D and a spring 42C. The lever 42D includes a cylindrical base 42A and a follower 42B. The follower 42B is located radially inward from the base 42A. The follower 42B is in contact with the rear cam plate 57B. The spring 42C is located along the inner periphery of the base 42A.

Figure 17:
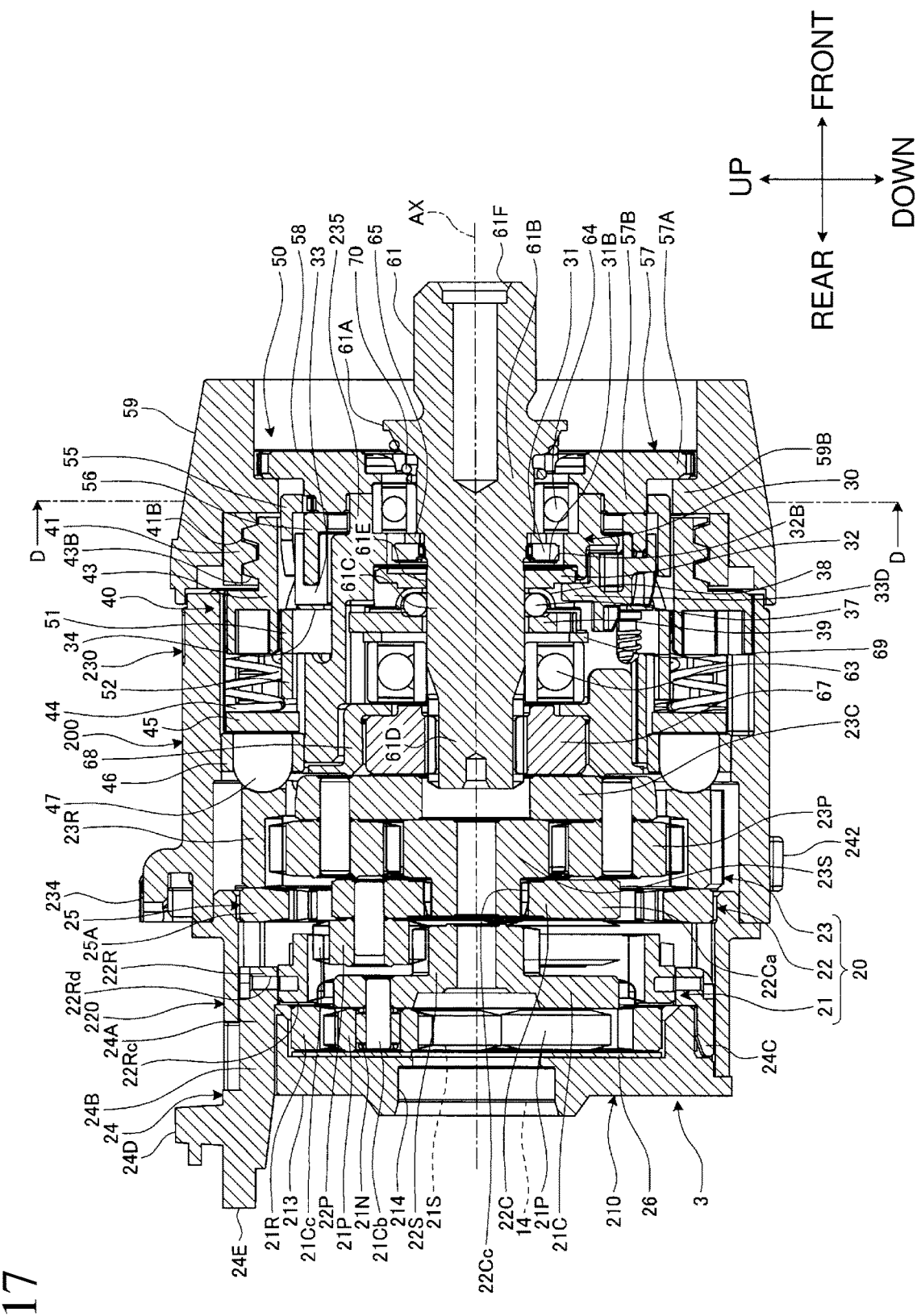
FIG. 17 is a side cross-sectional view of the power transmission assembly according to the embodiment.
Figure 18:
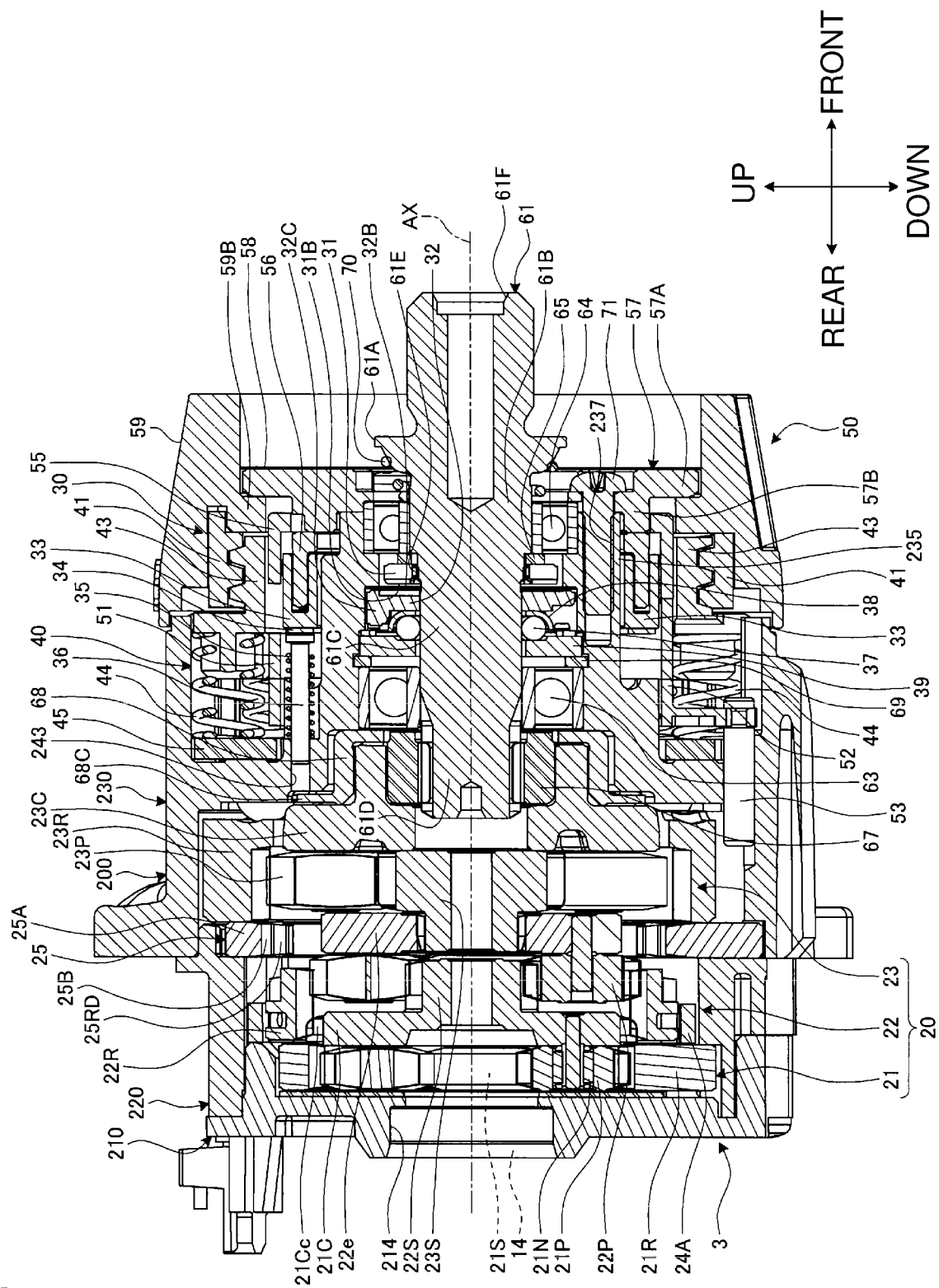
FIG. 18 is a side cross-sectional view of the power transmission assembly according to the embodiment.

FIG. 17 is a side cross-sectional view of the power transmission assembly 3 according to the embodiment, taken along line A-A as viewed in the direction indicated by arrows in FIG. 7. FIG. 18 is a side cross-sectional view of the power transmission assembly 3 according to the embodiment, taken along line B-B as viewed in the direction indicated by arrows in FIG. 7.

As shown in FIGS. 9 to 12, 17, and 18, for example, the output assembly 60 includes the spindle 61, the chuck 62, a bearing 63, and a bearing 64. FIGS. 11 and 12 do not show the chuck 62.

The spindle 61 includes a flange 61A, a front step 61B, a middle step 61C, a rear step 61D, an attachment portion 61E, and a spindle hole 61F. The front step 61B is located behind the flange 61A.

The chuck 62 holds the tip tool. The chuck 62 is connected to the front of the spindle 61. The chuck 62 and the spindle 61 are connected with a screw placed through the spindle hole 61F. The chuck 62 rotates as the spindle 61 rotates. The chuck 62 rotates while holding the tip tool.

The bearing 63 and the bearing 64 rotatably support the spindle 61 relative to the gear housing 230. The spindle 61, supported by the bearings 63 and 64, is movable in the front-rear direction.

The output assembly 60 includes a circlip 65, rollers 66, a lock cam 67, a lock ring 68, a clip 69, and a coil spring 70.

The lock cam 67 includes an annular portion 67A and protrusions 67B. The protrusions 67B protrude radially outward from the outer surface of the annular portion 67A. The lock cam 67 includes a pair of protrusions 67B. The rear step 61D of the spindle 61 is connected in a hole in the annular portion 67A of the lock cam 67 with splines.

The lock ring 68 includes an annular portion 68A, an inner flange 68B, an outer flange 68C, and protruding portions 68D. The annular portion 68A covers the lock cam 67. The inner flange 68B protrudes radially inward from the inner front end of the annular portion 68A. The outer flange 68C protrudes radially outward from the outer rear end of the annular portion 68A. The protruding portions 68D protrude radially outward from the outer surface of the annular portion 68A. The multiple protruding portions 68D are located circumferentially at intervals. Each protruding portion 68D has a front portion protruding frontward from the front surface of the annular portion 68A.

The clip 69 presses the bearing 63. The clip 69 is located in front of the bearing 63.

The coil spring 70 is located between the bearing 64 and the flange 61A. The coil spring 70 generates an elastic force for moving the spindle 61 forward.

Internal Structures of Power Transmission Assembly and Output Assembly
Reduction Assembly As shown in FIGS. 17 and 18, for example, the second planetary gear assembly 22 is located in front of the first planetary gear assembly 21. The third planetary gear assembly 23 is located in front of the second planetary gear assembly 22. The first planetary gear assembly 21 is at least partially located inside the bracket 210. The second planetary gear assembly 22 is at least partially located inside the gear case 220. The third planetary gear assembly 23 is at least partially located inside the gear housing 230. The bearing 14 is received in the hole 214 in the bracket 210.

The speed switch ring 24 at least partially surrounds the second planetary gear assembly 22. The connection ring 25 is located in front of the speed switch ring 24.

The first planetary gear assembly 21 includes the multiple planetary gears 21P, the first carrier 21C, and the internal gear 21R. The planetary gears 21P surround the pinion gear 21S. The first carrier 21C supports the planetary gears 21P. The internal gear 21R surrounds the planetary gears 21P.

The protrusions 21Rb on the internal gear 21R are received in the slits 215 in the bracket 210. This restricts rotation of the internal gear 21R.

The pins 21Cb on the first carrier 21C rotatably support the planetary gears 21P with the needle bearings 21N in between.

The second planetary gear assembly 22 includes the sun gear 22S, the planetary gears 22P, the second carrier 22C, and the internal gear 22R. The planetary gears 22P surround the sun gear 22S. The second carrier 22C supports the planetary gears 22P. The internal gear 22R surrounds the planetary gears 22P.

The internal teeth 22Rc on the internal gear 22R mesh with the external teeth 21Cc on the first carrier 21C.

The pins 22Cb on the second carrier 22C rotatably support the planetary gears 22P.

The third planetary gear assembly 23 includes the sun gear 23S, the planetary gears 23P, the third carrier 23C, and the internal gear 23R. The planetary gears 23P surround the sun gear 23S. The third carrier 23C supports the planetary gears 23P. The internal gear 23R surrounds the planetary gears 23P.

The pins 23Cb on the third carrier 23C rotatably support the planetary gears 23P.

The rotation axis of the rotor shaft 13 corresponds to the rotation axes of the first carrier 21C, the second carrier 22C, and the third carrier 23C.

The speed switch ring 24 is connected to the internal gear 22R and the speed switch lever 28. The ring 24A in the speed switch ring 24 surrounds the internal gear 22R. The protrusions 24C on the speed switch ring 24 are received in the guide grooves 225 on the gear case 220. The guide grooves 225 guide the protrusions 24C in the axial direction. The speed switch ring 24, supported by the gear case 220, is movable in the axial direction.

The projection 24E on the speed switch ring 24 is at least partially received in the groove 216 on the bracket 210. This positions the bracket 210 and the speed switch ring 24 in the rotation direction. The projection 24D on the speed switch ring 24 is connected to the speed switch lever 28.

The speed switch ring 24 is connected to the internal gear 22R with the two pins, or right and left pins 24F. The pins 24F are received in the holes in parts of the ring 24A, with the ring 24A in the speed switch ring 24 surrounding the internal gear 22R. The pins 24F each have a distal end received in the groove 22Rd on the internal gear 22R. This connects the speed switch ring 24 to the internal gear 22R.

The connection ring 25 is located in front of the speed switch ring 24. The connection ring 25 is fastened to the inner surface of gear case 220.

The ring 25A in the connection ring 25 surrounds the internal gear 22R. The internal teeth 25B on the connection ring 25 mesh with the external teeth 22Rb on the internal gear 22R. Each protrusion 25C on the connection ring 25 is located between the ribs 223 on the gear case 220. This restricts rotation of the connection ring 25.

The washer 26 is located between the planetary gears 21P in the first planetary gear assembly 21 and the disk 213 in the bracket 210.

Figure 19:
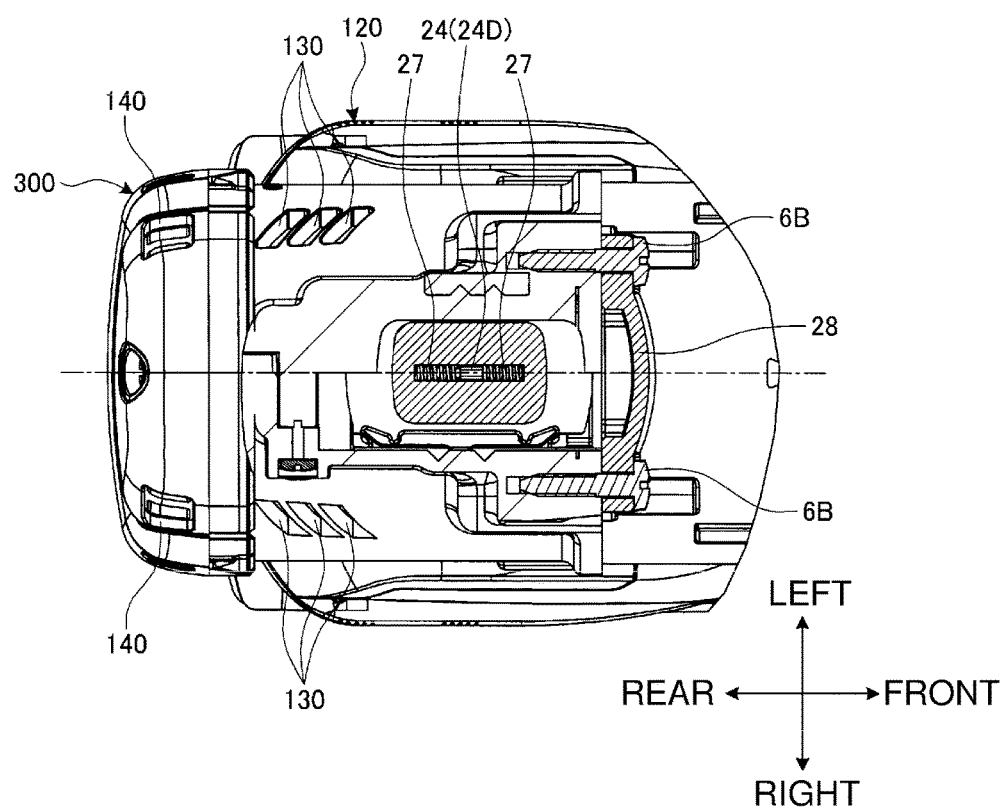
FIG. 19 is a partial cross-sectional view of the electric driver drill according to the embodiment.

FIG. 19 is a partial cross-sectional view of the electric driver drill 1 according to the embodiment, taken along line C-C as viewed in the direction indicated by arrows in FIGS. 9 and 10. As shown in FIGS. 17 to 19, the speed switch lever 28 is connected to the projection 24D on the speed switch ring 24. As shown in FIG. 19, the projection 24D receives coil springs 27 on its front and rear. The speed switch lever 28 is connected to the speed switch ring 24 with the coil springs 27 in between.

The speed switch ring 24 surrounds the internal gear 22R. The speed switch ring 24 is connected to the speed switch lever 28 and the internal gear 22R. The speed switch lever 28 is connected to the internal gear 22R via the speed switch ring 24. The speed switch ring 24, supported by the gear case 220, is movable in the front-rear direction.

As the speed switch lever 28 is operated, the internal gear 22R moves inside the gear housing 230 in the front-rear direction. The internal gear 22R, meshing with the planetary gears 22P, is movable between a first position and a second position rearward from the first position.

The internal gear 22R at the first position is connected to the connection ring 25. The internal teeth 25B on the connection ring 25 mesh with the external teeth 22Rb on the internal gear 22R. This restricts rotation of the internal gear 22R. At the first position, the internal gear 22R meshes with the planetary gears 22P.

At the second position, the internal gear 22R is disconnected from the connection ring 25. This allows rotation of the internal gear 22R. At the second position, the internal gear 22R is connected to the first carrier 21C. At the second position, the internal teeth 22Rc on the internal gear 22R mesh with the external teeth 21Cc on the first carrier 21C. At the second position, the internal gear 22R thus meshes with both the planetary gears 22P and the first carrier 21C.

When the rotor shaft 13 rotates as rotated by the motor 10 with the internal gear 22R at the first position, the pinion gear 21S rotates and the planetary gears 21P revolve about the pinion gear 21S. The first carrier 21C and the sun gear 22S then rotate at a lower rotational speed than the rotor shaft 13. As the sun gear 22S rotates, the planetary gears 22P revolve about the sun gear 22S. The second carrier 22C and the sun gear 23S then rotate at a lower rotational speed than the first carrier 21C. When the motor 10 is rotated with the internal gear 22R at the first position, both the first planetary gear assembly 21 and the second planetary gear assembly 22 operate for rotation reduction, causing the second carrier 22C and the sun gear 23S to rotate at the first speed.

When the rotor shaft 13 rotates as rotated by the motor 10 with the internal gear 22R at the second position, the pinion gear 21S rotates and the planetary gears 21P revolve about the pinion gear 21S. The first carrier 21C and the sun gear 22S then rotate at a lower rotational speed than the rotor shaft 13. At the second position, the internal gear 22R meshes with both the planetary gears 22P and the first carrier 21C and thus rotates together with the first carrier 21C. The planetary gears 22P thus revolve at the same revolution speed as the rotational speed of the internal gear 22R. The revolving planetary gears 22P rotate the second carrier 22C and the sun gear 23S at the same rotational speed as the rotational speed of the first carrier 21C. When the motor 10 is rotated with the internal gear 22R at the second position, the first planetary gear assembly 21 operates for rotation reduction without the second planetary gear assembly 22 operating for rotation reduction, thus causing the second carrier 22C and the sun gear 23S to rotate at the second speed.

The sun gear 23S is located at least partially in front of the second carrier 22C. The disk 22Cc in the second carrier 22C has an opening 22Cc. The sun gear 23S is received at least partially in the opening 22Cc. The sun gear 23S is integral with the second carrier 22C. The sun gear 23S and the second carrier 22C rotate together. As the second carrier 22C and the sun gear 23S rotate, the planetary gears 23P revolve about the sun gear 23S. This causes the third carrier 23C to rotate. The spindle 61 in the output assembly 60 is connected to the third carrier 23C. As the third carrier 23C rotates, the spindle 61 rotates.

Vibration Assembly

As shown in FIGS. 17 and 18, the first cam 31 is located inside the inner cylinder 235. The first cam 31 surrounds the spindle 61. The first cam 31 is fixed to the spindle 61. The first cam 31 is separated from the bearing 64 by the circlip 65. The first cam 31 is pressed onto the spindle 61 and fixed to the spindle 61. The first cam 31 is fixed to the spindle 61 to be nonrotatable. The first cam 31 includes the cam teeth 31B on its rear surface.

The second cam 32 is located inside the inner cylinder 235. The second cam 32 is located behind the first cam 31. The second cam 32 surrounds the spindle 61. The second cam 32 is rotatable relative to the spindle 61. The second cam 32 can be in contact with the first cam 31. The second cam 32 includes the cam teeth 32B on its front surface. The cam teeth 32B on the front surface of the second cam 32 mesh with the cam teeth 31B on the rear surface of the first cam 31. The second cam 32 includes the tabs 32C on its rear surface.

The vibration switch lever 33 switches the operation mode between the vibration drill mode and the drill mode. In the vibration drill mode, the spindle 61 vibrates in the axial direction. In the drill mode, the spindle 61 does not vibrate in the axial direction. The vibration switch lever 33 is movable in the front-rear direction. The vibration switch lever 33 is movable in response to an operation on the change ring 59. The vibration switch lever 33 moves in the front-rear direction between an advanced position and a retracted position rearward from the advanced position to switch the operation mode between the vibration drill mode and the drill mode.

The vibration switch lever 33 is located behind the vibration switch ring 56. The vibration switch lever 33 is located outside the inner cylinder 235. The vibration switch lever 33 includes the tabs 33D protruding radially inward from the rear of the vibration switch lever 33. The tabs 33D are received in the through-holes 238 in the inner cylinder 235. The tabs 33D face the front surface of the second cam 32.

The washer 34 is located behind the vibration switch lever 33. The coil springs 35 are located behind the washer 34. The pins 36 support the coil springs 35. The pins 36 have rear portions received in holes 243 in the gear housing 230. The front ends of the coil springs 35 are in contact with the larger-diameter portions at the front of the pins 36. The coil springs 35 generate an elastic force for moving the vibration switch lever 33 forward with the washer 34 in between.

The balls 37 and the first holder 38 and the second holder 39 holding the balls 37 are located inside the inner cylinder 235. The first holder 38 is adjacent to the rear surface of the second cam 32. The second holder 39 has the protrusions 39B received in recesses on the inner surface of the inner cylinder 235 and is thus restricted from rotating. The tabs 33D on the vibration switch lever 33 are received in the recesses 39C on the second holder 39.

The change ring 59 is connected to the vibration switch lever 33 via the mode switch assembly 50. The operator operates the change ring 59 to move the vibration switch lever 33 in the front-rear direction between the advanced position and the retracted position. This switches the operation mode between the vibration drill mode and the drill mode.

The vibration drill mode includes a restricted state of rotation of the second cam 32. The drill mode corresponds to a rotatable state of the second cam 32. When the vibration switch lever 33 moves to the advanced position, the second cam 32 is restricted from rotating. When the vibration switch lever 33 moves to the retracted position, the second cam 32 becomes rotatable.

The change ring 59 is connected to the vibration switch ring 56. The vibration switch ring 56 includes the ring 56A received in the grooves 33B on the vibration switch lever 33. The vibration switch ring 56 rotates in response to an operation on the change ring 59. When the vibration switch ring 56 rotates in response to rotation of the change ring 59 operated by the operator with the vibration switch lever 33 with an elastic force from the coil springs 35, the protruding portions 33C inside the grooves 33B on the vibration switch lever 33 enter the recesses 56C on the vibration switch ring 56. This causes the vibration switch lever 33 to move to the advanced position. When the vibration switch ring 56 rotates in response to rotation of the change ring 59 operated by the operator, the protruding portions 33C inside the grooves 33B on the vibration switch lever 33 retract from the recesses 56C on the vibration switch ring 56. This causes the vibration switch lever 33 to move to the retracted position.

In the vibration drill mode, the vibration switch lever 33 at the advanced position is at least partially in contact with the second cam 32. In the embodiment, the tabs 33D on the vibration switch lever 33 at the advanced position are in contact with the tabs 32C on the second cam 32. This restricts rotation of the second cam 32. In this state, the operator presses the tip tool against a workpiece, causing the coil spring 70 to compress and move the first cam 31 rearward via the chuck 62 and the spindle 61. When the motor 10 rotates with the first cam 31 moved rearward, the spindle 61 rotates with the cam teeth 31B on the first cam 31 fixed to the spindle 61 in contact with the cam teeth 32B on the second cam 32, which is restricted from rotating. The spindle 61 thus rotates while vibrating in the axial direction.

In the drill mode, the vibration switch lever 33 at the retracted position is apart from the second cam 32. This allows rotation of the second cam 32. In this state, the operator presses the tip tool against a workpiece, causing the coil spring 70 to compress and move the first cam 31 rearward via the chuck 62 and the spindle 61. As the motor 10 rotates, the second cam 32 rotates together with the first cam 31 and the spindle 61. The spindle 61 thus rotates without vibrating in the axial direction.

In this manner, the change ring 59 is operated to move the vibration switch lever 33 to the advanced position, allowing the vibration switch lever 33 to at least partially come in contact with the second cam 32. This causes the vibration assembly 30 to change to the vibration drill mode. The change ring 59 is operated to move the vibration switch lever 33 to the retracted position to be apart from the second cam 32. This causes the vibration assembly 30 to change to the drill mode.

Clutch Assembly

Figure 20:
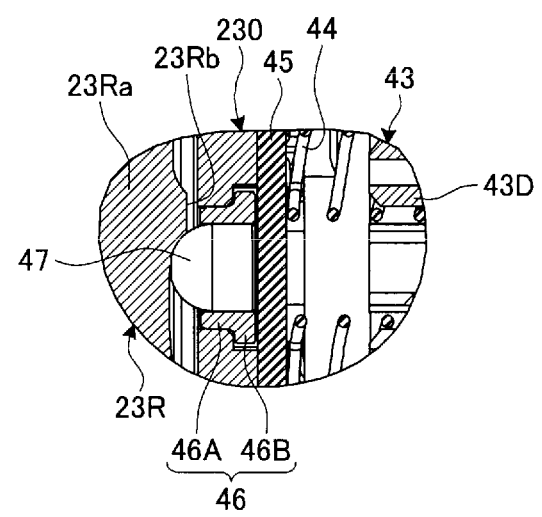
FIG. 20 is a partial cross-sectional view of the power transmission assembly according to the embodiment.
Figure 21:
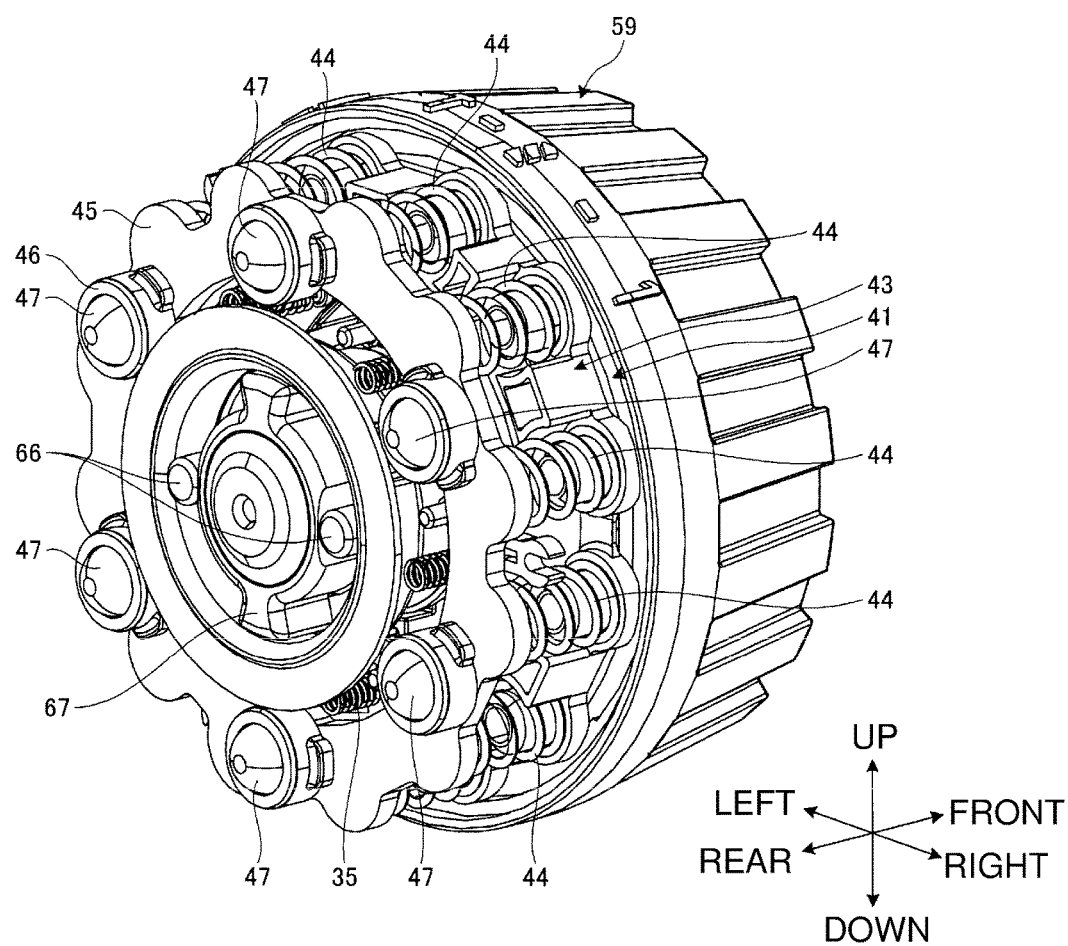
FIG. 21 is a perspective view of the power transmission assembly according to the embodiment showing its parts viewed from the rear.

FIG. 20 is a partial cross-sectional view of the power transmission assembly 3 according to the embodiment. FIG. 21 is a perspective view of the power transmission assembly 3 according to the embodiment showing its parts viewed from the rear.

A shown in FIGS. 17, 18, 20, and 21, for example, the clutch switch ring 41 surrounds the spring holder 43. The clutch switch ring 41 rotates together with the change ring 59. The change ring 59 is connected to the clutch switch ring 41 via the mode switch assembly 50. The clutch switch ring 41 is located behind the rib 59B radially inside the change ring 59. The arc plate 41D in the clutch switch ring 41 is received in the first recess 59C on the change ring 59. The arc plate 41D is received in the first recess 59C on the change ring 59 to restrict rotation of the clutch switch ring 41 relative to the change ring 59. The clutch switch ring 41 rotates together with the change ring 59. The operator operates the change ring 59 to rotate the clutch switch ring 41.

The spring holder 43 holds the coil springs 44. The spring holder 43 is located inside the clutch switch ring 41. The spring holder 43 is movable in the axial direction. The spring holder 43 has the external threaded groove 43B. The external threaded groove 43B is fitted with the internal threaded groove 41B on the clutch switch ring 41. In response to a rotation operation on the change ring 59 performed by the operator, the clutch switch ring 41 rotates to move the spring holder 43 in the front-rear direction (axial direction).

The coil springs 44 are elastic members to adjust the release value for the clutch assembly 40. The coil spring 44 is a compression coil spring. The coil spring 44 generates a larger elastic force (restoring force) as being compressed. The coil springs 44 apply an elastic force to the internal gear 23R in the third planetary gear assembly 23. This adjusts the release value for the clutch assembly 40.

The coil springs 44 are held by the spring holding members 43D in the spring holder 43. As shown in FIG. 20, the rear ends of the coil springs 44 are in contact with the washer 45. The front ends of the coil springs 44 are in contact with the support plate 43C in the spring holder 43. The coil springs 44 apply an elastic force to the internal gear 23R through the washer 45 and the clutch pins 47. The coil springs 44 generate an elastic force for urging the washer 45 and the clutch pins 47 rearward.

The spring holder 43 and the coil springs 44 are located between the outer cylinder 231 and the inner cylinder 235. The support plate 43C in the spring holder 43 is received in the recesses 239 on the inner surface of the outer cylinder 231. The support plate 43C is received in the recesses 239 to restrict rotation of the spring holder 43.

The washer 45 is located behind the coil springs 44. The washer 45 is movable in the front-rear direction. The washer 45 is rotatable. The washer 45 surrounds the inner cylinder 235. The washer 45 surrounding the inner cylinder 235 is rotatable and movable in the front-rear direction.

The clutch pin sleeves 46 are in contact with the rear surface of the washer 45. Each clutch pin 47 is located inside the annular portion 46A of the corresponding clutch pin sleeve 46.

The clutch pins 47 are located behind the washer 45. The clutch pins 47 are in contact with the front surface of the internal gear 23R in the third planetary gear assembly 23. The rear ends of the clutch pins 47 are spherical. The front ends of the clutch pins 47 are in contact with the rear surface of the washer 45. The rear ends of the clutch pins 47 can come in contact with the front surface of the internal gear 23R. The clutch cams 23Rb are located on the front surface of the internal gear 23R. The rear ends of the clutch pins 47 are engageable with the clutch cams 23Rb in the internal gear 23R.

The coil springs 44 apply an elastic force to the internal gear 23R through the washer 45 and the clutch pins 47. The coil springs 44 generate an elastic force for urging the washer 45 and the clutch pins 47 rearward.

The lock cam 67 surrounds the spindle 61. The lock ring 68 surrounds the lock cam 67. The protrusions 23Cc on the third carrier 23C are located in a space between the lock cam 67 and the lock ring 68. The rollers 66 are located between a pair of protrusions 23Cc. The inner cylinder 235 surrounds the lock ring 68. The clutch pins 47 surround the inner cylinder 235.

An elastic force from the coil springs 44 is transmitted to the internal gear 23R through the washer 45 and the clutch pins 47. The coil springs 44 generate an elastic force for pressing the clutch pins 47 against the front surface of the internal gear 23R. This restricts rotation of the internal gear 23R. In other words, the internal gear 23R is restricted from rotating with an elastic force from the coil springs 44.

The clutch pins 47 are pressed against the internal gear 23R to cause engagement between the clutch cams 23Rb in the internal gear 23R and the clutch pins 47 as shown in, for example, FIG. 20.

When the rotational load on the output assembly 60 is smaller than the elastic force applied from the coil springs 44 to the internal gear 23R, the clutch pins 47 cannot move over the clutch cams 23Rb in the internal gear 23R and remain engaged with the clutch cams 23Rb in the internal gear 23R. This restricts rotation of the internal gear 23R. When the motor 10 is rotated with the internal gear 23R being restricted from rotating, the spindle 61 rotates.

When the rotational load on the output assembly 60 exceeds the elastic force applied from the coil springs 44 to the internal gear 23R, the coil springs 44 compress and move the clutch pins 47 forward. The clutch pins 47 thus move over the clutch cams 23Rb in the internal gear 23R and are disengaged from the clutch cams 23Rb in the internal gear 23R. This allows rotation of the internal gear 23R. When the motor 10 is rotated with the internal gear 23R being rotatable, the internal gear 23R rotates without engagement, and thus without causing rotation of the spindle 61.

As described above, when the rotational load on the output assembly 60 is smaller than the elastic force applied from the coil springs 44 to the internal gear 23R, the internal gear 23R despite being in a rotatable state is restricted from rotating with the elastic force from the coil springs 44. When the rotational load on the output assembly 60 exceeds the elastic force applied from the coil springs 44 to the internal gear 23R, the internal gear 23R in a rotatable state rotates. This disables transmission of a rotational force from the motor 10 to the output assembly 60.

In response to a rotation operation on the change ring 59, the spring holder 43 moves in the front-rear direction. This changes the length (compression amount) of the coil springs 44. More specifically, the spring holder 43 moves to adjust the elastic force applied from the coil springs 44 and thus to change the elastic force applied to the internal gear 23R. The release value is thus set for disabling transmission of a rotational force to the output assembly 60.

In the clutch mode, the coil springs 44 stretch to reduce the release value for the clutch assembly 40 in the embodiment. In the clutch mode, the coil springs 44 compress to increase the release value for the clutch assembly 40.

Mode Switch Assembly

As shown in FIGS. 17 and 18, the support ring 51 is located radially inside the spring holder 43. The vibration switch lever 33 is located inside the support ring 51. The pin holder 52 is located behind the support ring 51. The pin holder 52 is movable in the front-rear direction.

The lock pins 53 are clutching-off members and are movable to switch between the clutch mode and the nonclutch mode. In the clutch mode, the clutch assembly 40 operates. In the nonclutch mode, the clutch assembly 40 does not operate.

The lock pins 53 restrict rotation of the internal gear 23R in the third planetary gear assembly 23. The lock pins 53 are held by the pin holding members 52D in the pin holder 52. The pin holding members 52D hold the front ends of the lock pins 53. The lock pins 53 move in the axial direction as the pin holder 52 moves in the axial direction. This causes the internal gear 23R in a nonrotatable state to be rotatable. This also causes the internal gear 23R in a rotatable state to be nonrotatable.

The lock pins 53 move between a rotation-permitting position and a rotation-restricting position in the axial direction. At the rotation-permitting position, the internal gear 23R is permitted to rotate. At the rotation-restricting position, the internal gear 23R is restricted from rotating. When the lock pins 53 move rearward to the rotation-restricting position, the rear ends of the lock pins 53 are received between the protrusions 23Rd on the internal gear 23R. The lock pins 53 thus restrict rotation of the internal gear 23R. When the lock pins 53 move forward to the rotation-permitting position, the lock pins 53 are removed from between the protrusions 23Rd on the internal gear 23R. The lock pins 53 are nonrotatable, and thus the internal gear 23R is rotatable.

The lock pins 53 are movable in response to an operation on the change ring 59. The change ring 59 is operated in the rotation direction to adjust at least either the clutch assembly 40 or the lock pins 53. This adjusts the lock pins 53. The adjustment of the lock pins 53 includes adjustment of the positions of the lock pins 53.

The lock pins 53 are movable between the rotation-permitting position and the rotation-restricting position in response to an operation on the change ring 59. The adjustment of the position of the lock pins 53 includes adjustment between the rotation-permitting position and the rotation-restricting position. In the clutch mode, the lock pins 53 are located at the rotation-permitting position. In the nonclutch mode, the lock pins 53 are located at the rotation-restricting position.

The drill switch ring 55 is located in front of the support ring 51. The drill switch ring 55 is located radially inside the change ring 59 and the spring holder 43.

The vibration switch ring 56 is located in front of the vibration switch lever 33. The vibration switch ring 56 is located inside the drill switch ring 55.

The drill switch ring 55 and the vibration switch ring 56 rotate together. The protrusions 55D on the drill switch ring 55 are received in the recesses 56B on the vibration switch ring 56. This restricts the drill switch ring 55 from rotating relative to the vibration switch ring 56.

The cam plate 57 is fastened to the inner cylinder 235 with the screws 71. The screws 71 are received in the screw holes 237 in the inner cylinder 235. The cam plate 57 has the rim located in front of the rib 59B on the change ring 59.

The cover ring 58 is mainly located along the rim of the front cam plate 57A in the cam plate 57. As described above, the hooks 58C on the cover ring 58 are received in the first recess 59C on the change ring 59. The protruding portion 58B on the cover ring 58 is received in the second recess 59D on the change ring 59. This restricts the cover ring 58 from rotating relative to the change ring 59. The cover ring 58 rotates together with the change ring 59. The cover ring 58 covers all or some of the notches (57D, 57E, and 57F) from the front.

The cover ring 58 reduces foreign matter entering the change ring 59 and the internal space of the casing 200 with the hooks 58C received in the first recess 59C on the change ring 59 and the protruding portion 58B received in the second recess 59D on the change ring 59. The cover ring 58 reduces entry of foreign matter through, for example, the notches (57D, 57E, and 57F).

The change ring 59 surrounds the outer circumference of the inner cylinder 235. The change ring 59 is connected to the clutch switch ring 41. The change ring 59 is rotatable about the rotation axis AX.

Figure 22:
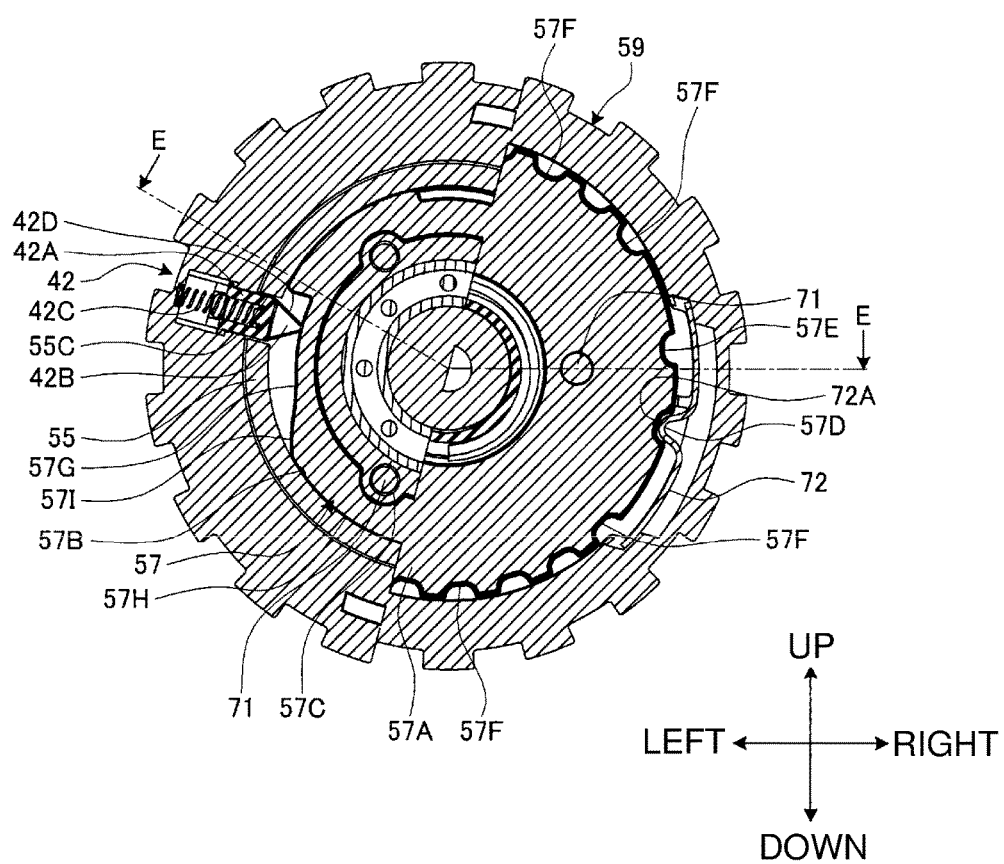
FIG. 22 is a cross-sectional view of a mode switch assembly according to the embodiment.
Figure 23:
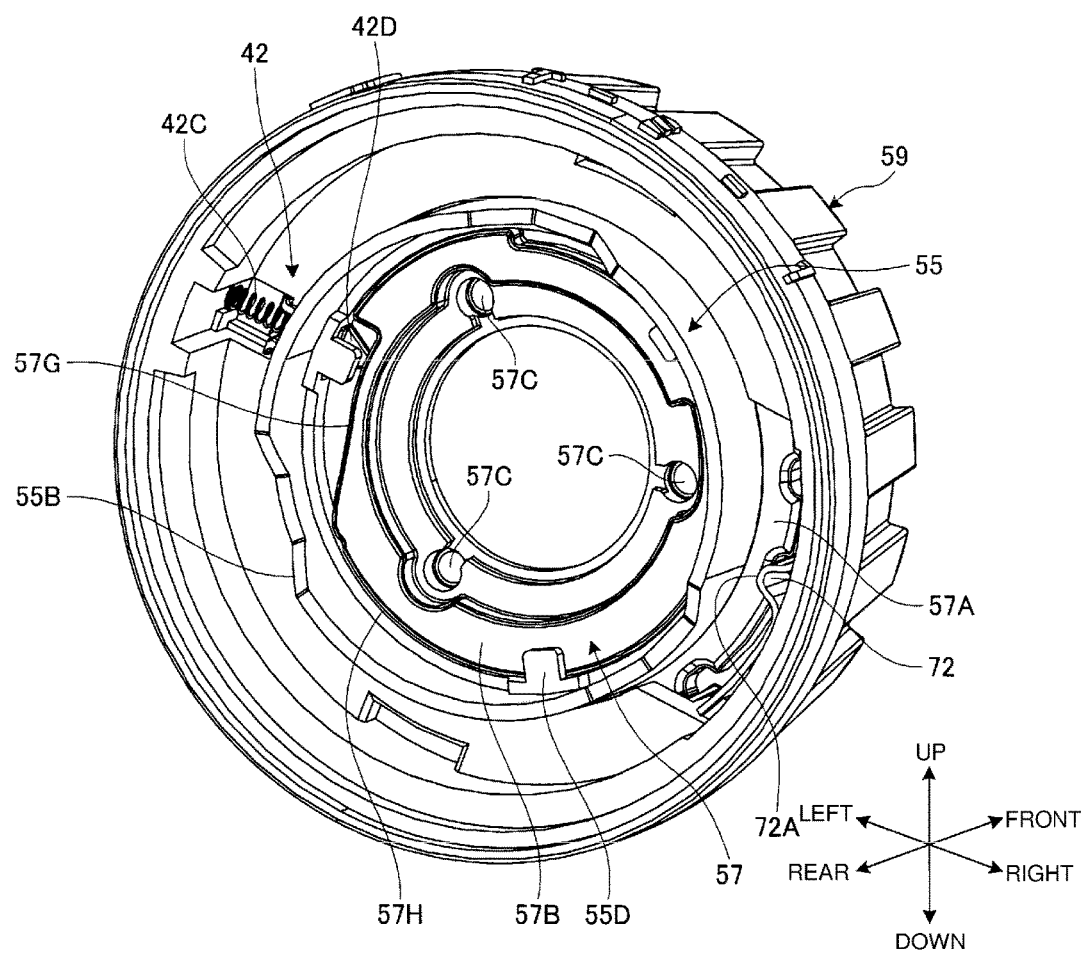
FIG. 23 is a perspective view of the mode switch assembly according to the embodiment showing its parts viewed from the rear.
Figure 24:
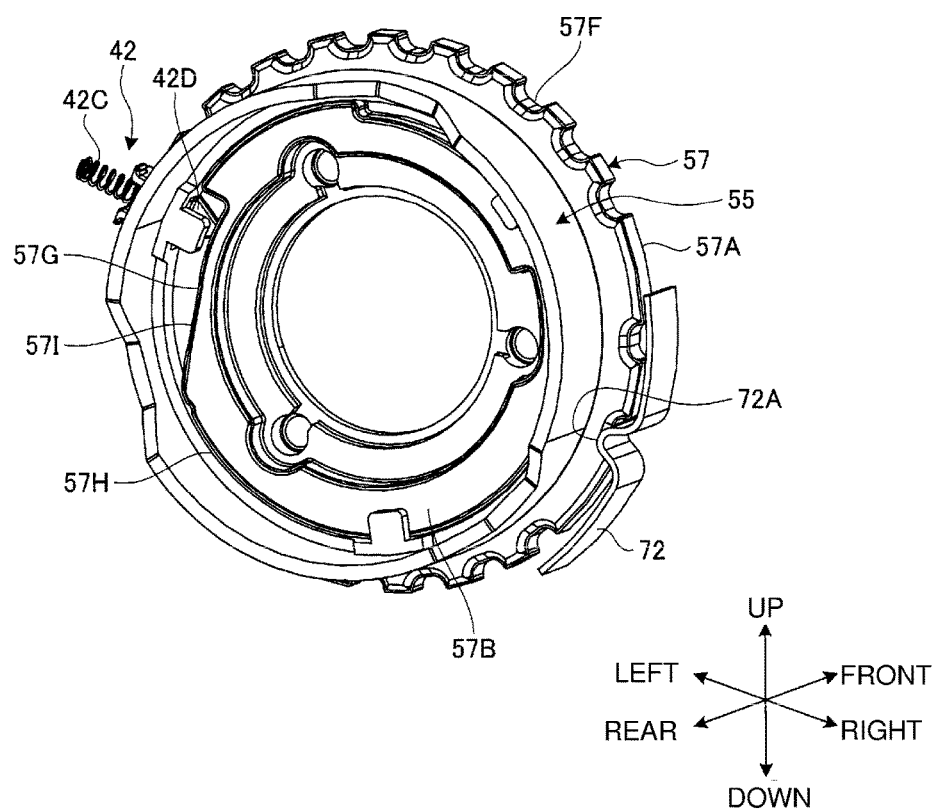
FIG. 24 is a perspective view of the mode switch assembly according to the embodiment showing its parts viewed from the rear.
Figure 25:
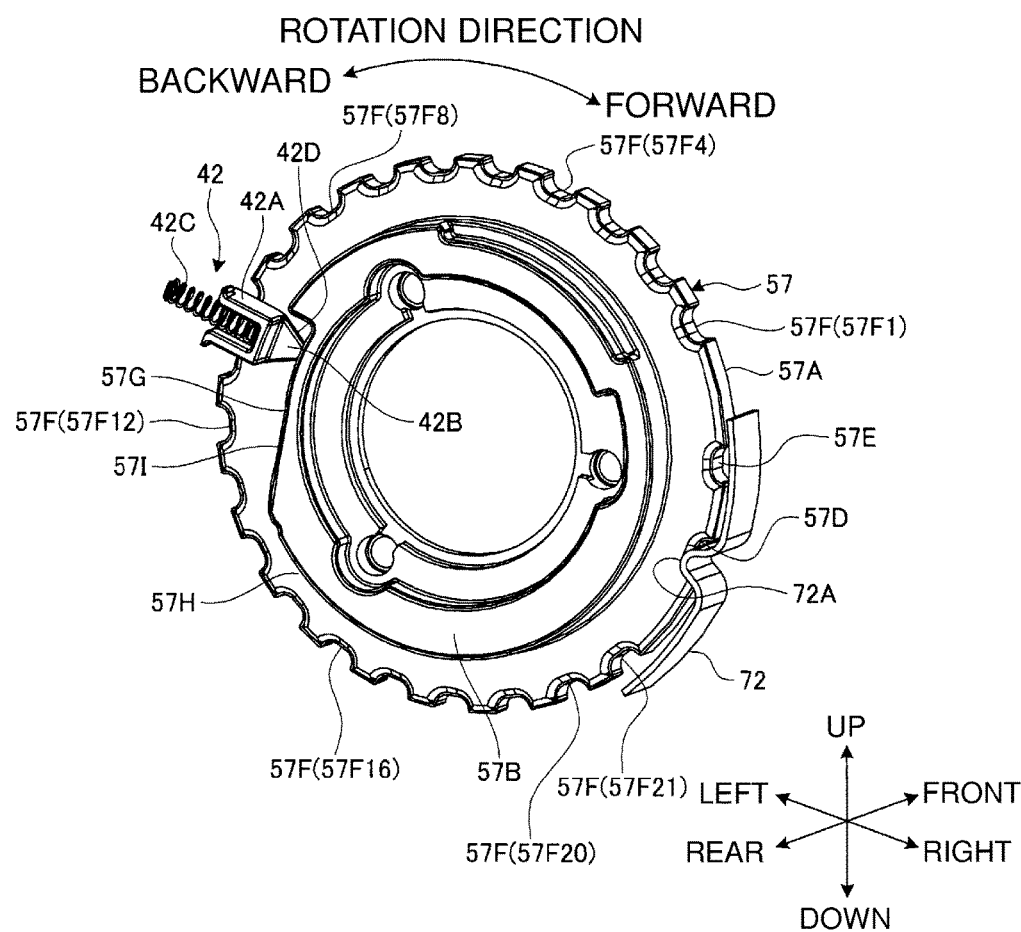
FIG. 25 is a perspective view of the mode switch assembly according to the embodiment showing its parts viewed from the rear.
Figure 26:
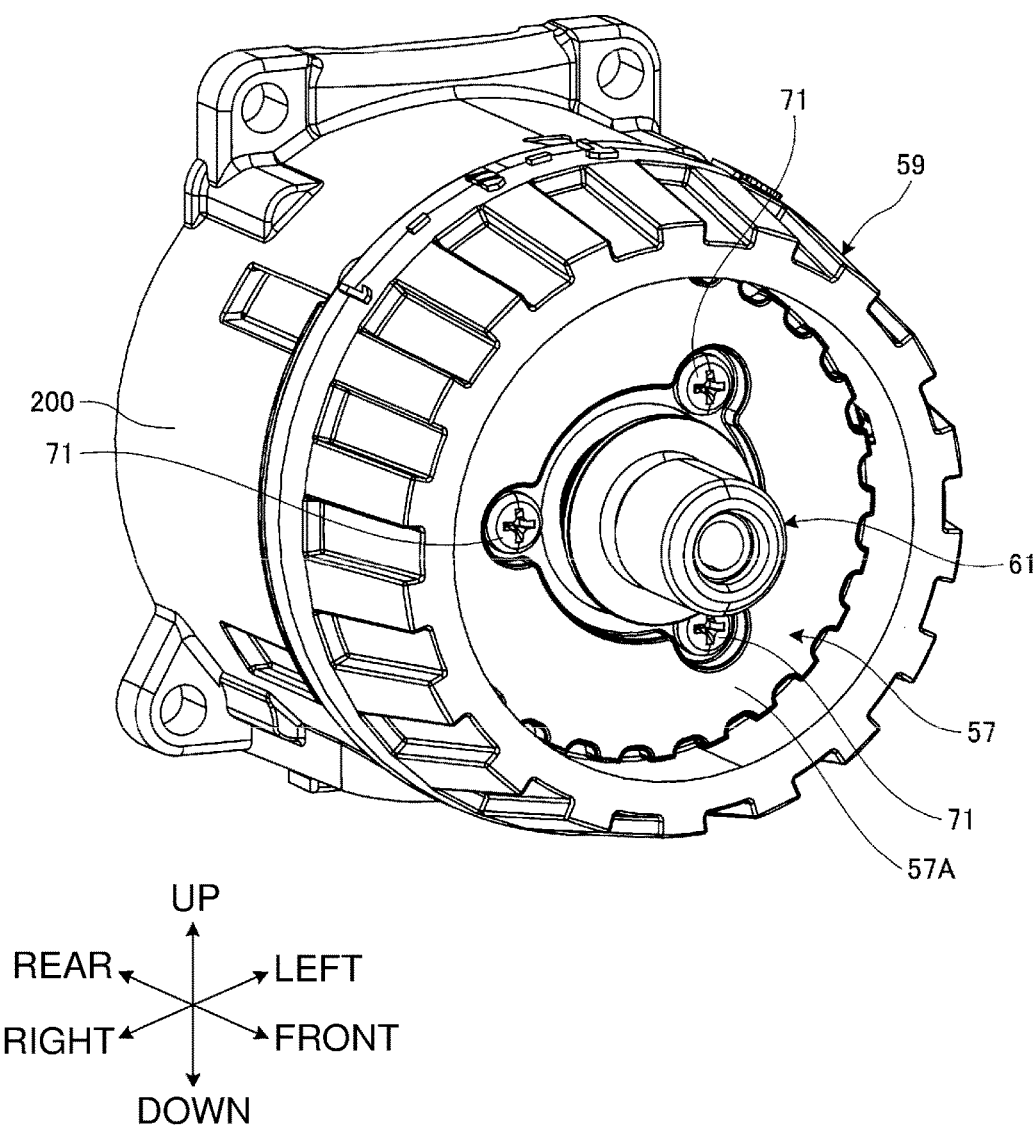
FIG. 26 is a perspective view of the mode switch assembly according to the embodiment showing its parts viewed from the front.
Figure 27:
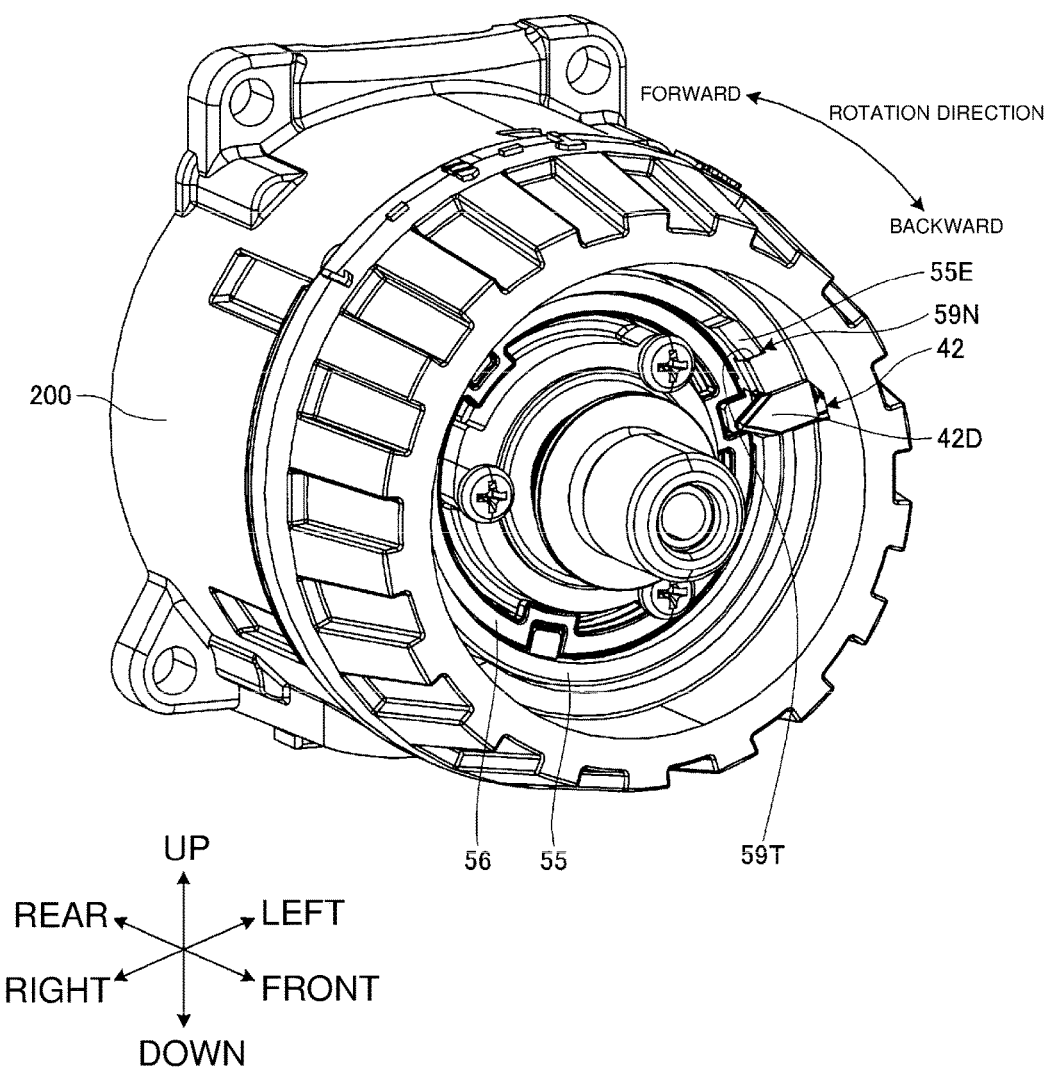
FIG. 27 is a perspective view of the mode switch assembly according to the embodiment showing its parts viewed from the front.
Figure 28:
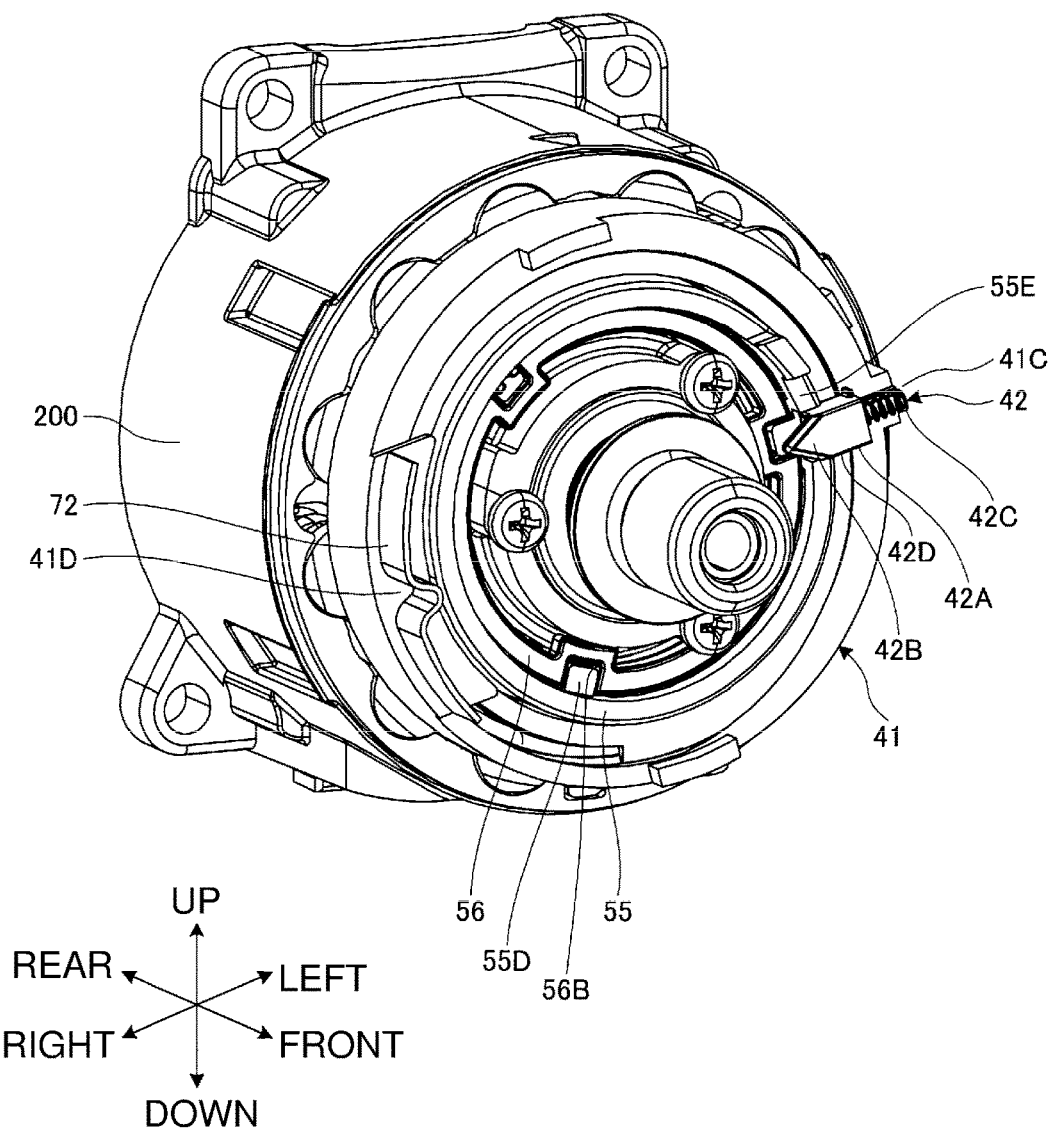
FIG. 28 is a perspective view of the mode switch assembly according to the embodiment showing its parts viewed from the front.
Figure 29:
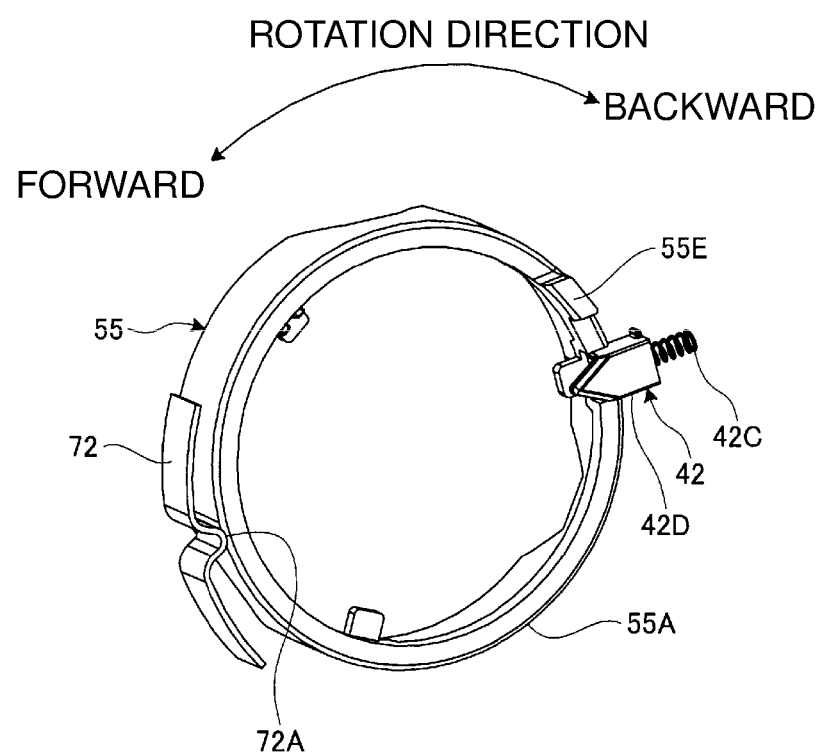
FIG. 29 is a perspective view of the mode switch assembly according to the embodiment showing its parts viewed from the front.

FIG. 22 is a cross-sectional view of the mode switch assembly 50 according to the embodiment, taken along line D-D as viewed in the direction indicated by arrows in FIG. 17. FIGS. 23 to 25 are perspective views of the mode switch assembly 50 according to the embodiment showing its parts viewed from the rear. FIGS. 26 to 29 are perspective views of the mode switch assembly 50 according to the embodiment showing its parts viewed from the front. FIG. 24 corresponds to FIG. 23 without the change ring 59. FIG. 25 corresponds to FIG. 24 without the drill switch ring 55. FIG. 27 corresponds to FIG. 26 without the cam plate 57. FIG. 28 corresponds to FIG. 27 without the change ring 59. FIG. 29 is a view of the drill switch ring 55, the lock lever 42, and the leaf spring 72.

As shown in FIGS. 22 to 29, the front cam plate 57A has the single notch 57D, the single notch 57E, and the multiple notches 57F. The middle portion 72A of the leaf spring 72 is received in at least one of the notches 57D, 57E, and 57F.

The rear cam plate 57B includes a smaller-diameter portion 57G, a larger-diameter portion 57H, and a slope 57I. The slope 57I connects the smaller-diameter portion 57G and the larger-diameter portion 57H.

The lock lever 42 is at least partially receivable in the recess 55C on the drill switch ring 55. The lock lever 42 includes the lever 42D and the spring 42C. The lever 42D is receivable in the recess 55C on the drill switch ring 55. The spring 42C generates an elastic force for moving the lever 42D radially inward. The lever 42D is in contact with the rim of the rear cam plate 57B.

The lock lever 42 is partially held by the lock lever holder 41C in the clutch switch ring 41. The lock lever 42 is partially received in a hole in the change ring 59.

The follower 42B at the inner end (tip) of the lever 42D is in contact with the rear cam plate 57B. The spring 42C generates an elastic force for moving the lever 42D radially inward. In response to rotation of the change ring 59, the lever 42D moves radially while being in contact with the rim of the rear cam plate 57B.

The drill switch ring 55 is located inside the change ring 59. The lock lever 42 switches between a synchronized state and a nonsynchronized state. In the synchronized state, the change ring 59 and the drill switch ring 55 rotate together. In the nonsynchronized state, the change ring 59 and the drill switch ring 55 do not rotate together.

The lock lever 42 is supported by the change ring 59 in a radially movable manner. The lock lever 42 includes the lever 42D and the spring 42C. The lever 42D includes the cylindrical base 42A and the follower 42B. The follower 42B is located radially inward from the base 42A. The spring 42C is located along the inner periphery of the base 42A.

The follower 42B at the inner end of the lever 42D is in contact with the rear cam plate 57B.

The cam plate 57 is fastened to the inner cylinder 235 with the screws 71. The cam plate 57 does not rotate. In response to an operation on the change ring 59 in the rotation direction, the lock lever 42 rotates together with the change ring 59. The lock lever 42 rotates together with the change ring 59 with the follower 42B in contact with the rear cam plate 57B. The lever 42D in the lock lever 42 moves radially in accordance with the circumferential position of the follower 42B in contact with the rear cam plate 57B, while the spring 42C is being compressed.

The lever 42D shifts between a received state and a removed state as the lever 42D rotates circumferentially along the rear cam plate 57B while being in contact with the rim of the rear cam plate 57B. In the received state, the lever 42D is received in the recess 55C on the drill switch ring 55. In the removed state, the lever 42D is removed from the recess 55C.

When moving radially inward, the lever 42D enters the received state of being received in the recess 55C on the drill switch ring 55. FIG. 22 shows the lever 42D in the received state. In the received state of the lever 42D, the change ring 59 and the drill switch ring 55 rotate together with the lever 42D. When moving radially outward, the lever 42D enters the removed state of being removed radially outward from the recess 55C on the drill switch ring 55. In the removed state of the lever 42D, the change ring 59 slides on the circumference of the drill switch ring 55 and does not rotate together with the drill switch ring 55.

In response to the lever 42D entering the received state, the change ring 59 and the drill switch ring 55 rotate together, or in other words, enter the synchronized state. In response to the lever 42D entering the removed state, the change ring 59 and the drill switch ring 55 do not rotate together, or in other words, enter the nonsynchronized state. The synchronized state corresponds to the received state. The nonsynchronized state corresponds to the removed state. The lock lever 42 moves radially while moving circumferentially in contact with the rim of the rear cam plate 57B. This switches the operation mode between the synchronized state (received state) and the nonsynchronized state (removed state).

In response to rotation of the change ring 59, the drill switch ring 55 rotates to move between the rotation-permitting position and the rotation-restricting position. At the rotation-permitting position, the lock pins 53 permit the internal gear 23R to rotate. At the rotation-restricting position, the lock pins 53 restrict the internal gear 23R from rotating. In response to an operation on the change ring 59 in the rotation direction in the synchronized state (received state), the lock pins 53 move between the rotation-permitting position and the rotation-restricting position.

In the clutch mode, the lock pins 53 are located at the rotation-permitting position as described above. In the nonclutch mode, the lock pins 53 are located at the rotation-restricting position. In the clutch mode, the change ring 59 and the drill switch ring 55 do not rotate together, or in other words, the change ring 59 and the drill switch ring 55 enter the nonsynchronized state (removed state). In the nonclutch mode, the change ring 59 and the drill switch ring 55 rotate together, or in other words, the change ring 59 and the drill switch ring 55 enter the synchronize state (received state).

The drill switch ring 55 is located forward from the lock lever 42 in the rotation direction. The drill switch ring 55 includes the protrusion 55E that can come in contact with at least a part of the change ring 59. The protrusion 55E protrudes frontward from the front surface of the drill switch ring 55.

The change ring 59 has a notch 59N to receive the protrusion 55E. The notch 59N is located backward from the protrusion 55E in the rotation direction and has an end face 59T that can come in contact with the protrusion 55E. In response to an operation on the change ring 59 in the forward rotation direction with the end face 59T in contact with the protrusion 55E, the drill switch ring 55 rotates forward in the rotation direction together with the change ring 59. In response to an operation on the change ring 59 in the backward rotation direction, the protrusion 55E on the drill switch ring 55 is separated from the end face 59T of the change ring 59.

Output Assembly

The spindle 61 is connected to the third carrier 23C. As the third carrier 23C rotates, the spindle 61 rotates.

The spindle 61 is rotatably supported by the bearings 63 and 64. The spindle 61, supported by the bearings 63 and 64, is movable in the front-rear direction.

The chuck 62 is connected to the front of the spindle 61. The chuck 62 holds the tip tool. The chuck 62 is connected to the front of the spindle 61. The chuck 62 rotates as the spindle 61 rotates. The chuck 62 rotates while holding the tip tool.

The bearing 64 is located outside the front step 61B of the spindle 61. The coil spring 70 is located between the bearing 64 and the flange 61A. The coil spring 70 generates an elastic force pressing the circlip 65 against the bearing 64. This moves the spindle 61 to the front position.

The lock cam 67 surrounds the spindle 61. The rear step 61D of the spindle 61 is connected in the hole in the annular portion 67A of the lock cam 67 with the splines. The spindle 61, the lock cam 67, and the third carrier 23C rotate together.

The clip 69 presses the bearing 63. The clip 69 is supported in a groove on the inner surface of the inner cylinder 235 in the gear housing 230.

Relationship Between Rotation Direction of Change Ring and Operation Modes

Figure 30:
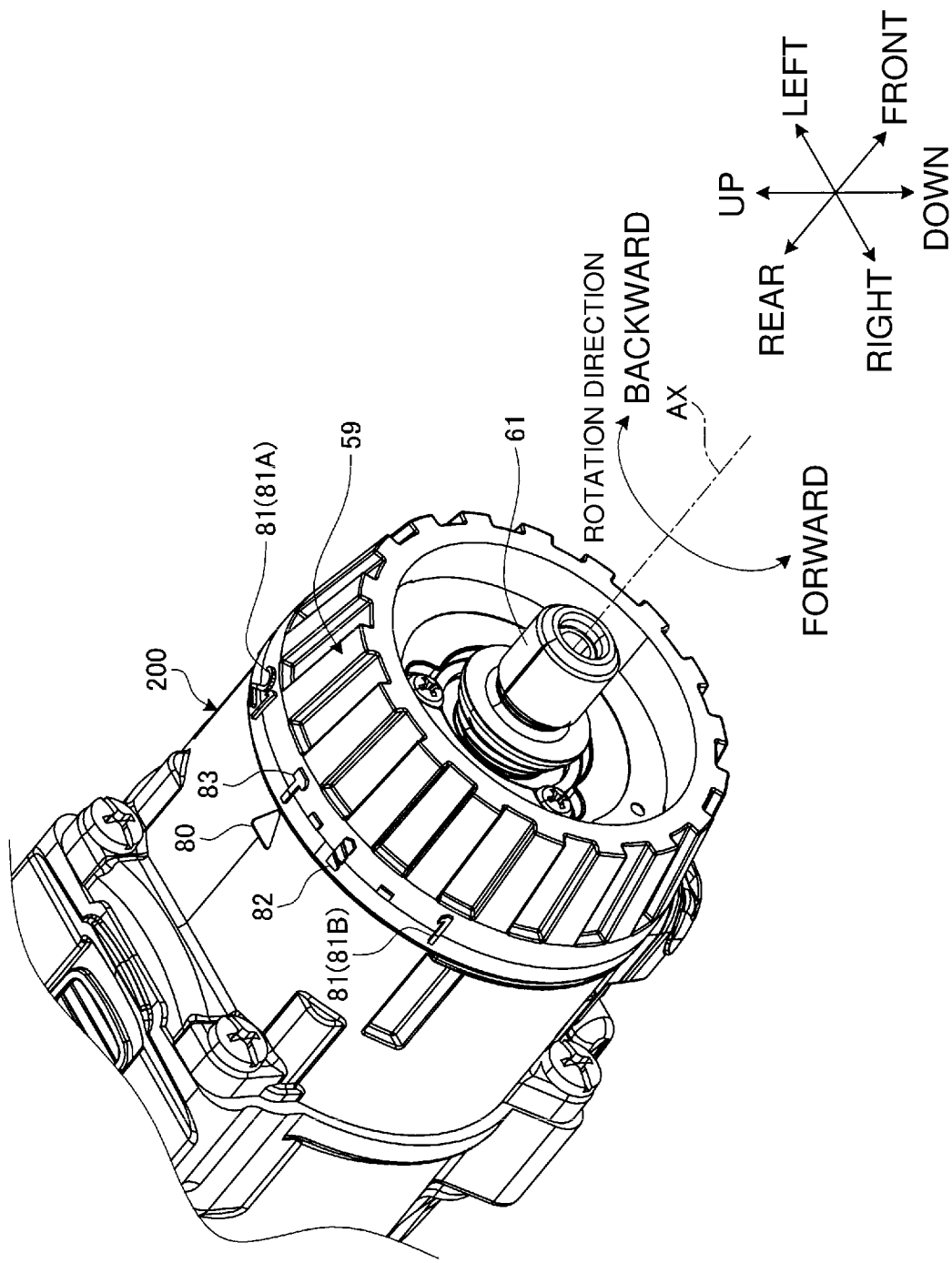
FIG. 30 is a perspective view of the change ring according to the embodiment viewed from the front.

FIG. 30 is a perspective view of the change ring 59 according to the embodiment viewed from the front. As shown in FIG. 30, the change ring 59 is marked with symbols representing the operation modes. The symbols include symbols 81 representing the clutch mode, a symbol 82 representing the drill mode, and a symbol 83 representing the vibration drill mode. The symbols 81 include a symbol 81A to set the release value to a maximum value in the clutch mode, and a symbol 81B to set the release value to a minimum value in the clutch mode. The casing 200 is marked with an indicator 80.

The operator selects the operation mode by operating the change ring 59 in the rotation direction. To set the release value to the maximum value in the clutch mode, for example, the operator operates the change ring 59 in the rotation direction to align the symbol 81A with the indicator 80. To set the release value to a minimum value in the clutch mode, the operator operates the change ring 59 in the rotation direction to align the symbol 81B with the indicator 80. To change to the drill mode, the operator operates the change ring 59 in the rotation direction to align the symbol 82 with the indicator 80. To change to the vibration drill mode, the operator operates the change ring 59 in the rotation direction to align the symbol 83 with the indicator 80.

In the embodiment, the clutch assembly 40 can be set to one of twenty-one release values. In the clutch mode, the operator can set to any one of the twenty-one values by rotating the change ring 59.

As shown in FIG. 25, for example, the front cam plate 57A has the single notch 57D, the single notch 57E, and twenty-one notches 57F in the embodiment. The notches 57F include a first notch 57F1 to a twenty-first notch 57F21. In FIG. 25, the first notch 57F1, a fourth notch 57F4, an eighth notch 57F8, a twelfth notch 57F12, a sixteenth notch 57F16, a twentieth notch 57F20, and the twenty-first notch 57F21 are indicated with reference numerals for ease of explanation.

With the middle portion 72A of the leaf spring 72 received in the notch 57D, the change ring 59 is positioned relative to the cam plate 57 in the rotation direction to allow the symbol 83 to be aligned with the indicator 80.

With the middle portion 72A of the leaf spring 72 received in the notch 57E, the change ring 59 is positioned relative to the cam plate 57 in the rotation direction to allow the symbol 82 to be aligned with the indicator 80.

With the leaf spring 72 received in the first notch 57F1, the change ring 59 is positioned relative to the cam plate 57 in the rotation direction to allow the symbol 81B to be aligned with the indicator 80. With the leaf spring 72 received in the twenty-first notch 57F21, the change ring 59 is positioned relative to the cam plate 57 in the rotation direction to allow the symbol 81A to be aligned with the indicator 80. The operator can set to any one of the twenty-one release values by rotating the change ring 59 to cause the leaf spring 72 to be sequentially received in each notch 57F.

More specifically, in response to the middle portion 72A of the leaf spring 72 being received in the notch 57D, the electric driver drill 1 is set to the drill mode. In response to the middle portion 72A of the leaf spring 72 being received in the notch 57E, the electric driver drill 1 is set to the vibration drill mode.

In response to the middle portion 72A of the leaf spring 72 being received in the notch 57F, the electric driver drill 1 is set to the clutch mode. In the clutch mode, in response to the middle portion 72A of the leaf spring 72 being received in the first notch 57F1, the release value for the clutch assembly 40 is set to the minimum value. In response to the middle portion 72A of the leaf spring 72 being received in the second notch 57F2, the release value for the clutch assembly 40 is set to a value that is higher by one value than the minimum value. In response to the middle portion 72A of the leaf spring 72 being received in the third notch 57F3, the release value for the clutch assembly 40 is set to a value that is higher by two values than the minimum value. In response to the middle portion 72A of the leaf spring 72 being received in the n-th notch 57Fn, the release value for the clutch assembly 40 is set to a value that is higher by (n−1) values than the minimum value. In response to the middle portion 72A of the leaf spring 72 being received in the twenty-first notch 57F21, the release value for the clutch assembly 40 is set to the maximum value.

Figure 31:
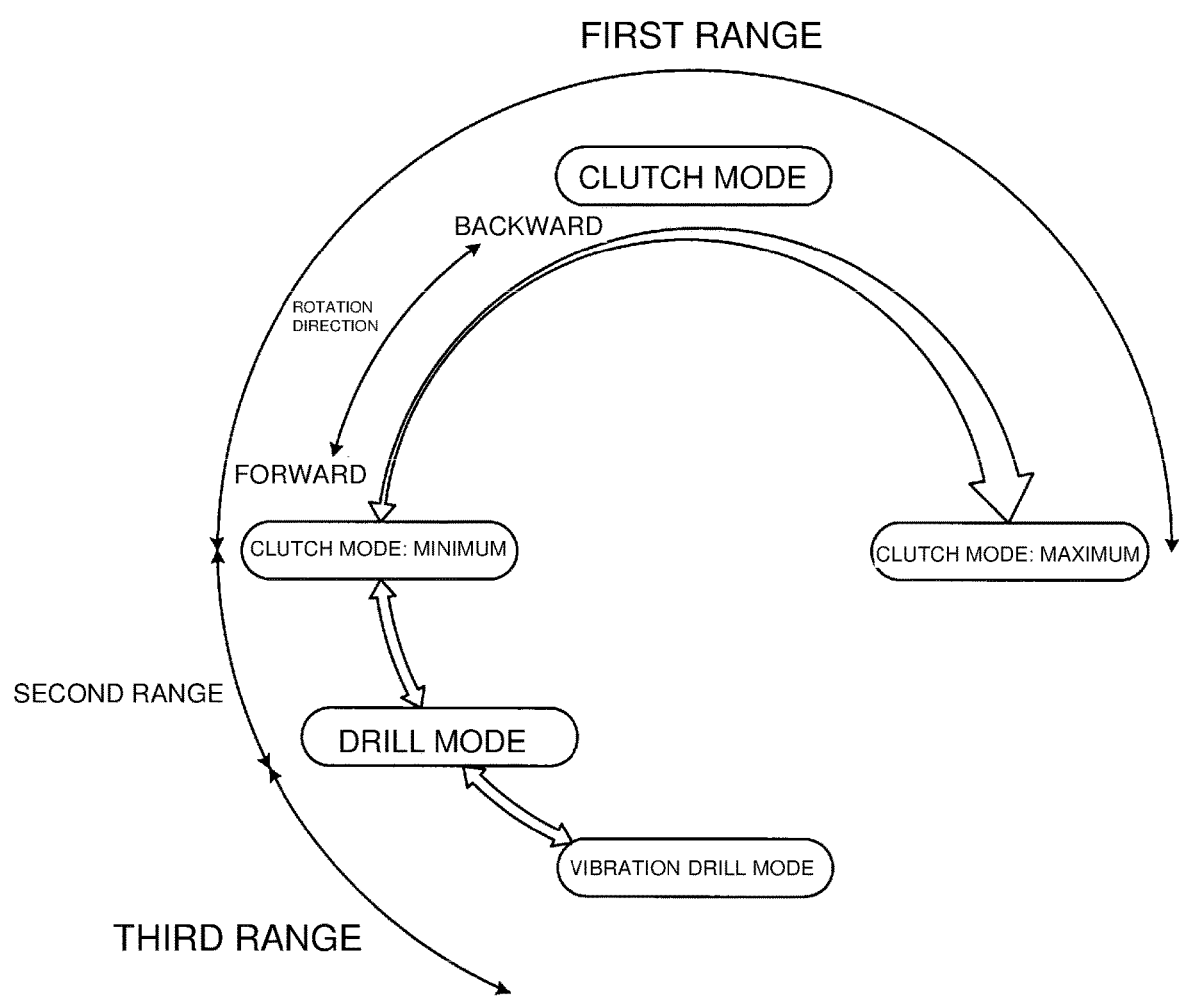
FIG. 31 is a schematic diagram describing the relationship between the rotation direction of the change ring according to the embodiment and the operation modes.

FIG. 31 is a schematic diagram describing the relationship between the rotation direction of the change ring 59 according to the embodiment and the operation modes. In the clutch mode, as the change ring 59 is operated in the forward rotation direction, the release value for the clutch assembly 40 is gradually reduced as shown in FIGS. 30 and 31. In the clutch mode, as the change ring 59 is operated in the backward rotation direction, the release value for the clutch assembly 40 is gradually increased.

As described above, the release value for the clutch assembly 40 is adjustable in accordance with the length (compression amount) of the coil springs 44. In the clutch mode, the coil springs 44 elastically deform to reduce the release value in response to the change ring 59 being operated in the forward rotation direction, and elastically deform to increase the release value in response to the change ring 59 being operated in the backward rotation direction.

In the clutch mode, the coil springs 44 in the embodiment stretch to reduce the release value in response to the change ring 59 being operated in the forward rotation direction, and compress to increase the release value in response to the change ring 59 being operated in the backward rotation direction.

In the clutch mode in the embodiment, the internal threaded groove 41B on the clutch switch ring 41 and the external threaded groove 43B on the spring holder 43 are positioned to cause the coil springs 44 to stretch in response to an operation on the change ring 59 in the forward rotation direction, and to cause the coil springs 44 to compress in response to an operation on the change ring 59 in the backward rotation direction.

In response to an operation on the change ring 59 in the forward rotation direction, the clutch assembly 40 is switched from the clutch mode to the drill mode.

In response to an operation on the change ring 59 in the forward rotation direction, the vibration assembly 30 is switched from the drill mode to the vibration drill mode.

In response to an operation on the change ring 59 in the backward rotation direction, the operation mode is switched from the vibration drill mode to the drill mode.

In response to an operation on the change ring 59 in the backward rotation direction, the operation mode is switched from the drill mode to the clutch mode.

In the embodiment, the position at which the release value indicates the maximum value in the clutch mode corresponds to one end of the movable range of the change ring 59 in the rotation direction. The position indicating the vibration drill mode corresponds to the other end of the movable range of the change ring 59 in the rotation direction. At the position corresponding to the release value indicating the maximum value, the change ring 59 in the embodiment cannot rotate further in the backward rotation direction. At the position indicating the vibration drill mode, the change ring 59 cannot rotate further in the forward rotation direction.

As described above, the change ring 59 is operable in a first range in the rotation direction to adjust the clutch assembly 40, and is operable in a second range more forward than in the first range in the rotation direction to adjust the lock pins 53. The first range in the rotation direction includes a range in which the middle portion 72A of the leaf spring 72 is received in at least one of the multiple (twenty-one) notches 57F. The second range in the rotation direction includes a range in which the middle portion 72A of the leaf spring 72 is received in the notch 57E. The adjustment of the clutch assembly 40 in the first range includes adjustment of the release value for the clutch assembly 40. The adjustment of the lock pins 53 in the second range includes adjustment between the rotation-permitting position and the rotation-restricting position of the lock pins 53.

The change ring 59 is operable in the first range in the rotation direction to adjust the clutch assembly 40, and is also operable in a third range more forward than in the first range in the rotation direction to adjust the vibration assembly 30. The third range in the rotation direction includes a range in which the middle portion 72A of the leaf spring 72 is received in the notch 57D. The adjustment of the vibration assembly 30 in the third range includes adjustment performed by either vibrating or not vibrating the spindle 61.

In the first range in the rotation direction, the coil springs 44 elastically deform to reduce the release value in response to the change ring 59 being operated in the forward rotation direction, and elastically deform to increase the release value in response to the change ring 59 being operated in the backward rotation direction.

Switch of Operation Modes

As described above, the change ring 59 is operated to change the operation mode of the electric driver drill 1. The operation modes of the electric driver drill 1 include the vibration drill mode, the drill mode, and the clutch mode.

In the vibration drill mode, the output assembly 60 vibrates in the front-rear direction and the clutch assembly 40 does not disable transmission of a rotational force. For example, the vibration drill mode is selected for cutting a hole in a workpiece with the tip tool.

In the drill mode, the output assembly 60 does not vibrate in the front-rear direction and the clutch assembly 40 does not disable transmission of a rotational force. For example, the drill mode is selected for cutting a hole in a workpiece with the tip tool.

In the clutch mode, the output assembly 60 does not vibrate in the front-rear direction and the clutch assembly 40 disables transmission of a rotational force. For example, the clutch mode is selected for fastening a screw into a workpiece with the tip tool.

To set the vibration drill mode, the operator rotates the change ring 59 to position the change ring 59 within the third range in the rotation direction.

To set the drill mode, the operator rotates the change ring 59 to position the change ring 59 within the second range in the rotation direction.

To set the clutch mode, the operator rotates the change ring 59 to position the change ring 59 within the first range in the rotation direction.

Shift from Clutch Mode to Drill Mode

Figure 32C:
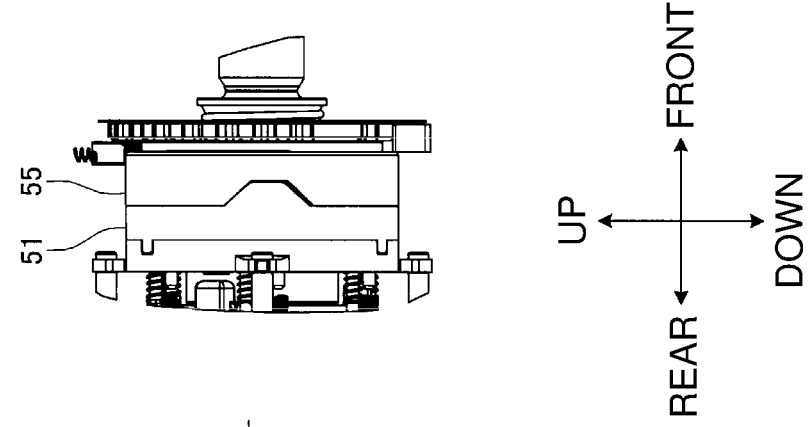
FIGS. 32A to 32C are views of the electric driver drill in a clutch mode according to the embodiment.
Figure 32B:
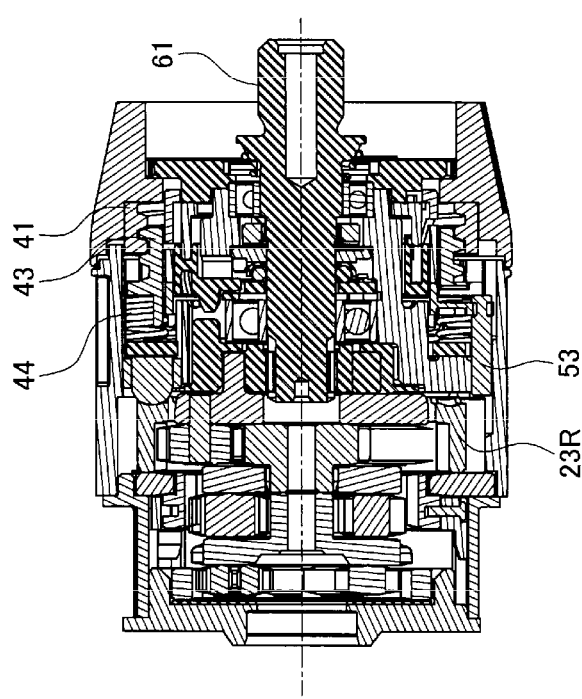
Figure 32A:
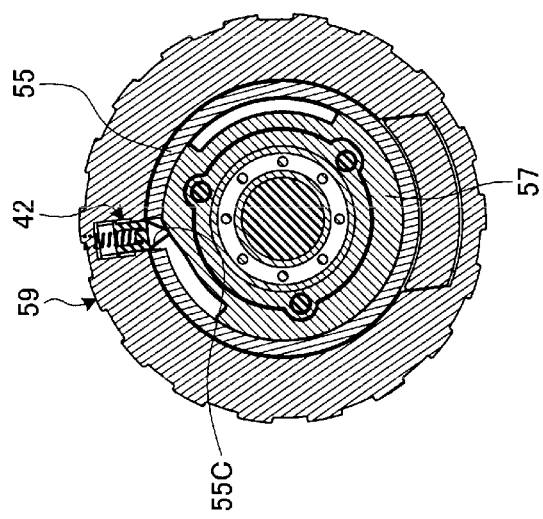
Figure 34C:
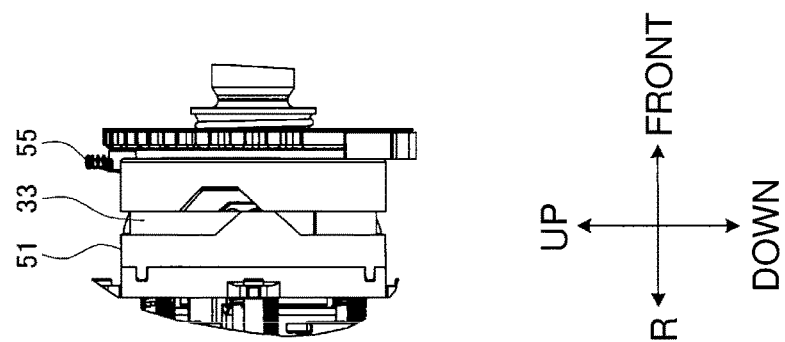
FIGS. 34A to 34C are views of the electric driver drill in the drill mode according to the embodiment.
Figure 34B:
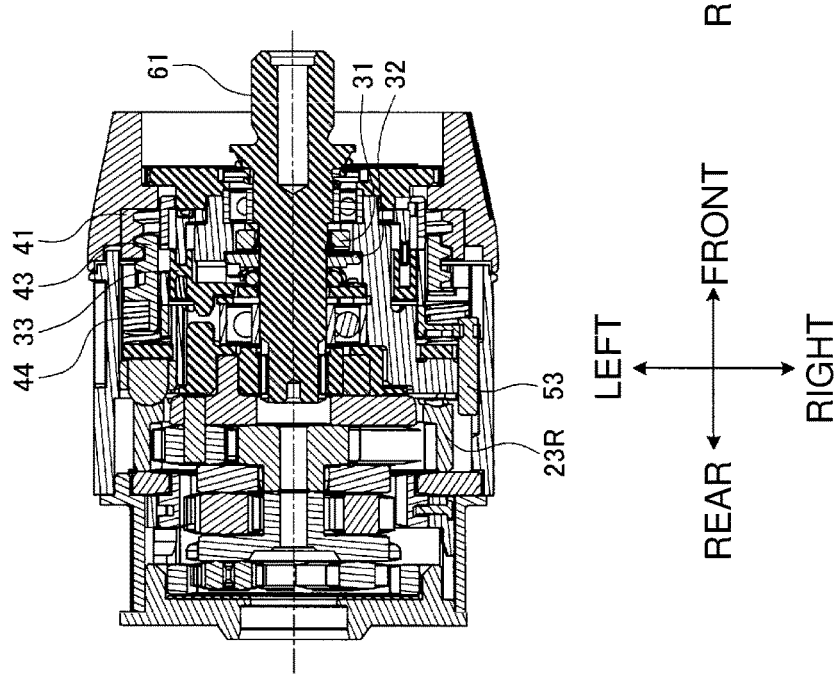
Figure 34A:
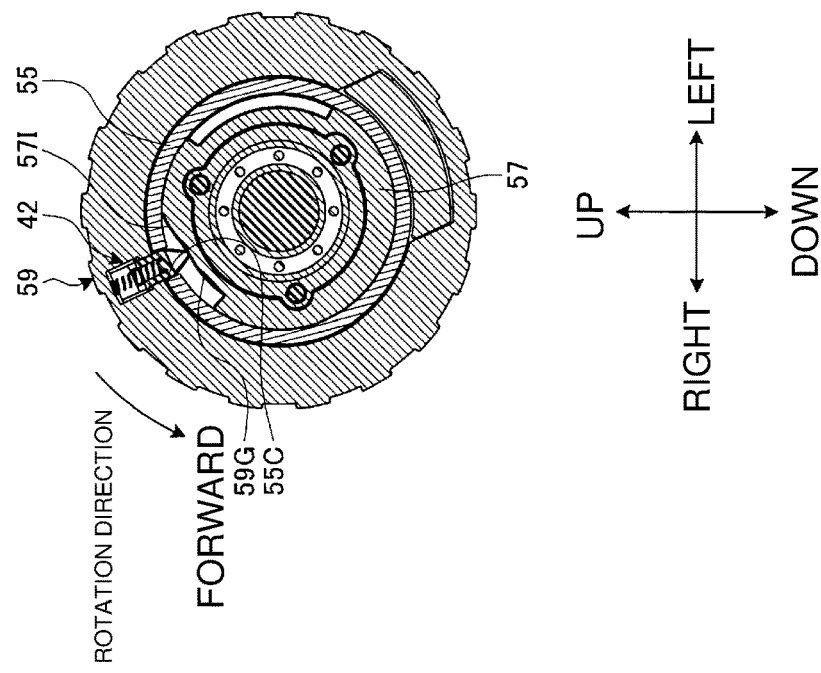

FIGS. 32A to 32C are views of the electric driver drill 1 in the clutch mode according to the embodiment. FIGS. 33A to 33C are views of the electric driver drill 1 shifting from the clutch mode to the drill mode according to the embodiment. FIGS. 34A to 34C are views of the electric driver drill 1 in the drill mode according to the embodiment. FIGS. 32A to 32C show the electric driver drill 1 having the release value set to the minimum value in the clutch mode. FIGS. 33A to 33C show the electric driver drill 1 immediately before shifting from the clutch mode to the drill mode. FIGS. 32A, 33A, and 34A are cross-sectional views taken along line D-D in FIG. 17 viewed from the front. FIGS. 32B, 33B, and 34B are cross-sectional views taken along line E-E in FIG. 22. FIGS. 32C, 33C, and 34C are views of the drill switch ring 55, the vibration switch lever 33, and the support ring 51.

As described above, the release value is set to the minimum value in the clutch mode in response to an operation on the change ring 59 to place the middle portion 72A of the leaf spring 72 in the first notch 57F1. As shown in FIGS. 32A to 32C, the lock lever 42 enters the removed state of being removed from the recess 55C on the drill switch ring 55. The coil springs 44 stretch. The lock pins 53 move to the rotation-permitting position for permitting rotation of the internal gear 23R.

In response to an operation on the change ring 59 in the forward rotation direction, the clutch assembly 40 is switched from the clutch mode to the drill mode (nonclutch mode). In this case, the operator operates the change ring 59 in the forward rotation direction to position the change ring 59 within the second range in the rotation direction. This causes the middle portion 72A of the leaf spring 72 to be placed in the notch 57E. As shown in FIGS. 33A to 33C, the lock lever 42 enters the received state of being received in the recess 55C on the drill switch ring 55.

As shown in, for example, FIG. 27, the drill switch ring 55 is located forward from the lock lever 42 in the rotation direction, and includes the protrusion 55E that can come in contact with at least a part of the change ring 59. The change ring 59 according to the embodiment has the notch 59N into which the protrusion 55E is placed. The notch 59N is located backward from the protrusion 55E in the rotation direction and has the end face 59T that can come in contact with the protrusion 55E. In response to an operation on the change ring 59 in the forward rotation direction with the end face 59T in contact with the protrusion 55E, the drill switch ring 55 rotates forward in the rotation direction together with the change ring 59.

When the drill switch ring 55 and the change ring 59 rotate together, the lever 42D in the lock lever 42 in contact with the larger-diameter portion 57H of the rear cam plate 57B moves to face the smaller-diameter portion 57G. The lever 42D moves radially inward with an elastic force from the spring 42C. The lever 42D in contact with the larger-diameter portion 57H thus moves to come contact with the boundary between the smaller-diameter portion 57G and the slope 57I after coming in contact with the slope 57I. When moving radially inward, the lever 42D shifts to the received state of being received in the recess 55C on the drill switch ring 55.

In response to an operation on the change ring 59 in the forward rotation direction with the protrusion 55E on the drill switch ring 55 in contact with at least a part of the change ring 59 in this manner, the change ring 59 and the drill switch ring 55 shift from the removed state (nonsynchronized state) to the received state (synchronized state).

In response to an operation on the change ring 59 to place the middle portion 72A of the leaf spring 72 in the notch 57E, the electric driver drill 1 is set to the drill mode. As shown in FIGS. 34A to 34C, the lock lever 42 enters the received state of being received in the recess 55C on the drill switch ring 55. The lock pins 53 are at the rotation-restricting position for restricting rotation of the internal gear 23R. The vibration switch lever 33 is at the retracted position at which the vibration switch lever 33 is separated from the second cam 32. The lock lever 42 is in contact with the boundary between the smaller-diameter portion 57G and slope 57I of the rear cam plate 57B.

When the vibration switch lever 33 moves to the retracted position, the second cam 32 becomes rotatable. In this state, the first cam 31 fixed to the spindle 61 and the second cam 32 rotate together. The spindle 61 thus rotates without vibrating in the axial direction.

Shift from Drill Mode to Vibration Drill Mode

FIGS. 35A to 35C are views of the electric driver drill 1 in the vibration drill mode according to the embodiment. FIG. 35A is a cross-sectional view taken along line D-D in FIG. 17 viewed from the rear. FIG. 35B is a cross-sectional view taken along line E-E in FIG. 22. FIG. 35C is a view of the drill switch ring 55, the vibration switch lever 33, and the support ring 51.

To switch from the drill mode to the vibration drill mode, the operator rotates the change ring 59 in the forward rotation direction to position the change ring 59 within the third range. This causes the middle portion 72A of the leaf spring 72 to be placed in the notch 57D. As shown in FIGS. 35A to 35C, the lock lever 42 enters the received state of being received in the recess 55C on the drill switch ring 55. The lock pins 53 are at the rotation-restricting position for restricting rotation of the internal gear 23R. The vibration switch lever 33 is at the advanced position at which the vibration switch lever 33 is in contact with the second cam 32. The lock lever 42 is in contact with the smaller-diameter portion 57G of the rear cam plate 57B.

When the vibration switch lever 33 moves to the advanced position, the second cam 32 is restricted from rotating. In this state, the spindle 61 rotates while the first cam 31 fixed to the spindle 61 and the second cam 32 restricted from rotating remain in contact with each other. The spindle 61 thus rotates while vibrating in the axial direction.

To switch from the vibration drill mode to the drill mode, the operator rotates the change ring 59 in the backward rotation direction to position the change ring 59 to the second range from the third position in the rotation direction. When the change ring 59 is within the second range, the lever 42D in the lock lever 42 enters the received state of being received in the recess 55C on the drill switch ring 55. The change ring 59 is thus connected to the drill switch ring 55 with the lock lever 42. The drill switch ring 55 enters the synchronized state in which the drill switch ring 55 rotates together with the change ring 59.

In response to an operation on the change ring 59 in the backward rotation direction, the change ring 59 and the drill switch ring 55 shift from the synchronized state (received state) to the nonsynchronized state (removed state).

Clutch Mode

Figure 37:
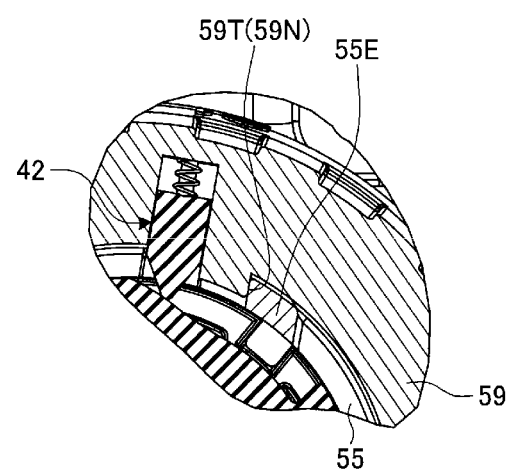
FIG. 37 is an enlarged view of the electric driver drill in the clutch mode according to the embodiment.

FIGS. 36A, 36B, 38A, and 38B show the electric driver drill 1 in the clutch mode according to the embodiment. FIGS. 36A and 38A are cross-sectional views taken along line E-E in FIG. 22. FIGS. 36B and 38B are cross-sectional views taken along line D-D in FIG. 17 viewed from the rear. FIG. 37 is an enlarged view of the electric driver drill 1 in the clutch mode according to the embodiment. FIG. 37 is a partially enlarged view of an area G in FIG. 36B. FIGS. 36A and 36B show the electric driver drill 1 having the release value set to the minimum value in the clutch mode. FIGS. 38A and 36B show the electric driver drill 1 having the release value set to the maximum value in the clutch mode.

As described above, the release value is adjustable in accordance with the amount of rotation of the change ring 59. The operator can adjust the release value by rotating the change ring 59 to select one of the notches 57F for receiving the middle portion 72A of the leaf spring 72. In the embodiment, the front cam plate 57A has twenty-one notches 57F. The release value is adjustable through selection of the notch 57F for receiving the middle portion 72A of the leaf spring 72 and through adjustment of the compression amount of the coil springs 44.

An operation on the change ring 59 to place the middle portion 72A of the leaf spring 72 in the first notch 57F1 can adjust the compression amount of the coil springs 44 and an elastic force to be applied to the internal gear 23R. This sets the release value for the clutch assembly 40 to the minimum value. In response to an operation on the change ring 59 to place the middle portion 72A of the leaf spring 72 in the second notch 57F2, the clutch assembly 40 has the release value set to a value that is higher by one value than the minimum value. In response to an operation on the change ring 59 to place the middle portion 72A of the leaf spring 72 in the third notch 57F3, the clutch assembly 40 has the release value set to a value that is higher by two values than the minimum value. In response to an operation on the change ring 59 to place the middle portion 72A of the leaf spring 72 in the n-th notch 57Fn, the clutch assembly 40 has the release value set to (n−1) values higher than the minimum value. In response to an operation on the change ring 59 to place the middle portion 72A of the leaf spring 72 in the twenty-first notch 57F21, the clutch assembly 40 has the release value set to the maximum value.

Operation

An example operation of the electric driver drill 1 according to the embodiment will now be described. The battery pack 7 is attached to the battery mount 2 to power the electric driver drill 1. In response to an operation on the trigger 17A in this state, the switch body 17B outputs an operation signal. The controller 4 supplies a driving current to the motor 10 in response to the operation signal output from the switch body 17B. This rotates the rotor shaft 13.

As the rotor shaft 13 rotates, the spindle 61 rotates via the power transmission assembly 3. This rotates the chuck 62. As the chuck 62 rotates, the tip tool attached to the chuck 62 rotates.

As the rotor shaft 13 rotates, the centrifugal fan 16 rotates. The air flowing around the motor 10 cools the motor 10. The air flowing around the motor 10 is discharged through the outlets 140.

As described above, the single change ring 59 is simply operated in the rotation direction to change the operation mode and the release value for the clutch assembly 40 in the embodiment with high operability. The change ring 59 is operated in the first range in the rotation direction to adjust the release value for the clutch assembly 40 in the clutch mode. The change ring 59 is operated in the second range in the rotation direction to adjust the positions of the lock pins 53 (clutching-off members) to switch the operation mode between the clutch mode and the nonclutch mode. The change ring 59 is operated in the third range in the rotation direction to adjust the position of the vibration switch lever 33 to switch the operation mode between the drill mode and the vibration drill mode in the nonclutch mode.

In the clutch mode, the release value for the clutch assembly 40 is adjustable with the coil springs 44. The coil springs 44 elastically deform to reduce the release value in response to the change ring 59 being operated in the forward rotation direction, and elastically deform to increase the release value in response to the change ring 59 being operated in the backward rotation direction. In response to an operation on the change ring 59 in the forward rotation direction, the operation mode is switched from the clutch mode to the nonclutch mode. In other words, as described with reference to FIG. 31, in response to an operation on the change ring 59 in the forward rotation direction, the operation mode shifts from the clutch mode with the maximum release value to the clutch mode with the minimum release value, and then to the nonclutch mode (drill mode) in this order.

In response to an operation on the change ring 59 in the forward rotation direction, the release values are gradually reduced in the clutch mode and then the operation mode is shifted from the clutch mode to the nonclutch mode. The change ring 59 has a smaller rotation resistance. The operator can thus switch the operation mode between the clutch mode and the nonclutch mode with high operability. In the nonclutch mode, the change ring 59 has a smaller rotation resistance during the shift from the drill mode to the vibration drill mode. The operator can thus switch the operation mode between the drill mode and the vibration drill mode with high operability.

In other words, as the change ring 59 is operated in the forward rotation direction, the coil springs 44 stretch to reduce the release value in the clutch mode. To shift from the clutch mode to the nonclutch mode, the operator operates the change ring 59 in the forward rotation direction with the coil springs 44 stretching. The stretching coil springs 44 cause a smaller rotation resistance in the change ring 59. The operator can thus operate the change ring 59 without any effort to shift from the clutch mode to the nonclutch mode. The operator can thus switch from the clutch mode to the nonclutch mode with high operability.

The coil springs 44 stretch in the nonclutch mode. In the nonclutch mode, the change ring 59 has a smaller rotation resistance during the shift from the drill mode to the vibration drill mode. The operator can thus operate the change ring 59 without any effort to switch the operation mode between the drill mode and the vibration drill mode. The operator can thus switch the operation mode between the drill mode and the vibration drill mode with high operability.

For example, in response to an operation on the change ring 59 in the forward rotation direction, the operation mode may shift from the clutch mode with the minimum release value to the clutch mode with the maximum release value, and then to the nonclutch mode (drill mode) in this order. This causes the operator to operate the change ring 59 in the forward rotation direction with the coil springs 44 being compressed. The compressed coil springs 44 cause a larger rotation resistance in the change ring 59. The operator is thus forced to operate the change ring 59 with an effort to shift from the clutch mode to the nonclutch mode. In the nonclutch mode as well, the change ring 59 has a larger rotation resistance during the switching of the operation mode between the drill mode and the vibration drill mode due to the compressed coil springs 44. The operator is thus forced to operate the change ring 59 with an effort to switch the operation mode between the drill mode and the vibration drill mode.

In the embodiment, the operation mode shifts from the clutch mode with the maximum release value to the clutch mode with the minimum release value, and then to the nonclutch mode (drill mode) in this order in response to an operation on the change ring 59 in the forward rotation direction. The operator can thus operate the change ring 59 without any effort to change the operation mode.

The third planetary gear assembly 23 includes the internal gear 23R. An elastic force applied from the coil springs 44 to the internal gear 23R is adjusted to enable smooth adjustment of the release value for the clutch assembly 40.

The clutch assembly 40 includes the spring holder 43 holding the coil springs 44, and the clutch pins 47 that can come in contact with the internal gear 23R. The coil springs 44 thus apply an elastic force to the internal gear 23R through the clutch pins 47 smoothly.

The change ring 59 is operated to move the spring holder 43. This enables smooth adjustment of an elastic force to be applied to the internal gear 23R.

The lock pins 53 serving as the clutching-off members are movable between the rotation-permitting position for permitting rotation of the internal gear 23R and the rotation-restricting position for restricting rotation of the internal gear 23R. The lock pins 53 are movable between the rotation-permitting position and the rotation-restricting position in response to an operation on the change ring 59. The operator operating the change ring 59 to move the lock pins 53 to the rotation-permitting position can change the operation mode to the clutch mode. The operator operating the change ring 59 to move the lock pins 53 to the rotation-restricting position can change the operation mode to the nonclutch mode.

The operator operating the change ring 59 in the first range in the rotation direction can smoothly adjust the release value for the clutch assembly 40. The operator operating the change ring 59 in the second range more forward than in the first range in the rotation direction to move the lock pins 53 can switch the operation mode between the clutch mode and the nonclutch mode. The coil springs 44 elastically deform to reduce the release value in response to the change ring 59 being operated in the forward rotation direction in the first range, and elastically deform to increase the release value in response to the change ring 59 being operated in the backward rotation direction in the first range. The operator can thus operate the change ring 59 without any effort to switch the operation mode between the clutch mode and the nonclutch mode.

In the embodiment, the lock pins 53 move as the drill switch ring 55 rotates. The lock lever 42 switches the drill switch ring 55 between the synchronized state in which the drill switch ring 55 rotates together with the change ring 59 and the nonsynchronized state in which the drill switch ring 55 does not rotate together with the change ring 59.

In the nonsynchronized state, the drill switch ring 55 does not rotate when the change ring 59 is operated in the rotation direction. More specifically, the lock pins 53 do not move when the change ring 59 is operated in the rotation direction in the nonsynchronized state, causing no switch between the clutch mode and the nonclutch mode. In the nonsynchronized state, the operator operating the change ring 59 can adjust the release value for the clutch assembly 40.

In the synchronized state, the drill switch ring 55 rotates together with the change ring 59 in response to an operation on the change ring 59 in the rotation direction. More specifically, the lock pins 53 move in response to an operation on the change ring 59 in the rotation direction in the nonsynchronized state, allowing a switch between the clutch mode and the nonclutch mode. In the synchronized state, the operator operating the change ring 59 can switch the operation mode between the clutch mode and the nonclutch mode.

In response to rotation of the change ring 59, the lock lever 42 moves radially while rotating circumstantially along the rear cam plate 57B in contact with the rim of the rear cam plate 57B. This switches the operation mode between the synchronized state and the nonsynchronized state.

The lock lever 42 includes the lever 42D receivable in the recess 55C on the drill switch ring 55 and the spring 42C that generates an elastic force for moving the lever 42D radially inward. The lever 42D shifts between the received state of being received in the recess 55C and the removed state of being removed from the recess 55C as the lever 42D rotates circumferentially along the rear cam plate 57B while the inner end of the lever 42D is in contact with the rear cam plate 57B in the cam plate 57. This switches the operation mode between the synchronized state (clutch mode) and the nonsynchronized state (nonclutch mode).

The drill switch ring 55 is located forward from the lock lever 42 in the rotation direction, and includes the protrusion 55E that can come in contact with at least a part of the change ring 59. In response to rotation of the change ring 59 in the forward rotation direction to shift from the clutch mode to the nonclutch mode, the change ring 59 and the drill switch ring 55 rotate together with the protrusion 55E on the drill switch ring 55 in contact with the end face 59T of the notch 59N in the change ring 59. The protrusion 55E in contact with the end face 59T allows smooth rotation of the change ring 59 and the drill switch ring 55 in the synchronized state.

An operation on the change ring 59 in the forward rotation direction with the protrusion 55E on the drill switch ring 55 in contact with the end face 59T of the change ring 59 allows a switch from the nonsynchronized state to the synchronized state. More specifically, in response to an operation on the change ring 59 in the forward rotation direction with the protrusion 55E on the drill switch ring 55 in contact with the end face 59T of the notch 59N in the change ring 59, the lock lever 42 shifts from the removed state to the received state. In this state, the change ring 59 and the drill switch ring 55 rotate with the protrusion 55E on the drill switch ring 55 in contact with the end face 59T of the change ring 59. This generates no external force on the lock lever 42 in the rotation direction. The lever 42D thus smoothly moves radially inward with an elastic force from the spring 42C to shift from the removed state to the received state.

In response to an operation on the change ring 59 in the backward rotation direction, the lever 42D smoothly shifts from the received state to the removed state along the cam plate 57. This allows the drill switch ring 55 to smoothly shift from the synchronized state to the nonsynchronized state.

The operator operating the change ring 59 in the first range in the rotation direction can smoothly adjust the release value for the clutch assembly 40. The operator operating the change ring 59 in the third range more forward than in the first range in the rotation direction to move the vibration switch lever 33 can switch the operation mode between the drill mode and the vibration drill mode. The coil springs 44 elastically deform to reduce the release value in response to the change ring 59 being operated in the forward rotation direction in the first range, and elastically deform to increase the release value in response to the change ring 59 being operated in the backward rotation direction in the first range. The operator can thus operate the change ring 59 without any effort to switch the operation mode between the drill mode and the vibration drill mode.

Other Embodiments

In the above embodiment, the coil springs 44 each are an elastic member for adjusting the release value for the clutch assembly 40. In some embodiments, the elastic member for adjusting the release value for the clutch assembly 40 may be a leaf spring or a laminated leaf spring. The elastic member for adjusting the release value for the clutch assembly 40 may be a waved washer.

In the above embodiment, the change ring 59 is operated in the forward rotation direction to switch from the drill mode to the vibration drill mode in the nonclutch mode. In other words, as described with reference to FIG. 31, in response to an operation on the change ring 59 in the forward rotation direction, the operation mode shifts from the clutch mode with the maximum release value to the clutch mode with the minimum release value, to the drill mode, and then to the vibration drill mode in this order. In the nonclutch mode, the change ring 59 may be operated in the forward rotation direction to switch from the vibration drill mode to the drill mode. In other words, in response to an operation on the change ring 59 in the forward rotation direction, the operation mode may shift from the clutch mode with the maximum release value to the clutch mode with the minimum release value, to the vibration drill mode, and then to the drill mode in this order.

In the above embodiment, the nonclutch mode includes both the drill mode and the vibration drill mode. In some embodiments, the nonclutch mode may include either the drill mode or the vibration drill mode alone. The drill mode may be a clutch mode with high torque.

What is claimed is:

1. An electric driver drill, comprising:
   a motor;
   a spindle configured to rotate with a rotational force transmitted from the motor;
   a clutch assembly (i) configured to disable transmission of the rotational force to the spindle in response to a rotational load on the spindle reaching a release value and (ii) including an elastic member configured to adjust the release value; and
   a change ring configured to switch the clutch assembly from a clutch mode in which the clutch assembly is operable to a nonclutch mode in which the clutch assembly is inoperable, wherein
   in the clutch mode, the elastic member elastically deforms (i) to reduce the release value in response to the change ring being operated in a forward rotation direction and (ii) to increase the release value in response to the change ring being operated in a backward rotation direction,
   the clutch assembly is configured to have a minimum release value which is a minimum value at which the clutch assembly disables transmission of the rotational force and a maximum release value which is a maximum value at which the clutch assembly disables transmission of the rotational force,
   the change ring is operable in the forward rotation direction to switch the clutch assembly from the maximum release value to the minimum release value to the nonclutch mode, and
   the change ring is configured such that the change ring cannot be rotated in the backward rotation direction from the position of the change ring at which the clutch assembly is at the maximum release value.

2. The electric driver drill according to claim 1, wherein the elastic member includes a coil spring stretchable in the clutch mode to reduce the release value in response to the change ring being operated in the forward rotation direction, and compressible in the clutch mode to increase the release value in response to the change ring being operated in the backward rotation direction.

3. The electric driver drill according to claim 2, further comprising:
   a power transmission assembly (i) configured to transmit a rotational force generated by the motor to the spindle, (ii) including a planetary gear assembly including an internal gear, and (iii) being configured to adjust the release value through adjustment of an elastic force applied from the coil spring to the internal gear.

4. The electric driver drill according to claim 3, wherein the clutch assembly includes
   a spring holder holding the coil spring, and
   a clutch pin configured to come in contact with the internal gear, and
   the coil spring applies an elastic force to the internal gear through the clutch pin.

5. The electric driver drill according to claim 4, wherein the spring holder moves in response to an operation on the change ring, and
   the elastic force from the coil spring is adjusted in response to movement of the spring holder.

6. The electric driver drill according to claim 3, further comprising:
   a clutching-off member (i) movable between a rotation-permitting position for permitting rotation of the internal gear and a rotation-restricting position for restricting rotation of the internal gear in response to an operation on the change ring and (ii) configured to be at the rotation-permitting position in the clutch mode and at the rotation-restricting position in the nonclutch mode.

7. The electric driver drill according to claim 1, further comprising:
   a vibration assembly configured to vibrate the spindle and including
   a first cam surrounding the spindle, and
   a second cam rearward from the first cam and configured to come in contact with the first cam, wherein
   the change ring, the clutch assembly and the vibration assembly are configured such that (i) the nonclutch mode includes a vibration drill mode in which the vibration assembly is operable and a drill mode in which the vibration assembly is inoperable and (ii) the vibration drill mode and the drill mode are switched in response to an operation on the change ring in the nonclutch mode.

8. The electric driver drill according to claim 7, wherein the vibration assembly is configured to be switched from the drill mode to the vibration drill mode in response to the change ring being operated in the forward rotation direction.

9. The electric driver drill according to claim 7, wherein the vibration assembly includes a vibration switch lever movable in response to an operation on the change ring, and
   the vibration assembly is configured to be switched to the vibration drill mode in response to movement of the vibration switch lever to at least partially come in contact with the second cam and switched to the drill mode in response to movement of the vibration switch lever to separate from the second cam.

10. An electric driver drill, comprising:
    a motor;
    a spindle configured to rotate with a rotational force transmitted from the motor;
    a clutch assembly (i) configured to disable transmission of the rotational force to the spindle in response to a rotational load on the spindle reaching a release value and (ii) including an elastic member configured to adjust the release value;
    a clutching-off member movable to switch the clutch assembly between a clutch mode in which the clutch assembly is operable and a nonclutch mode in which the clutch assembly is inoperable; and
    a change ring (i) operable in a rotation direction to adjust at least one of the clutch assembly or the clutching-off member and (ii) configured to adjust the clutch assembly in response to being operated in a first range in the rotation direction and to adjust the clutching-off member in response to being operated in a second range more forward in the rotation direction than the first range, wherein
    the elastic member elastically deforms, in the first range, (i) to reduce the release value in response to the change ring being operated in a forward rotation direction and (ii) to increase the release value in response to the change ring being operated in a backward rotation direction, the clutch assembly is configured to have a minimum release value which is a minimum value at which the clutch assembly disables transmission of the rotational force and a maximum release value which is a maximum value at which the clutch assembly disables transmission of the rotational force, the change ring is operable in the forward rotation direction to switch the clutch assembly from the maximum release value to the minimum release value to the nonclutch mode, and the change ring is configured such that the change ring cannot be rotated in the backward rotation direction from the position of the change ring at which the clutch assembly is at the maximum release value.

11. The electric driver drill according to claim 10, wherein the change ring is operable to adjust the clutch assembly by adjusting the release value, and is operable to adjust a position of the clutching-off member.

12. The electric driver drill according to claim 11, further comprising:

a power transmission assembly (i) configured to transmit a rotational force generated by the motor to the spindle and (ii) including a planetary gear assembly including an internal gear, wherein the clutching-off member (i) is movable between a rotation-permitting position for permitting rotation of the internal gear and a rotation-restricting position for restricting rotation of the internal gear in response to an operation on the change ring, (ii) is configured such that adjustment of the position of the clutching-off member includes adjustment between the rotation-permitting position and the rotation-restricting position, and (iii) is at the rotation-permitting position in the clutch mode and is at the rotation-restricting position in the nonclutch mode.

13. The electric driver drill according to claim 12, further comprising:

a drill switch ring rotatable to move the clutching-off member between the rotation-permitting position and the rotation-restricting position in response to rotation of the change ring; and a lock lever configured to switch between a synchronized state in which the change ring and the drill switch ring are rotatable together and a nonsynchronized state in which the change ring and the drill switch ring are nonrotatable together, wherein in the synchronized state, the clutching-off member moves between the rotation-permitting position and the rotation-restricting position in response to an operation on the change ring.

14. The electric driver drill according to claim 13, wherein the clutch mode includes the nonsynchronized state, and the nonclutch mode includes the synchronized state.

15. The electric driver drill according to claim 14, further comprising:

a cam plate in contact with the lock lever, wherein the lock lever is supported by the change ring in a radially movable manner, and the lock lever and the cam plate are configured such that (i) in response to rotation of the change ring, the lock lever moves radially while being in contact with a rim of the cam plate, and (ii) the lock lever moves radially to switch between the synchronized state and the nonsynchronized state.

16. The electric driver drill according to claim 15, wherein the lock lever includes a lever receivable in a recess on the drill switch ring, and a spring configured to generate an elastic force for moving the lever radially inward, the lever is configured to shift between a received state of being received in the recess and a removed state of being removed from the recess as the lever rotates circumferentially along the cam plate while being in contact with the rim of the cam plate, the synchronized state includes the received state, and the nonsynchronized state includes the removed state.

17. The electric driver drill according to claim 13, wherein the drill switch ring is forward from the lock lever in a rotation direction and includes a protrusion configured to contact at least a part of the change ring.

18. The electric driver drill according to claim 17, wherein the lock lever and the change ring are configured such that the lock lever is switched from the nonsynchronized state to the synchronized state in response to the change ring being operated in a forward rotation direction with the protrusion in contact with the at least a part of the change ring.

19. An electric driver drill, comprising:

a motor;

a spindle configured to rotate with a rotational force transmitted from the motor;

a clutch assembly (i) configured to disable transmission of the rotational force to the spindle in response to a rotational load on the spindle reaching a release value and (ii) including an elastic member configured to adjust the release value;

a change ring configured to switch the clutch assembly from a clutch mode in which the clutch assembly is operable to a nonclutch mode in which the clutch assembly is inoperable; and a vibration assembly configured to vibrate the spindle and including a first cam surrounding the spindle, and a second cam rearward from the first cam and configured to come in contact with the first cam, wherein in the clutch mode, the elastic member elastically deforms (i) to reduce the release value in response to the change ring being operated in a forward rotation direction and (ii) to increase the release value in response to the change ring being operated in a backward rotation direction, the clutch assembly is configured to have a minimum release value which is a minimum value at which the clutch assembly disables transmission of the rotational force and a maximum release value which is a maximum value at which the clutch assembly disables transmission of the rotational force, the change ring is operable in the forward rotation direction to switch the clutch assembly from the maximum release value to the minimum release value to the nonclutch mode, the change ring, the clutch assembly and the vibration assembly are configured such that (i) the nonclutch mode includes a vibration drill mode in which the vibration assembly is operable and a drill mode in which the vibration assembly is inoperable and (ii) the vibration drill mode and the drill mode are switched in response to an operation on the change ring in the nonclutch mode, and the vibration assembly is configured to be switched from the drill mode to the vibration drill mode in response to the change ring being operated in the forward rotation direction.

20. The electric driver drill according to claim 19, wherein the vibration assembly includes a vibration switch lever movable in response to an operation on the change ring, and the vibration assembly is configured to be switched to the vibration drill mode in response to movement of the vibration switch lever to at least partially come in contact with the second cam and switched to the drill mode in response to movement of the vibration switch lever to separate from the second cam.

* * * * *